United States Patent
Iwasawa et al.

(10) Patent No.: US 9,838,574 B2
(45) Date of Patent: *Dec. 5, 2017

(54) DIGITAL CAMERA THAT SENDS ELECTRONIC MAIL WITH EVENT INFORMATION

(75) Inventors: Aki Iwasawa, Tokyo (JP); Akira Ohmura, Tokyo (JP)

(73) Assignee: NIKON CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/308,894

(22) PCT Filed: Jun. 29, 2007

(86) PCT No.: PCT/JP2007/063151
§ 371 (c)(1),
(2), (4) Date: Feb. 24, 2009

(87) PCT Pub. No.: WO2008/001906
PCT Pub. Date: Jan. 3, 2008

(65) Prior Publication Data
US 2009/0307322 A1    Dec. 10, 2009

(30) Foreign Application Priority Data

Jun. 30, 2006 (JP) ................. 2006-180559
Jun. 30, 2006 (JP) ................. 2006-180560
(Continued)

(51) Int. Cl.
*G06F 15/16* (2006.01)
*H04N 5/225* (2006.01)
(Continued)

(52) U.S. Cl.
CPC ........... *H04N 5/225* (2013.01); *G11B 27/034* (2013.01); *H04N 1/00209* (2013.01);
(Continued)

(58) Field of Classification Search
USPC ....................... 709/206; 348/14.01
See application file for complete search history.

(56) References Cited

U.S. PATENT DOCUMENTS 5,719,987 A    2/1998  Kawamura et al.
5,805,215 A    9/1998  Mizoguchi
(Continued)

FOREIGN PATENT DOCUMENTS

EP    1 432 226 A1    6/2004
EP    1 519 527 A2    3/2005
(Continued)

OTHER PUBLICATIONS

U.S. Appl. No. 12/308,893, filed Dec. 27, 2008 in the name of Aki Iwasawa et al.
(Continued)

*Primary Examiner* — Thomas Dailey
(74) *Attorney, Agent, or Firm* — Oliff PLC

(57) ABSTRACT

A digital camera comprises an image-capturing unit that captures an image of a photographic subject and acquires image data, a communication unit for sending and receiving electronic mail data including image data, a recording control unit that records the image data acquired by the image-capturing unit as photographed image data upon a recording medium, an email for sending creation unit that creates an email for sending, to which is attached an image based upon the photographed image data recorded upon the recording medium, and an email address setting unit that sets an email address as the destination of the email for sending. The email for sending creation unit creates a title or a text of the email for sending, based upon at least one of the photographed image data and the email address that has been set.

2 Claims, 53 Drawing Sheets

(30) Foreign Application Priority Data

| Jun. 30, 2006 | (JP) | 2006-180561 |
| Jun. 30, 2006 | (JP) | 2006-180562 |
| Jun. 30, 2006 | (JP) | 2006-180567 |

(51) Int. Cl.

| *G11B 27/034* | (2006.01) |
| *H04N 1/00* | (2006.01) |
| *H04N 1/21* | (2006.01) |
| *H04N 5/77* | (2006.01) |
| *H04N 5/765* | (2006.01) |
| *H04N 5/907* | (2006.01) |
| *H04N 101/00* | (2006.01) |

(52) U.S. Cl.
CPC ....... *H04N 1/00212* (2013.01); *H04N 1/2183* (2013.01); *H04N 5/772* (2013.01); *H04N 5/765* (2013.01); *H04N 5/907* (2013.01); *H04N 2101/00* (2013.01); *H04N 2201/0065* (2013.01)

(56) References Cited

U.S. PATENT DOCUMENTS

| 6,690,417 B1 | 2/2004 | Yoshida et al. |
| 6,690,883 B2 | 2/2004 | Pelletier |
| 6,970,637 B1 | 11/2005 | Yoshida |
| 7,099,920 B1* | 8/2006 | Kojima et al. ............... 709/206 |
| 7,120,669 B2 | 10/2006 | Miyake et al. |
| 7,365,787 B2* | 4/2008 | Nobels .................... 348/333.02 |
| 7,822,746 B2* | 10/2010 | Svendsen .......... G06F 17/30265 707/736 |
| 2002/0078157 A1* | 6/2002 | Matsumoto ................... 709/206 |
| 2002/0093582 A1 | 7/2002 | Aoki et al. |
| 2002/0102938 A1* | 8/2002 | Tsubaki et al. .............. 455/3.06 |
| 2002/0140986 A1* | 10/2002 | Takayama .................... 358/402 |
| 2002/0184325 A1 | 12/2002 | Killcommons et al. |
| 2003/0079008 A1* | 4/2003 | Fujii et al. .................... 709/223 |
| 2003/0193568 A1 | 10/2003 | Yoshida et al. |
| 2003/0214670 A1 | 11/2003 | Ohmura |
| 2004/0100487 A1* | 5/2004 | Mori et al. ................... 345/724 |
| 2004/0109063 A1 | 6/2004 | Kusaka et al. |
| 2004/0145660 A1 | 7/2004 | Kusaka |
| 2004/0224700 A1 | 11/2004 | Sawano |
| 2005/0041035 A1 | 2/2005 | Nagatomo et al. |
| 2005/0071500 A1 | 3/2005 | Tonegawa |
| 2005/0165621 A1 | 7/2005 | Lapstun et al. |
| 2005/0195446 A1 | 9/2005 | Kasatani |
| 2005/0206749 A1 | 9/2005 | Miyazaki |
| 2005/0278749 A1* | 12/2005 | Ewert .................... H04L 12/58 725/62 |
| 2005/0287980 A1* | 12/2005 | Wood ................ H04M 1/72541 455/404.1 |
| 2006/0139709 A1* | 6/2006 | Bifano .............. G06F 17/30265 358/527 |
| 2006/0224937 A1 | 10/2006 | Sudoh et al. |
| 2007/0079248 A1* | 4/2007 | Finke et al. .................. 715/752 |

FOREIGN PATENT DOCUMENTS

| JP | A-6-233225 | 8/1994 |
| JP | A-8-110911 | 4/1996 |
| JP | A-10-191002 | 7/1998 |
| JP | A-11-143803 | 5/1999 |
| JP | A-1-168612 | 6/1999 |
| JP | A-11-164234 | 6/1999 |
| JP | A-11-168648 | 6/1999 |
| JP | A-2000-115733 | 4/2000 |
| JP | A-2000-165570 | 6/2000 |
| JP | A-2000-353130 | 12/2000 |
| JP | A-2001-245181 | 9/2001 |
| JP | A-2001-273207 | 10/2001 |
| JP | A-2002-14903 | 1/2002 |
| JP | A-2002-77505 | 3/2002 |
| JP | A-2002-165195 | 6/2002 |
| JP | A-2002-262155 | 9/2002 |
| JP | A-2002-297504 | 10/2002 |
| JP | A-2002-369119 | 12/2002 |
| JP | A-2002-369120 | 12/2002 |
| JP | A-2003-78702 | 3/2003 |
| JP | A-2003-116089 | 4/2003 |
| JP | A-2003-125456 | 4/2003 |
| JP | A-2003-141023 | 5/2003 |
| JP | A-2003-141289 | 5/2003 |
| JP | A-2003-256333 | 9/2003 |
| JP | A-2003-284139 | 10/2003 |
| JP | A-2003-348516 | 12/2003 |
| JP | A-2004-80336 | 3/2004 |
| JP | A-2004-88242 | 3/2004 |
| JP | A-2004-140799 | 5/2004 |
| JP | A-2004-147044 | 5/2004 |
| JP | A-2004-159267 | 6/2004 |
| JP | A-2004-192500 | 7/2004 |
| JP | A-2004-221956 | 8/2004 |
| JP | A-2004-234454 | 8/2004 |
| JP | A-2004-266859 | 9/2004 |
| JP | A-2004-297434 | 10/2004 |
| JP | A-2004-312367 | 11/2004 |
| JP | A-2005-38101 | 2/2005 |
| JP | A-2005-65067 | 3/2005 |
| JP | A-2005-101936 | 4/2005 |
| JP | A-2005-402126 | 4/2005 |
| JP | A-2005-513530 | 5/2005 |
| JP | A-2005-244411 | 9/2005 |
| JP | A-2005-269254 | 9/2005 |
| JP | A-2006-54691 | 2/2006 |

OTHER PUBLICATIONS

European Search Report mailed on Dec. 21, 2009 in corresponding European Patent Application No. 07767936.3.
Aug. 23, 2011 Office Action issued in Japanese Patent Application No. 2008-522661 (with translation).
Aug. 23, 2011 Office Action issued in Japanese Patent Application No. 2008-522660 (with translation).
Dec. 13, 2010 Office Action issued in U.S. Appl. No. 12/308,893.
Mar. 28, 2011 Office Action issued in European Patent Application No. 07 767 936.3.
Jan. 10, 2012 Office Action issued in Japanese Patent Application No. 2008-522660 (with English translation).
Jul. 19, 2012 European Office Action issued in European Application No. 07767936.3.
Apr. 24, 2012 Office Action issued in European Application No. 07767936.3.
May 21, 2013 Office Action issued in European Patent Application No. 07767936.3.

\* cited by examiner

"DISPLAY IMAGE ONLY" Selected

FIG.14
UNREAD EMAIL DISPLAY
| SENDER | SUBJECT | DATE AND TIME |
|---|---|---|
| MS. AKI | I'M MOVING... | 2005.12.20 |
| MS. MOMO | GOING ON A JOURNEY... | 2006.01.15 |
| MS. AKE | ARE YOU WELL? | 2006.03.20 |
| MS. AKE | SENDING A PHOTO! | 2006.03.20 |
| MS. NANA | RE: LET'S PLAY! | 2006.04.01 |
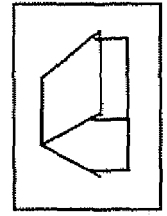
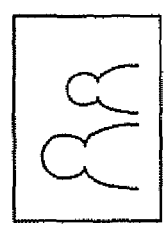
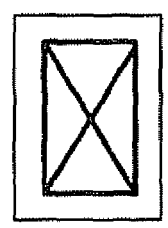
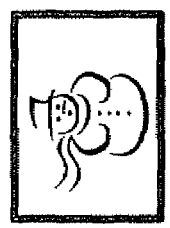
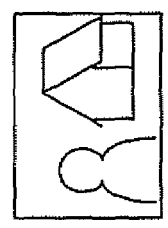

FIG.22

TEXT CREATION: AUTOMATIC CREATION

DEAR MS. NANA, THIS IS KUROBUTA. HERE IS A PHOTOGRAPH OF MS. MOMO TAKEN AT MS. AKE'S WEDDING RECEPTION PARTY. JULY 7, 2005 AT 19:35, ROPPONGI.

RETURN

EDIT

OK

104

DIGITAL CAMERA THAT SENDS ELECTRONIC MAIL WITH EVENT INFORMATION

TECHNICAL FIELD

The present invention relates to a digital camera that is endowed with a function of communication with an external device.

BACKGROUND ART

Sending and reception of electronic mail with attached image data have been performed by a portable telephone equipped with a camera from the past. Furthermore, it has also been proposed in the past to endow a digital camera with an electronic mail function.

Patent Document #1: Japanese Laid-Open Patent Publication No. 11-143803.

DISCLOSURE OF THE INVENTION

Problems to be Solved by the Invention

The main function of a digital camera is to photograph and to replay image data, and, in this aspect, it differs from a portable telephone.

The object of the present invention is to provide a control method suitable for a digital camera that sends and receives electronic mail with attached images.

Means for Solving the Problems

According to a first aspect of the present invention, a digital camera comprises an image-capturing unit that captures an image of a photographic subject and acquires image data, a communication unit for sending and receiving electronic mail data including image data, a recording control unit that records the image data acquired by the image-capturing unit as photographed image data upon a recording medium, an email for sending creation unit that creates an email for sending, for causing the communication unit to send the electronic mail data, to which is attached an image to be sent based upon the photographed image data recorded upon the recording medium, and an email address setting unit that sets an email address as the destination of the email for sending that has been created by the email for sending creation unit, and the email for sending creation unit creates a title or a text of the email for sending, based upon at least one of the photographed image data and the email address that has been set by the email address setting unit.

According to a second aspect of the present invention, in the digital camera of the first aspect, it is preferable that the email for sending creation unit creates the title or the text of the email for sending based upon photographic information included in the photographed image data or information about the photographic subject that is specified based upon the photographed image data.

According to a third aspect of the present invention, in the digital camera of the second aspect, the digital camera may further comprise an event information storage unit that stores event information that is set according to date and time. In this digital camera, it is preferable that the email for sending creation unit creates the title or the text of the email for sending based upon photographic information included in the photographed image data and the event information stored in the event information storage unit.

According to a fourth aspect of the present invention, in the digital camera of any one of the first through third aspects, the digital camera may further comprise a position information acquisition unit that acquires position information. In this digital camera, it is desirable that the email for sending creation unit creates the title or the text of the email for sending based upon at least one of the photographed image data, the email address, and the position information acquired by the position information acquisition unit when the photographed image data was acquired by the image capturing unit.

According to a fifth aspect of the present invention, in the digital camera of the fourth aspect, the digital camera may further comprise a map information acquisition unit that acquires map information that specifies a position of photography based upon the position information acquired by the position information storage unit. In this digital camera, it is preferable that the email for sending creation unit creates the email for sending, to which are attached the image to be sent and the map information acquired by the map information acquisition unit.

According to a sixth aspect of the present invention, in the digital camera of any one of the first through fifth aspects, the digital camera may further comprise an editing unit that, according to user actuation, edits the title or the text of the email for sending created by the email for sending creation unit.

According to a seventh aspect of the present invention, in the digital camera of any one of the first through sixth aspects, the digital camera may further comprise an aspect ratio changing unit that changes an image aspect ratio of the photographed image data, according to the email address set by the email address setting unit. In this digital camera, it is preferable that the email for sending creation unit creates the email for sending to which is attached the image to be sent based upon the photographed image data of which the image aspect ratio has been changed by the aspect ratio changing unit.

According to an eighth aspect of the present invention, in the digital camera of the seventh aspect, if an email address of a portable telephone is set by the email address sending unit, it is desirable that the aspect ratio changing unit changes the image aspect ratio of the photographed image data so that the vertical dimension of the image becomes longer than its horizontal direction.

According to a ninth aspect of the present invention, a digital camera comprises an image-capturing unit that captures an image of a photographic subject, a communication unit for sending and receiving electronic mail data including image data, an attaching unit that attaches the image data captured by the image-capturing unit to an electronic mail, and a limitation unit that limits the number and/or the volume of items of the image data attached by the attaching unit according to the address for sending.

Advantageous Effect of the Invention

According to the present invention it is possible to provide a control method suitable for a digital camera that sends and receives electronic mail with attached images.

BRIEF DESCRIPTION OF THE DRAWINGS

FIG. 14 is a figure showing an example of a screen display that is displayed upon the monitor 104 of the digital camera 1;

FIG. 22 is a figure showing an example of a screen display that is displayed upon the monitor 104 of the digital camera 1;

BEST MODE FOR CARRYING OUT THE INVENTION

A digital camera and a camera system according to an embodiment of the present invention will now be explained in the following with reference to the drawings.

First, a camera system according to an embodiment of the present invention will be explained.

Figure 1:
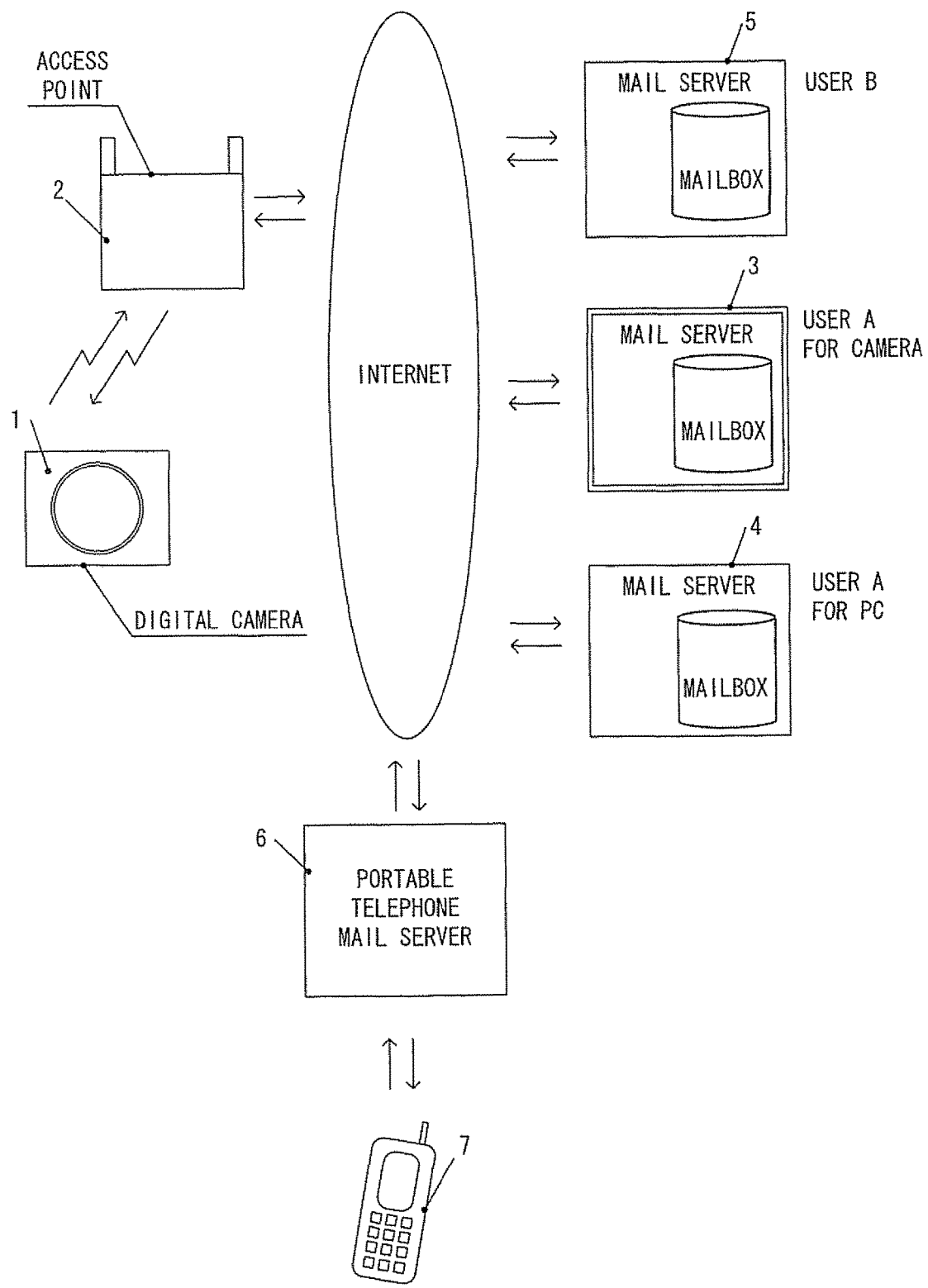
FIG. 1 is a figure for explanation of the functioning of a camera system according to an embodiment of the present invention.

FIG. 1 is a figure for explanation of the functioning of a camera system according to an embodiment of the present invention. In FIG. 1, the camera system includes a digital camera 1, an access point 2, a mail server 3, a mail server 4, a mail server 5, a portable telephone mail server 6, a portable telephone 7, and so on. The access point 2 and the various mail servers 3, 4, and 5 are capable of mutual communication via a network such as the internet or the like.

This digital camera 1 is endowed with a function of communicating with an external device by wireless, and moreover is endowed with a function of sending and receiving electronic mail. These functions of the digital camera 1 will now be explained in detail using FIGS. 2 and 3. The access point 2 is a device for making it possible for a device having a wireless communication function, such as the digital camera 1 or the like, to be able to communicate using a network such as the internet or the like.

The mail servers 3, 4, and 5 are mail servers that are administered by an internet provider. The mail server 3 is set by a user A of the digital camera 1 to be a mail server for sending and reception of email. The mail server 4 is set by the user A of the digital camera 1 to be a mail server for sending and reception of email by a personal computer that the user A possesses. And the mail server 5 is set by a user B, who is different from the user A, to be a mail server for sending and reception of email.

The portable telephone mail server 6 is an mail server for a portable telephone that is administered by a portable telephone business company. This is set to be a mail server for sending and reception of email by a portable telephone that is possessed by a user C who is different from the users A and B. And the portable telephone 7 is a portable telephone that is endowed with the function of acting as a digital camera, and is capable of sending and reception of image data by attaching image data to an email that uses its email function.

Next, this digital camera 1 according to an embodiment of the present invention will be explained.

Figure 2:
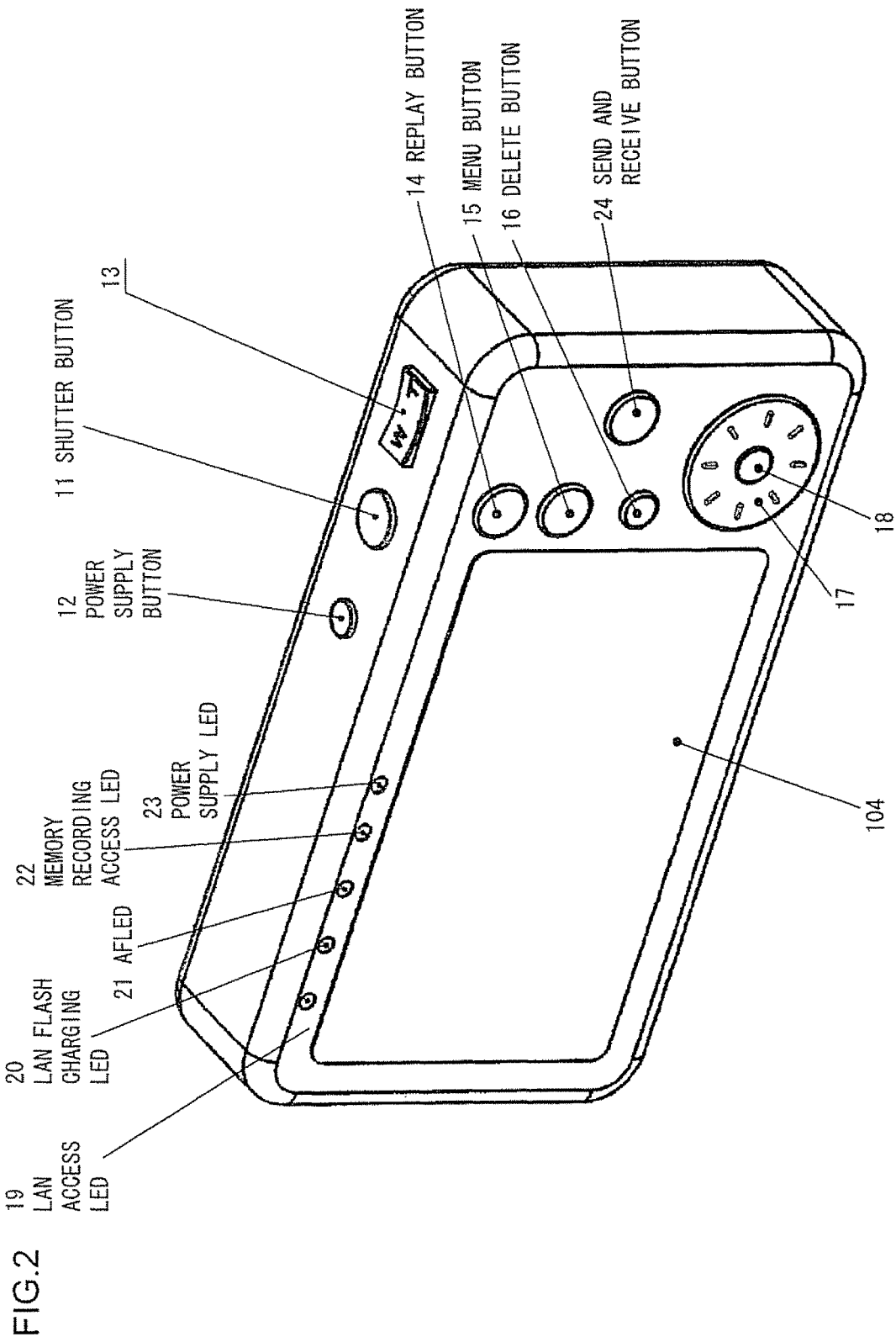
FIG. 2 is a figure showing the external appearance of a digital camera 1 according to an embodiment of the present invention.

FIG. 2 is a figure showing the external appearance of the digital camera 1 according to an embodiment of the present invention. In FIG. 2, the digital camera 1 includes a shutter button 11, a power supply button 12, a zoom button 13, a replay button 14, a menu button 15, a delete button 16, a jog dial 17, a confirm button 18, an LED for wireless access 19, an LED for flash charging 20, an LED for AF 21, an LED for memory access 22, an LED for power supply 23, a monitor 104, and so on.

The shutter button 11 is a button that is actuated when photography is to be performed, and it includes two stages of switches, a half press switch and a full press switch. The power supply button 12 is a button that is actuated when the main power supply of the digital camera 1 is to be turned ON or OFF. And the zoom button 13 is a button for varying the focal distance of the photographic lens during photography. Moreover, it is also actuated for electronic zooming during photography and during replay.

The replay button 14 is a button that is actuated when replaying data that is recorded in the memory. The menu button 15 is a button for reading out a menu screen. The delete button 16 is a button for deleting data that is recorded in the memory. And it is possible to shift a cursor or the like by rotational actuation of the jog dial 17.

The confirm button 18 is a button that is actuated when performing confirmation of settings upon a menu screen or the like. The LED for wireless access 19 is a display device that is illuminated during communication by wireless, for informing the user that communication is taking place. And the LED for flash charging 20 is a display device that is illuminated during charging of a flash, and is a display device for informing the user that charging of the flash is taking place.

The LED for AF 21 is a display device for informing the user of the focus adjustment state controlled by AF. Moreover, when the camera is not in photography mode, this LED for AF 21 also serves as a display device for informing the user of the presence or absence of unread email. The LED for memory access 22 is a display device that is illuminated during memory access, in other words when data is being written into the memory, and moreover when data is being read in from the memory. The LED for power supply 23 is a display device that is illuminated when the power supply of the digital camera 1 is in the turned ON state. The monitor 104 is a color display device such as an LCD or the like, and serves as a viewfinder during photography, while also displaying image data that has been photographed and displaying various screens for menu screen display and the like. And a send and receive button 24 is a button that is actuated when performing sending and reception of email by manual actuation.

Figure 3:
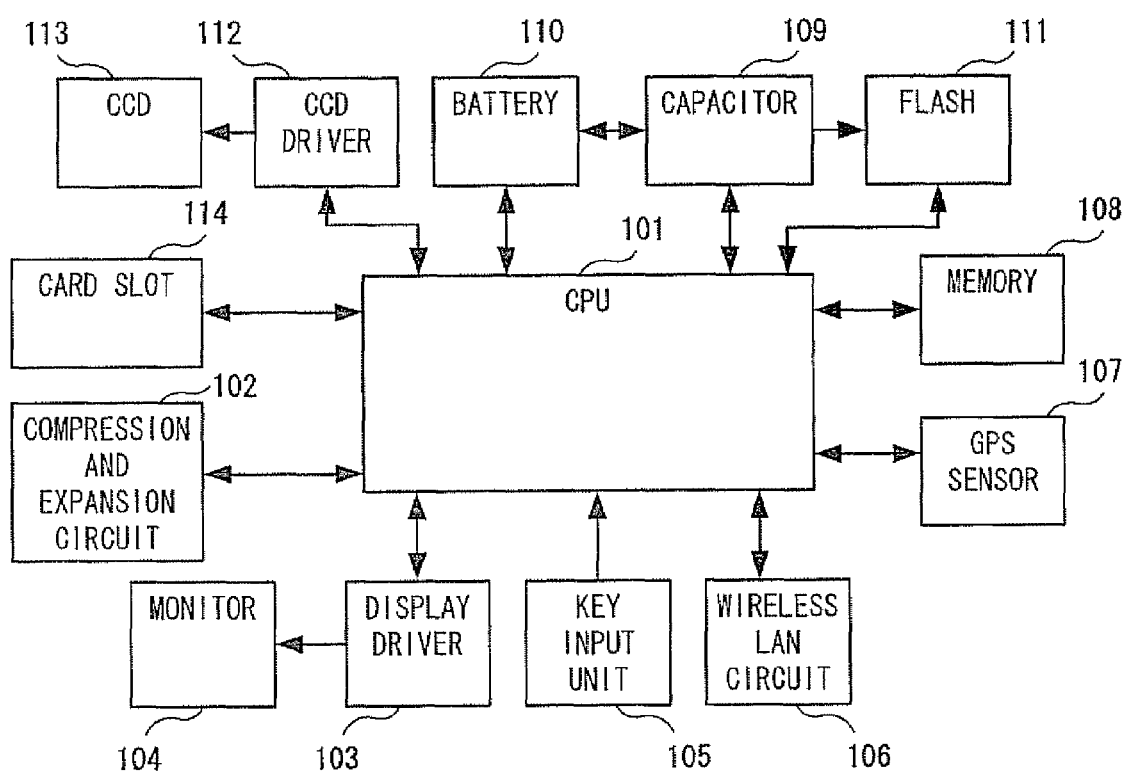
FIG. 3 is a functional block diagram for explanation of the functioning of this digital camera 1 according to an embodiment of the present invention.

FIG. 3 is a functional block diagram for explanation of the functioning of the digital camera 1 according to an embodiment of the present invention.

This digital camera 1 includes a CPU 101 and so on.

The CPU 101 is a circuit that controls various types of processing executed by the digital camera 1. A compression and expansion circuit 102 is a circuit that performs compression and expansion of image data that has been captured, and of image data that has been received by email. A display driver 103 is a drive circuit that controls the image to be displayed upon the monitor 104. And a key input unit 105 is a circuit that detects actuation of the buttons, switches, dials and so on that are provided to this digital camera 1.

A wireless LAN circuit 106 is a communication circuit for performing communication with an external device by wireless. Electronic mail data including image data is sent and received by communication performed by this wireless LAN circuit 106. By doing this, sending and reception of email is performed by the digital camera 1. A GPS sensor 107 detects positional information. And a memory 108 is a non-volatile semiconductor memory, and stores programs executed by the CPU 101 and various types of setting data and the like.

A capacitor 109 receives electrical power from a battery 110 and is thereby charged, and is used for light emission by a flash 111. Moreover, it is used as a backup power supply for driving the camera during an emergency. The battery 110 is a power supply such as a lithium ion battery or the like, and supplies the necessary electrical power for operating the digital camera 1.

By irradiating auxiliary light upon the photographic subject, the flash 111 makes it possible to perform photography even in a darker environment. The CCD driver 112 is a circuit for driving a CCD 113. The CCD 113 is an image sensor for capturing an image of the photographic subject via a photographic lens. And a memory card, which is a recording medium, can be fitted to or removed from a card slot 114, which is a device for writing data upon the memory card, or reading in data from the memory card.

Image data that has been acquired by the CCD 113 capturing an image of the photographic subject is recorded upon the memory card as photographic image data, under the control of the CPU 101. Moreover, under the control of the CPU 101, image data included in electronic mail data that has been received by the wireless LAN circuit 106 is recorded upon the memory card as received image data.

Next, the operation of this digital camera 1 will be explained.

First, the control for replay of image data by the digital camera 1 will be explained.

Figure 4:
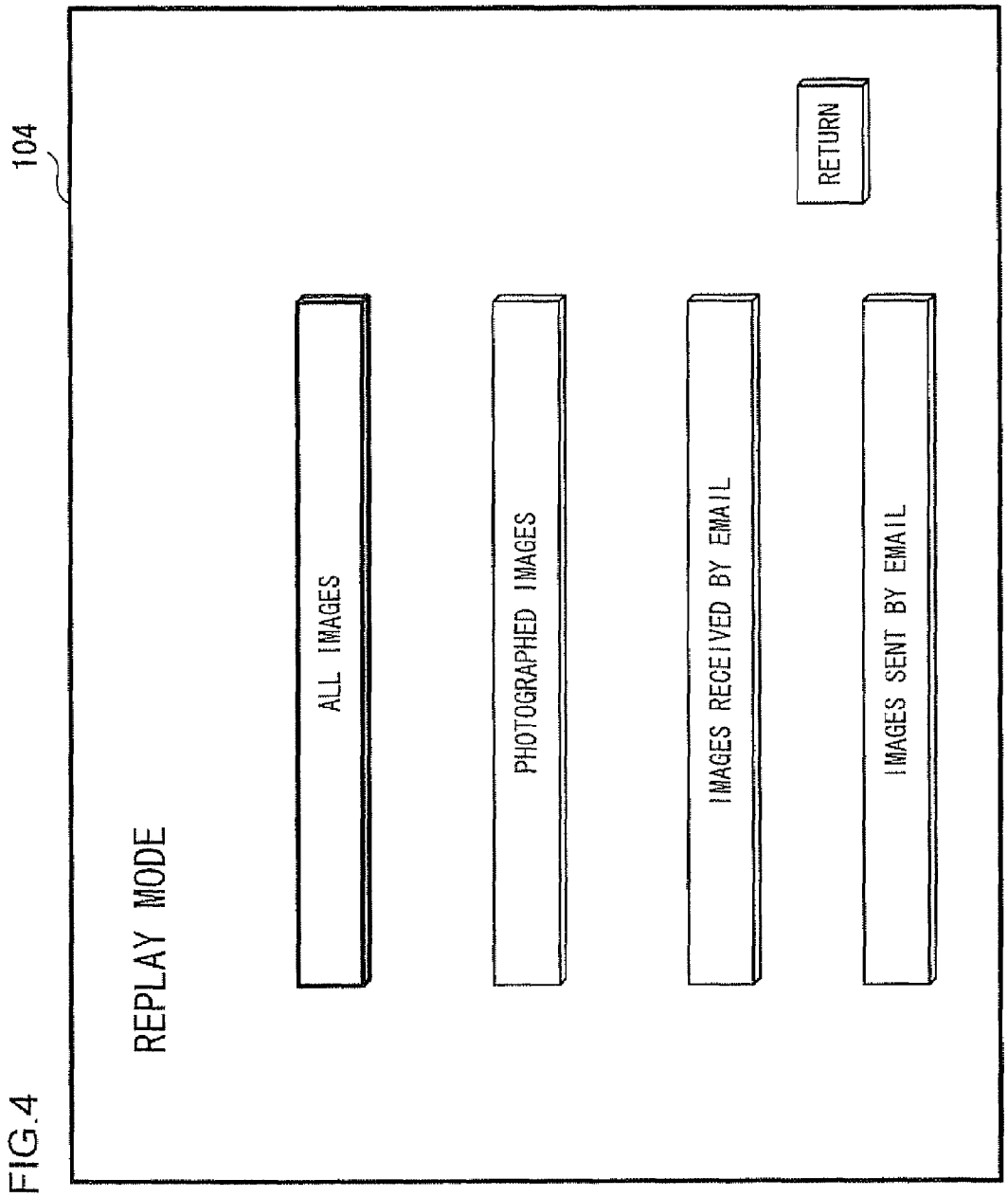
FIG. 4 is a figure showing an example of a screen display that is displayed when the digital camera 1 has changed over to a replay mode.

By the replay button 14 being actuated by the user, the digital camera 1 is changed over to the replay mode. FIG. 4 is a figure showing an example of a screen display that is displayed when the digital camera has changed over to the replay mode. When "all images" is selected by the user upon the screen display shown in FIG. 4, then the mode changes over to a mode in which all of the images that are recorded upon the memory card are replayed, including both the photographic images that are stored within the digital camera 1 and also the images that have been received by email. Furthermore, when "photographed images" is selected, then the mode changes over to a mode in which, among the images that are stored in the digital camera 1, only the photographic images are extracted and replayed, but not the images that have been received by email. Moreover, when "images received by email" is selected, then the mode changes over to a mode in which, among the images that are stored in the digital camera 1, only the images that have been received by email, in other words the images that have been attached to received emails based upon electronic mail data received by the wireless LAN circuit 106 and that have been recorded upon the memory card, are extracted and replayed. And, when "images sent by email" is selected, then the mode changes over to a mode in which, among the images that are stored in the digital camera 1, only the images that have been sent by email are extracted and replayed.

Figure 5:
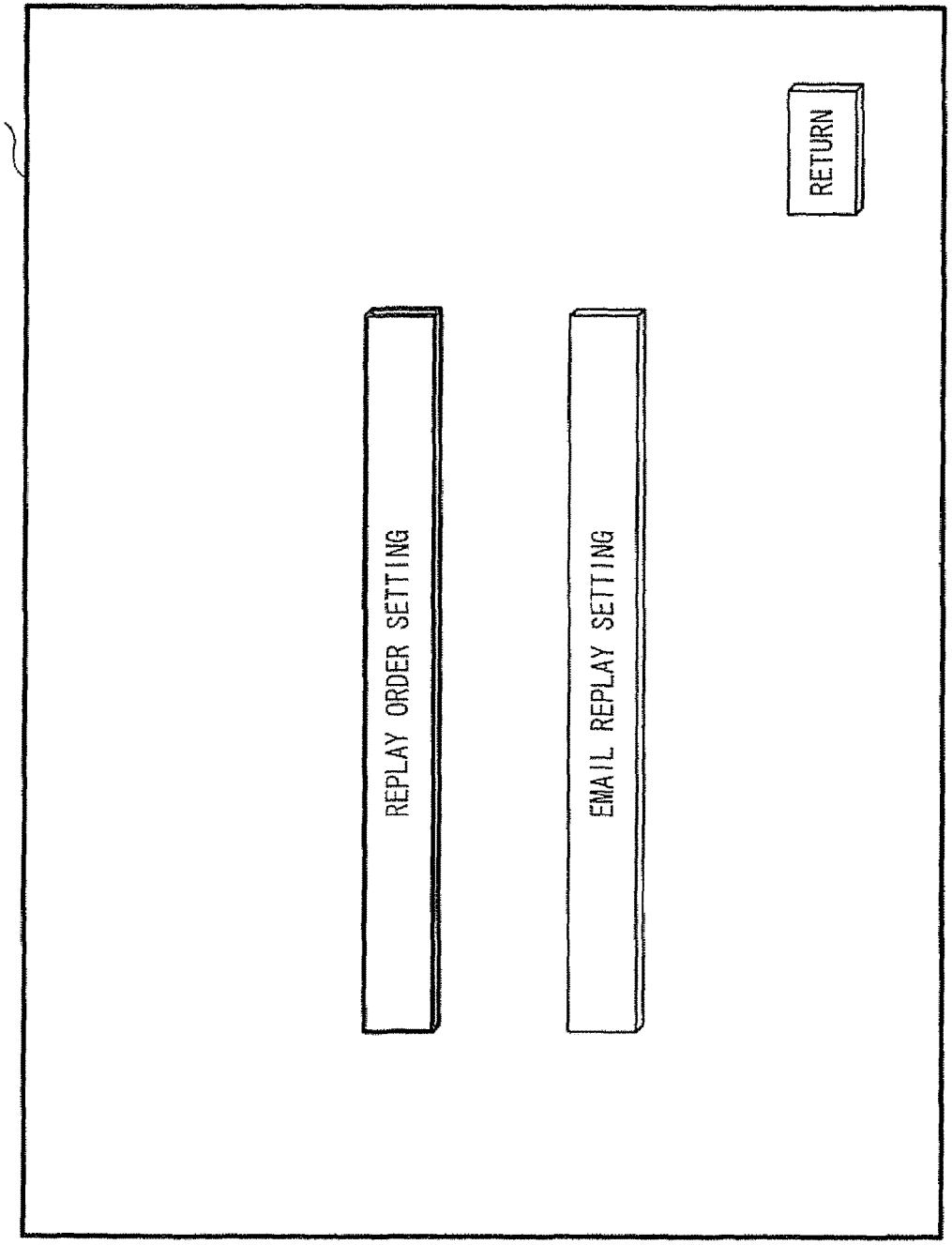
FIG. 5 is a figure showing an example of a screen display of options that can be set as the method of replaying image data recorded in the digital camera.

Moreover, when the menu button 15 is actuated by the user in the state in which the screen shown in FIG. 4 is being displayed, the screen changes over to displaying the screen shown in FIG. 5. FIG. 5 is a figure showing an example of a screen display of options that can be set for the method of replaying image data recorded within the digital camera 1.

Figure 6:
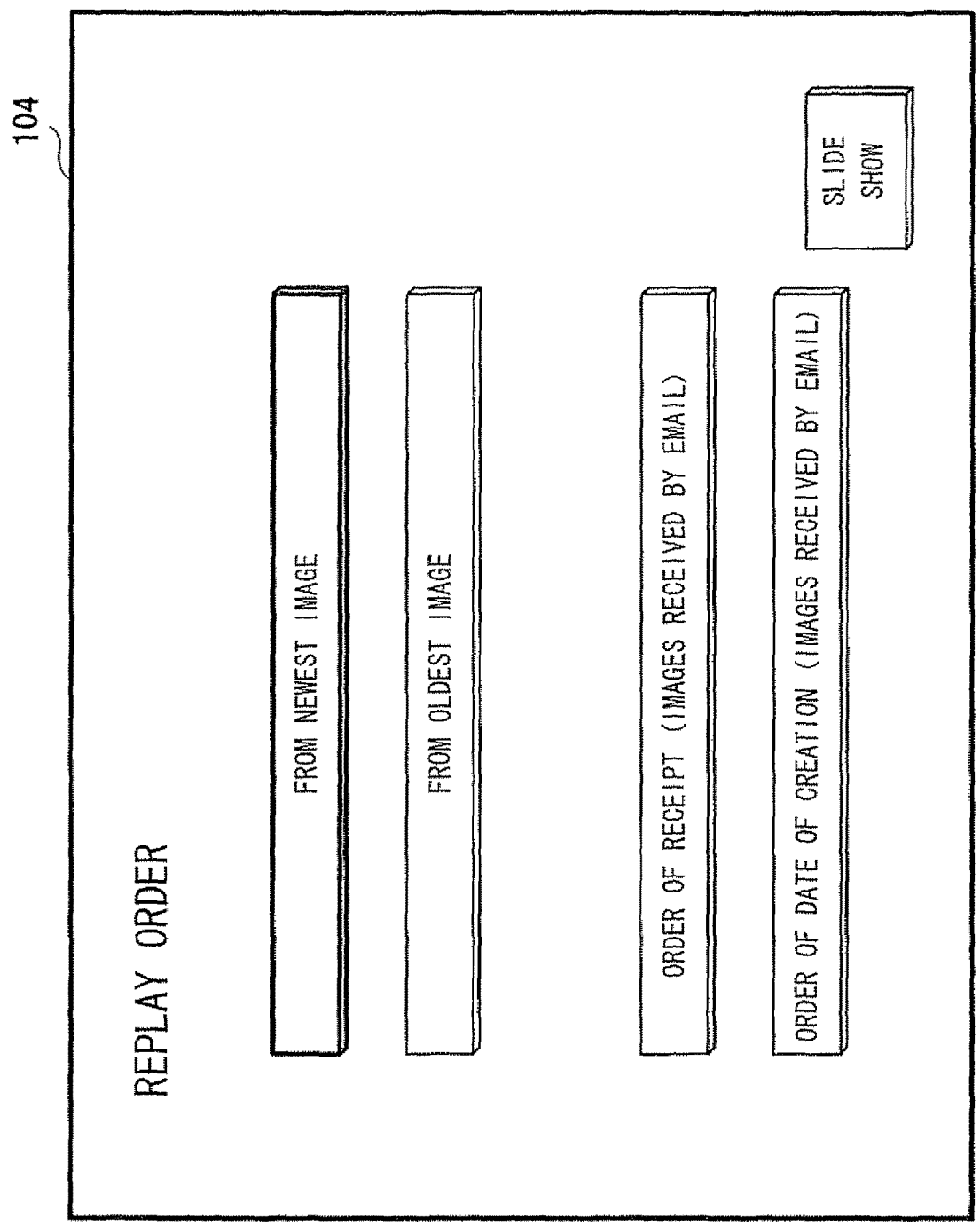
FIG. 6 is a figure showing an example of a menu screen that is displayed for setting the replay order of images to be replayed.

When "replay order" is selected by the user in the state in which the screen shown in FIG. 5 is being displayed, the screen changes over to displaying the screen shown in FIG. 6. FIG. 6 is a figure showing an example of a menu screen that is displayed for setting the replay order of the images to be replayed. When "from newest image" and "order of receipt (email images)" are selected by the user upon the screen display shown in FIG. 6, then the images that have been photographed are replayed in order from the one whose date and time of photography are the most recent, and the images that have been received by email are replayed in order from the one whose date and time of receipt are the most recent. For example, if a photographed image A whose date and time of photography are Mar. 25, 2005, a photographed image B whose date and time of photography are May 5, 2005, an image C received by email whose date and time of email receipt are Apr. 10, 2005, and an image D received by email whose date and time of email receipt are 23 May 2005, are recorded within the digital camera 1, then these images are replayed in the order: the image received by email D—the photographed image B—the image received by email C—the photographed image A. On the other hand, if "from oldest image" and "order of receipt (email images)" are selected, then, conversely to the case described above, the photographed images are replayed in order from the one whose date and time of photography is the oldest, and the images that have been received by email are replayed in order from the one whose date and time of receipt are the oldest.

Furthermore, when not "order of receipt (email images)" but rather "order of date and time of creation (email images)" has been selected by the user, then the images received by email that have been attached to emails are replayed in the order of the date and time that they were created by the persons who sent those emails. For example, a person who sends an email may photograph an image of a photographic subject and may thereby acquire image data, and may then attach this image data to an email that he sends to the digital camera 1. In this case, since the date and time at which this received image that has been recorded in the digital camera 1 was photographed by the person who sent the email become the date and time of its creation, accordingly the image that has been received by email is replayed in the order of the date and time when it was photographed.

In this manner, it is possible to select the replay order for the images received by email to be either the order of their email receipt or the order of the date and time of their creation. And, according to the result of this selection, it is arranged to set the replay sequence on the basis of the date and time of receipt of the emails, or on the basis of the date and time of creation of the received images by the persons who sent the emails, and to display the plurality of received images in the order that corresponds to the replay sequence that has been set. By doing this, it is possible for the user to appreciate the images received by email with good efficiency in the order that he desires.

In the following, the control of replay of images recorded within the digital camera 1 will be explained.

Figure 7:
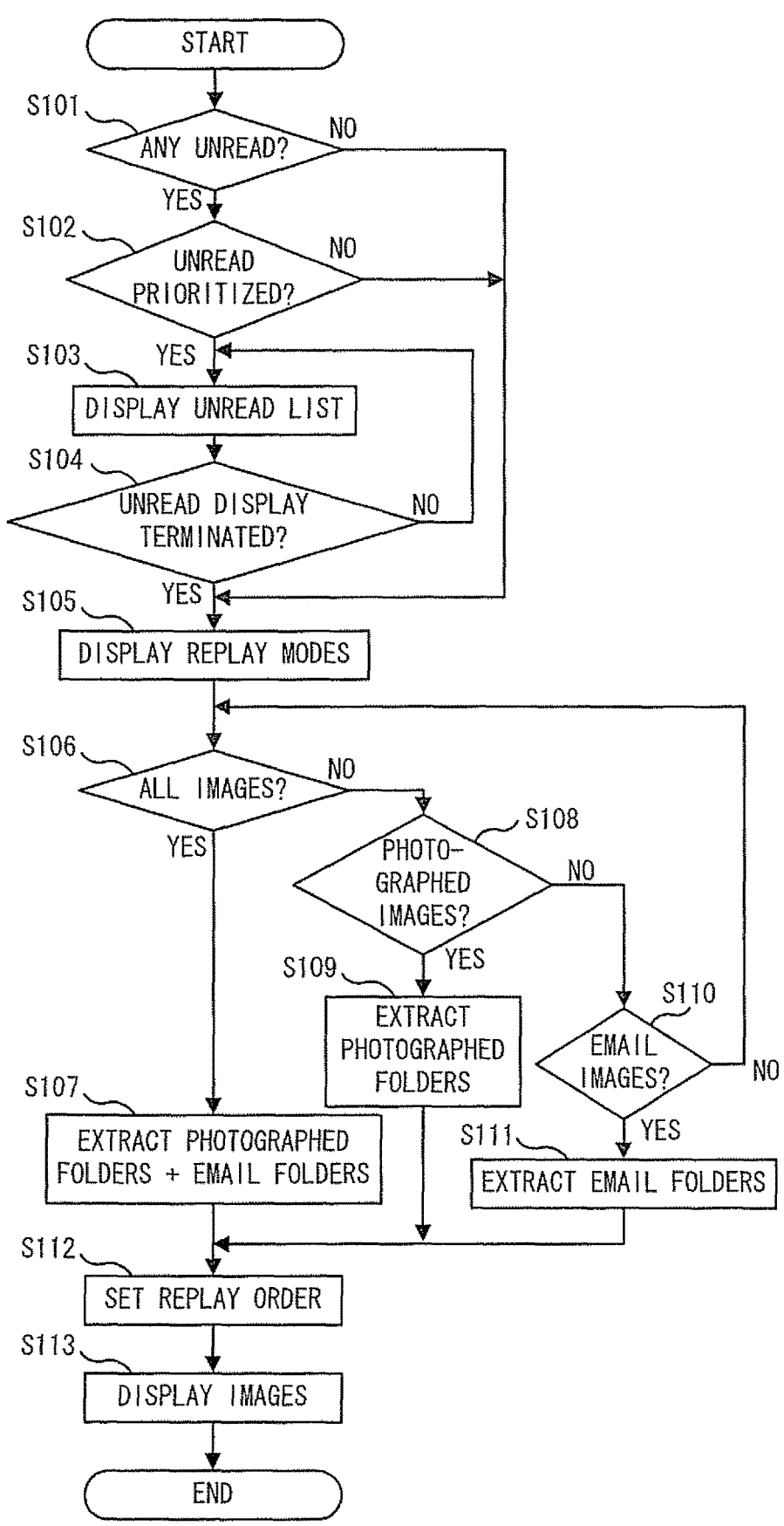
FIG. 7 is a flow chart showing replay control that is executed by a CPU 101 of the digital camera 1.

FIG. 7 is a flow chart showing the replay control that is executed by the CPU 101 of the digital camera 1. This flow is started by the replay button 103 being actuated by the user.

First, in a step S101, a decision is made as to whether or not any unread email that has been received is present. If unread email is present, then the flow of control proceeds to a step S102, whereas if no unread email is present then the flow of control is transferred to a step S105.

And, in the step S102, a decision is made as to whether or not the unread email is set to have priority. The setting for prioritizing unread email is set upon a screen shown in FIG. 8. The settings upon the screen display shown in FIG. 8 will be described hereinafter.

Figure 15:
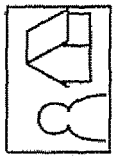
FIG. 15 is a figure showing an example of a screen display that is displayed upon the monitor 104 of the digital camera 1.

In a step S103, as shown in FIG. 14 or 15, a list of the unread emails is displayed upon the monitor 104. On this unread email list screen, for those emails among the received emails that are unread, along with the senders and the titles of the emails, there is displayed a list of thumbnail images consisting of the received images that are attached to the emails, shrunk down. By displaying the received images that are attached to unread email in this manner, in other words by displaying, as a priority, those received images that have not been replayed in the past, it is possible for the user to check these received images immediately.

Figure 16:
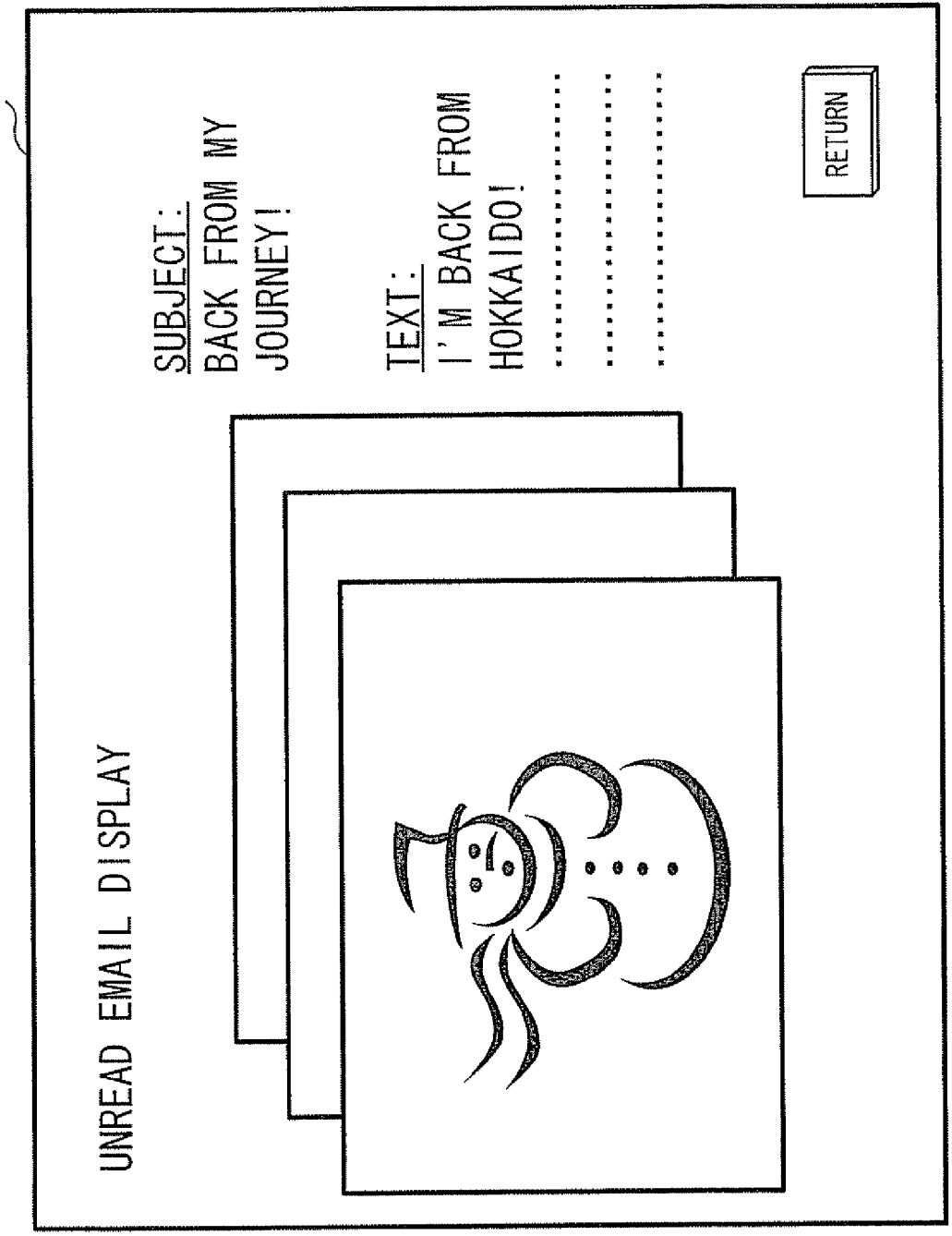
FIG. 16 is a figure showing an example of a screen display that is displayed upon the monitor 104 of the digital camera 1.
Figure 17:
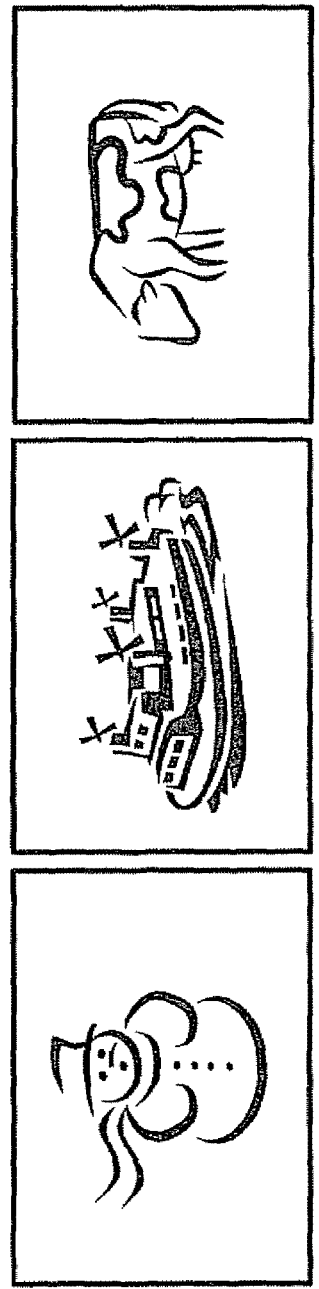
FIG. 17 is a figure showing an example of a screen display that is displayed upon the monitor 104 of the digital camera 1.

When an email is selected upon the unread email list screen of FIG. 14 or FIG. 15, then a screen like the one shown in FIG. 16 or 17 is displayed. By doing this, the image that is appended to the received email and the text of the email are displayed. It should be understood that it is also possible to select an email by selecting an image that is being displayed as a thumbnail.

In a step S104, it is detected whether or not actuation has been performed by the user to terminate the display of the unread mail list. If termination actuation has been detected then the flow of control proceeds to a step S105, whereas if such actuation has not been detected then the flow of control returns to the step S103. In the step S105, replay mode display is performed by displaying the screen shown in FIG. 4 upon the monitor 104.

And, in a step S106, a decision is made as to whether or not "all images" has been selected by the user upon the screen shown in FIG. 4. If this is detected then the flow of control proceeds to a step S107, whereas if it is not detected then the flow of control is transferred to a step S108.

Next, in the step S107, the data for all of the images recorded within the digital camera 1 is extracted as the subject for replay.

On the other hand, in the step S108, a decision is made as to whether or not "photographed images" has been selected by the user upon the screen shown in FIG. 4. If this is detected then the flow of control proceeds to a step S109, whereas if it is not detected then the flow of control is transferred to a step S110. Next, in the step S109, among the image data recorded within the digital camera 1, the image data for all of the images, except those images that were received by email, is extracted as the subject for replay.

Moreover, in the step S110, a decision is made as to whether or not "images received by email" or "images sent by email" has been selected by the user upon the screen shown in FIG. 4. If this is detected then the flow of control proceeds to a step S111, whereas if it is not detected then the flow of control returns to the step S106. And, in the step S111, among the image data recorded within the digital camera 1, the image data for all of the images that were received by email, or that were sent by email, is extracted as the subject for replay. At this time, if "images received by email" was selected, then the data for the images that were received by email is extracted, whereas, if "images sent by email" was selected, then the data for the images that were sent by email is extracted.

And, in the step S112, a replay order is set for the image data that has been extracted, according to the replay order that was selected upon the screen shown in FIG. 6. Next, in a step S113, the image data set to be initially displayed in the replay order is displayed.

According to this replay control as described above, it is possible to select either for all of the image data within the digital camera 1 that is recorded upon the memory card to be taken as being the subject of replay, or for only the photographed images to be taken as being the subject for replay, or for only the images that were received by email to be taken as being the subject for replay, or for only the images that were sent by email to be taken as being the subject for replay. And, if "photographed images" or "images received by email" has been selected, then, according to the result of this selection, the CPU 101 extracts either the data for the photographed images or the data for the received images, and replays either the photographed images or the images received by email on the basis of the image data that has been extracted, thereby replays the photographed images and the images received by email distinguishably. By thus performing replay display for the image data that is recorded upon the memory card in the digital camera 1 while classifying the image data into data for images that have been photographed and data for images that were received by email, it is possible to respond to the wish of the user to appreciate only those images that were photographed, or to appreciate only those images that were received by email.

It should be understood that it would also be acceptable to arrange to display an image similar to FIG. 14 or FIG. 15, in which received emails are listed, if "images received by email" has been selected. In the same manner, it would also be acceptable to arrange to display an image similar to FIG. 14 or FIG. 15, in which emails that have been sent are listed, if "images sent by email" has been selected.

Figure 8:
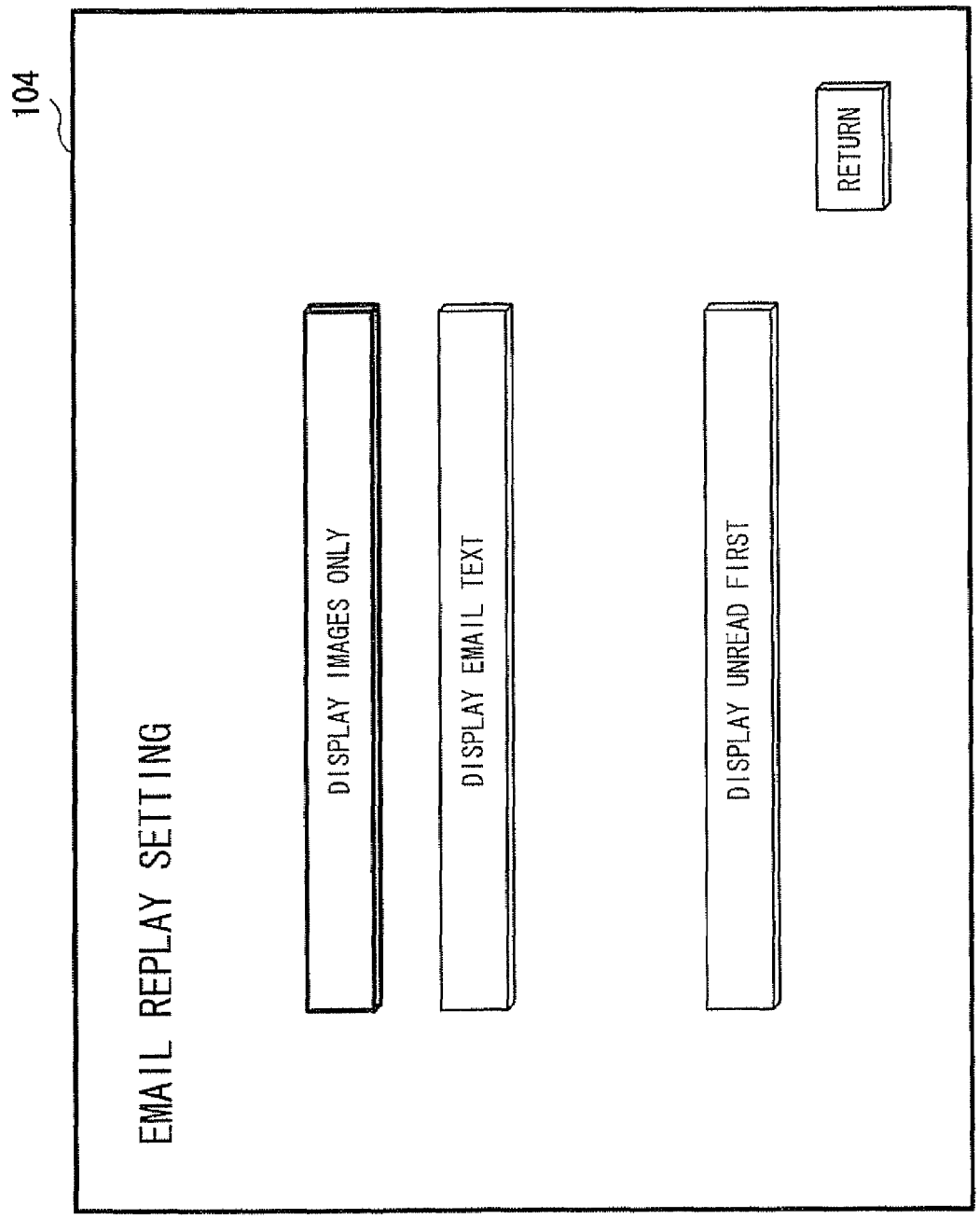
FIG. 8 is a figure showing an example of a screen display that is displayed upon a monitor 104 of the digital camera 1.
Figure 9:
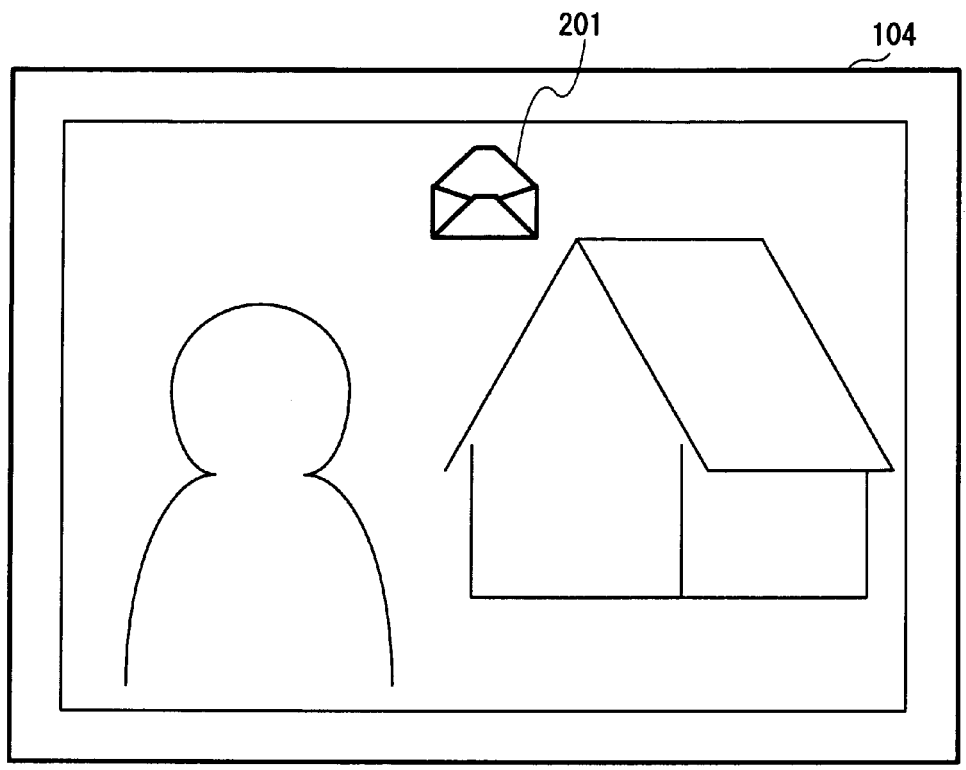
FIG. 9 is a figure showing an example of a screen display that is displayed upon the monitor 104 of the digital camera 1.

Furthermore if "email replay settings" is selected by the user in the state in which the screen shown in FIG. 5 is being displayed, then the screen changes over to displaying the screen shown in FIG. 8. FIG. 8 is a figure showing an example of display of a menu screen for setting the method for replaying images received by email that are to be replayed. When, upon the screen display shown in FIG. 8, "display images only" is selected by the user, then, as shown in the screen display of FIG. 9, the email texts are not displayed, but rather the images that were received in the emails are replayed full screen upon the entire monitor 104, in a similar manner to the case when a photographed image is being displayed. Moreover, when "display images only" has been selected, emails to which no images are attached are not replayed.

Figure 10:
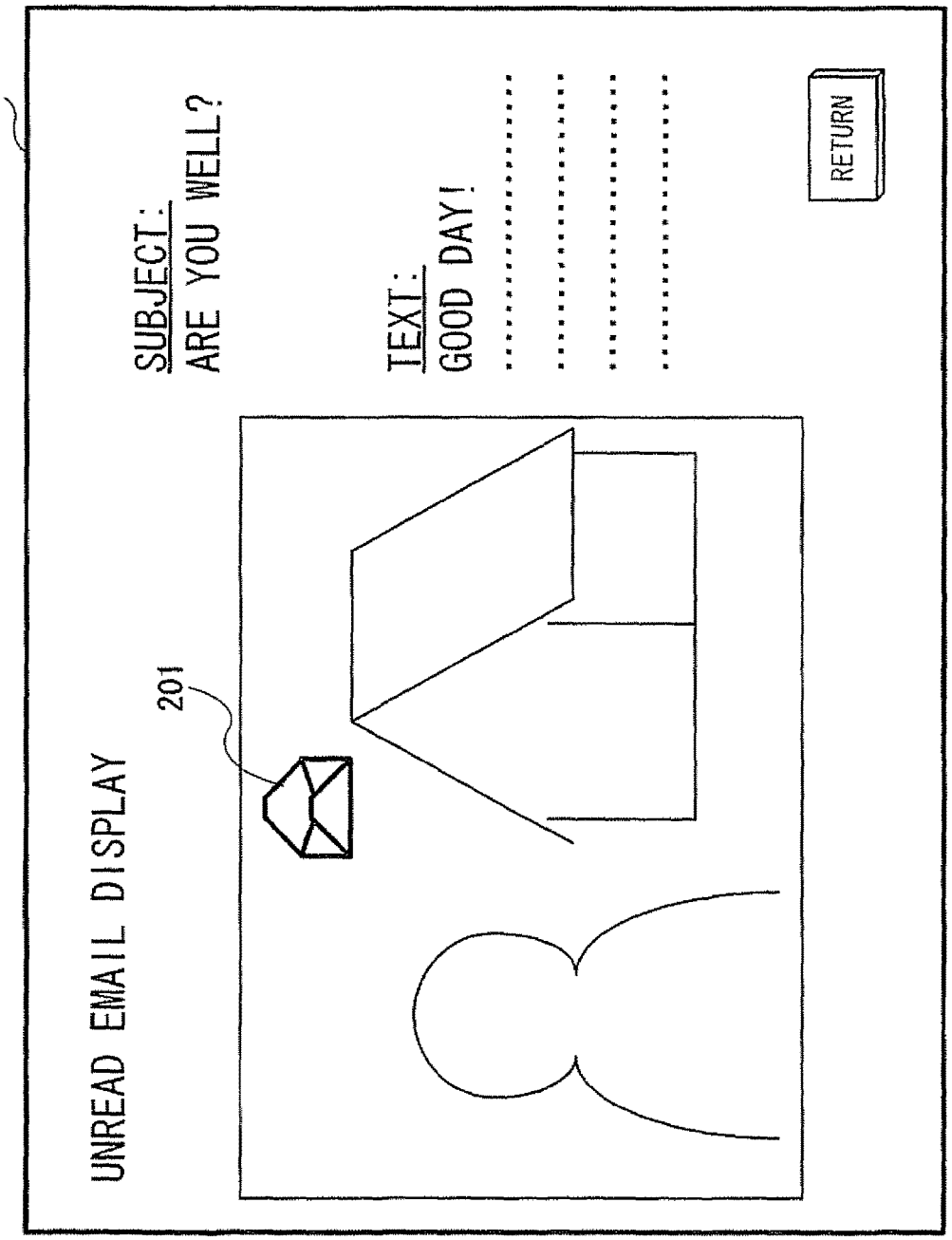
FIG. 10 is a figure showing an example of a screen display that is displayed upon the monitor 104 of the digital camera 1.

On the other hand when "display email text" is selected by the user on the screen display shown in FIG. 8, then, as in the screen display example shown in FIG. 10, the email texts are displayed along with the images that were received by email.

Figure 11:
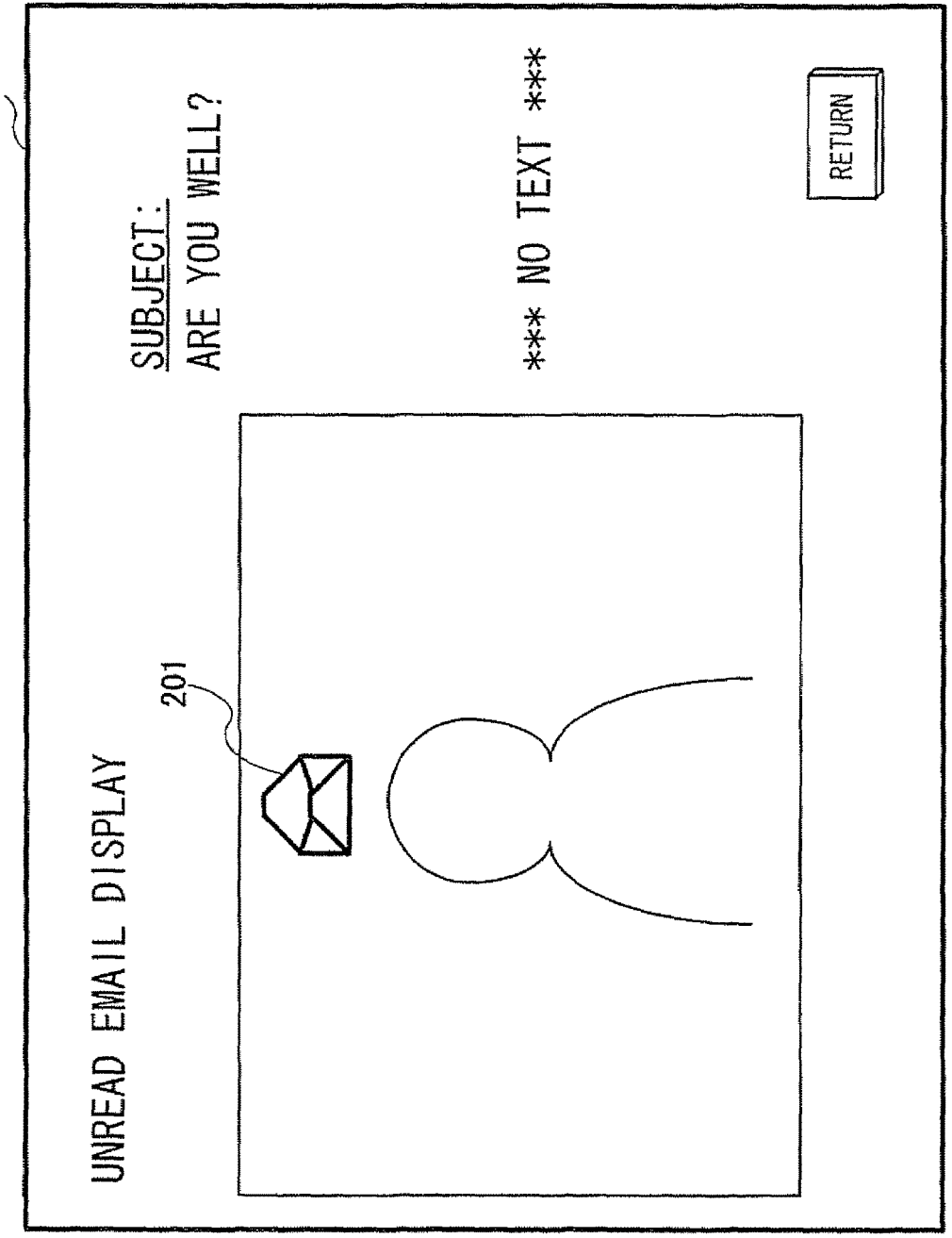
FIG. 11 is a figure showing an example of a screen display that is displayed upon the monitor 104 of the digital camera 1.

In addition, if "display email text" has been selected, then even emails to which no images are attached are displayed. Moreover, emails to which images are attached but that have no email text are also displayed, as in the screen display example shown in FIG. 11.

It should be understood that since, in this embodiment, an embodiment is being explained in which the present invention is applied to a digital camera, accordingly, even if "display email text" has been selected, because the design gives priority to the replaying of images, it is arranged to replay even images attached to emails that have no email text. However, if for example the present invention is implemented upon a portable telephone equipped with a camera, then, if "display email text" has been selected, emails that have no email text are not displayed.

Figure 12:
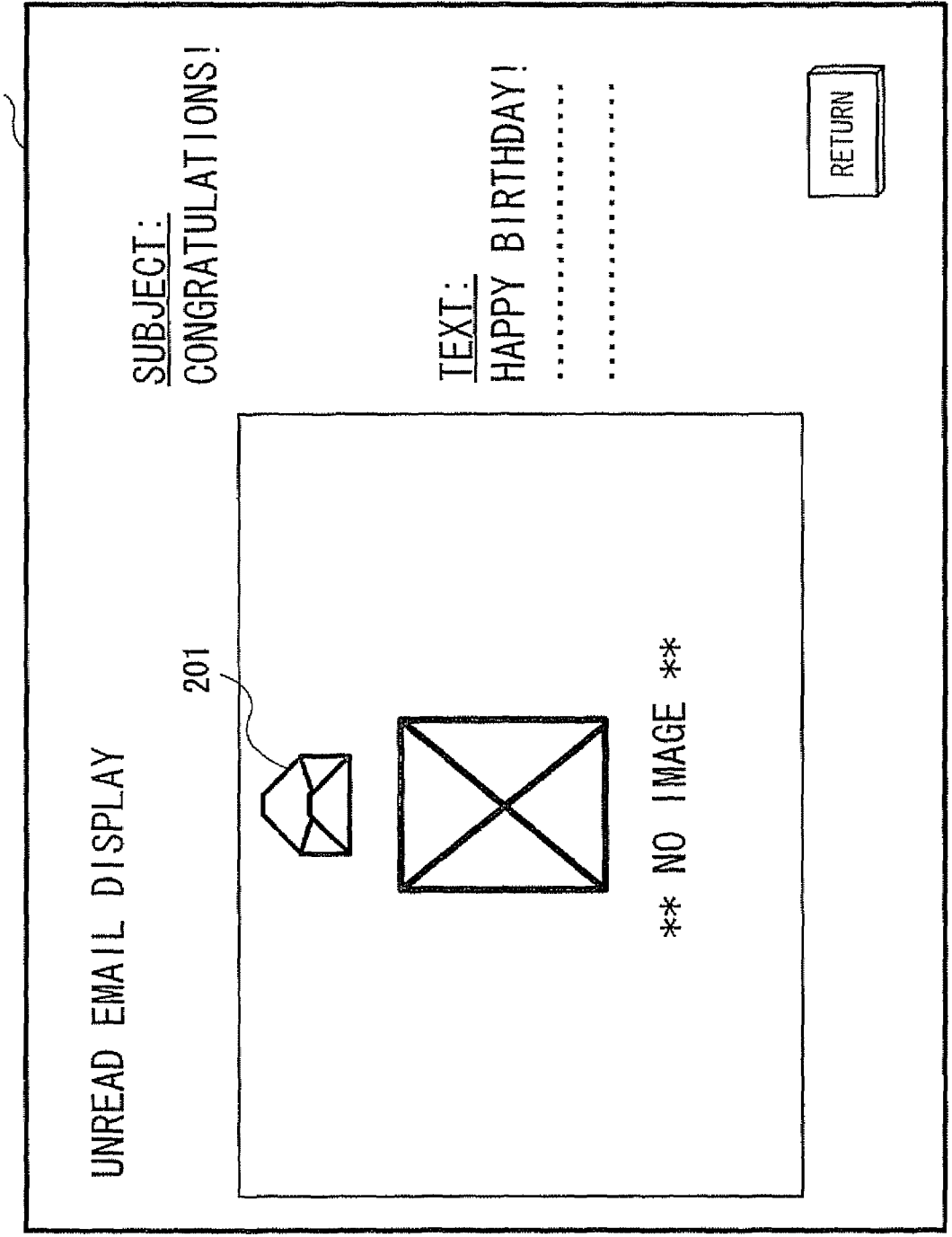
FIG. 12 is a figure showing an example of a screen display that is displayed upon the monitor 104 of the digital camera 1.

Furthermore, whether "display images only" is selected or "display email text" is selected, the user is able to select "display unread first". When "display unread first" is selected by the user, the replay of unread email is prioritized, whatever may be the replay mode selection setting for replay mode or for "replay order". Moreover, even if "display images only" is selected, unread emails to which no images are attached are still displayed, as in the screen display example shown in FIG. 12. And, when replaying the unread emails, the email texts are always displayed along with the images, in order for the user to read the email texts, as in the screen display example shown in FIG. 10.

It should be understood that, in the screen examples of FIGS. 9 through 12 explained above, along with the received images that are attached to the emails, a received email icon 201 is displayed, which is a mark for showing the type of this image.

Next, the email creation control executed by this digital camera 1, for creating an email for sending to which image data is attached, will be explained.

It is possible to append an email title (i.e. subject), email text, and image data as attached data to an email that is created by the digital camera 1.

First, the methods for selecting image data to be attached, and for creating an email address and email text, will be explained.

Figure 18:
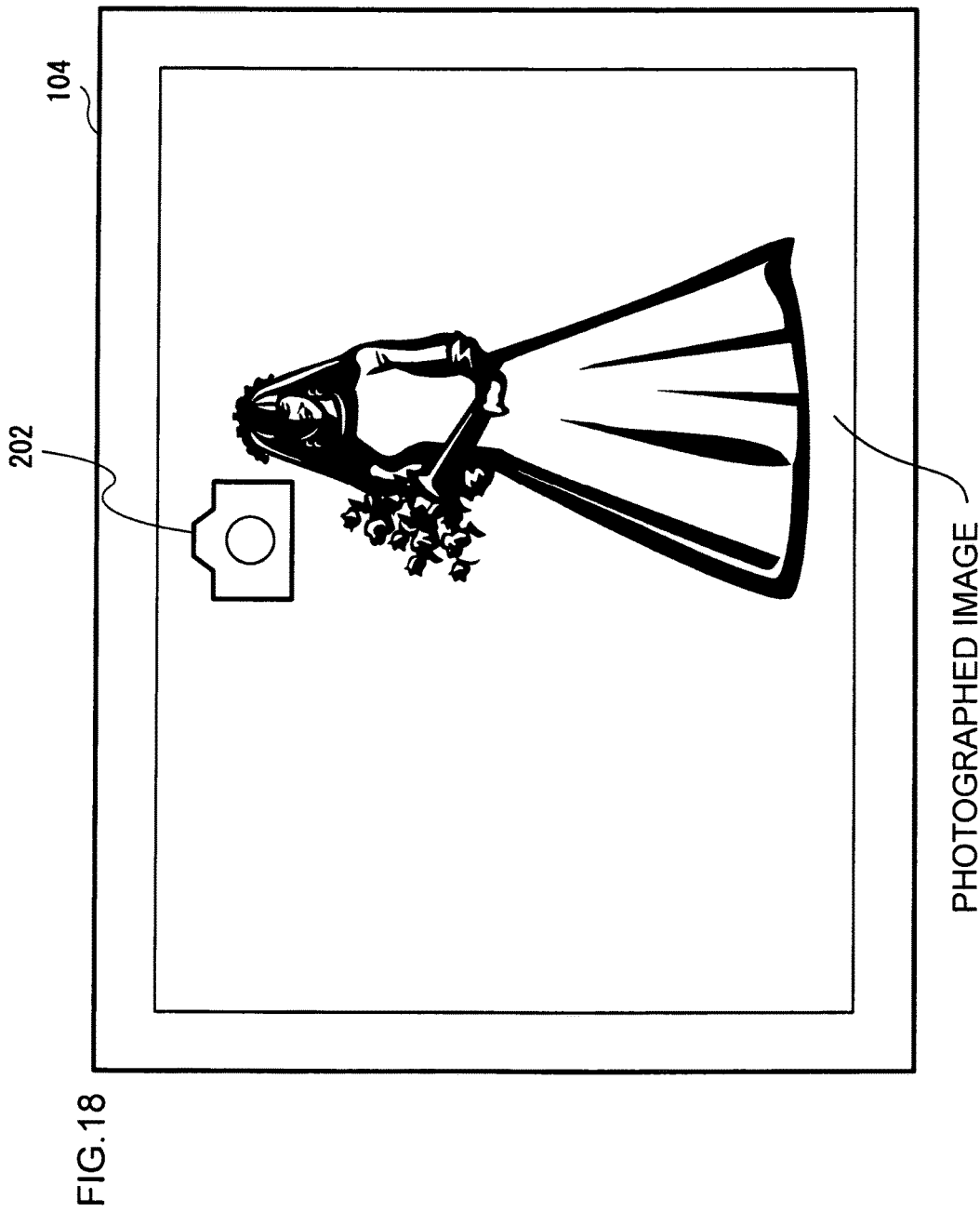
FIG. 18 is a figure showing an example of a screen display that is displayed upon the monitor 104 of the digital camera 1.

The screen display example shown in FIG. 18 shows a situation when a photographed image that is based upon photographed image data recorded upon the memory card is being displayed. In this image display example, along with the photographed image, a camera icon 202 is displayed, which is a mark for showing the type of this image. The CPU 101 displays this camera icon 202 or the previously described received email icon 201 along with the photographed image or the image that has been received by email, thereby replays the photographed image and the image that has been received by email distinguishably. Due to this, it is possible for the user clearly to distinguish, even during replay of an image, to which category this image belongs: photographed images, or images received by email. It should be understood that, even if either of the camera icon 202 or the received email icon 201 is displayed and the other is not displayed, the same advantageous effect can be achieved.

Figure 19:
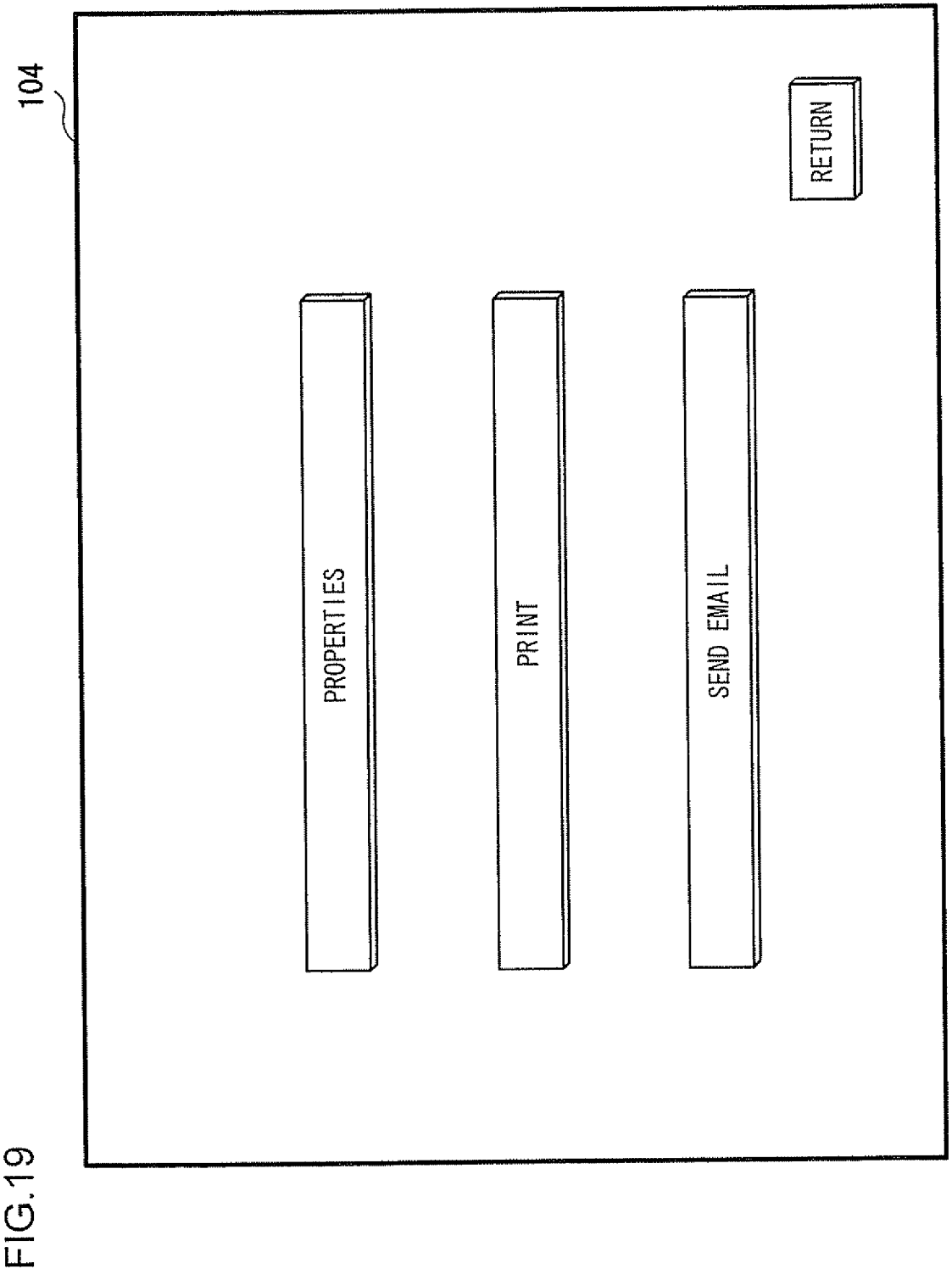
FIG. 19 is a figure showing an example of a screen display that is displayed upon the monitor 104 of the digital camera 1.

As described above, in the state in which a single item of image data among the image data within the digital camera 1 is being replayed in the replay mode, by actuation of the menu button 15, as shown in FIG. 19, the items "properties", "print", and "send email" are displayed as overlapped over the image that is being replayed.

When "properties" is selected by the user, information about the environment in which the image data that is being replayed was photographed and soon is displayed. Furthermore, when "print" is selected, a menu for printing the image that is being replayed is displayed. This menu display for printing will be described hereinafter.

Figure 20:
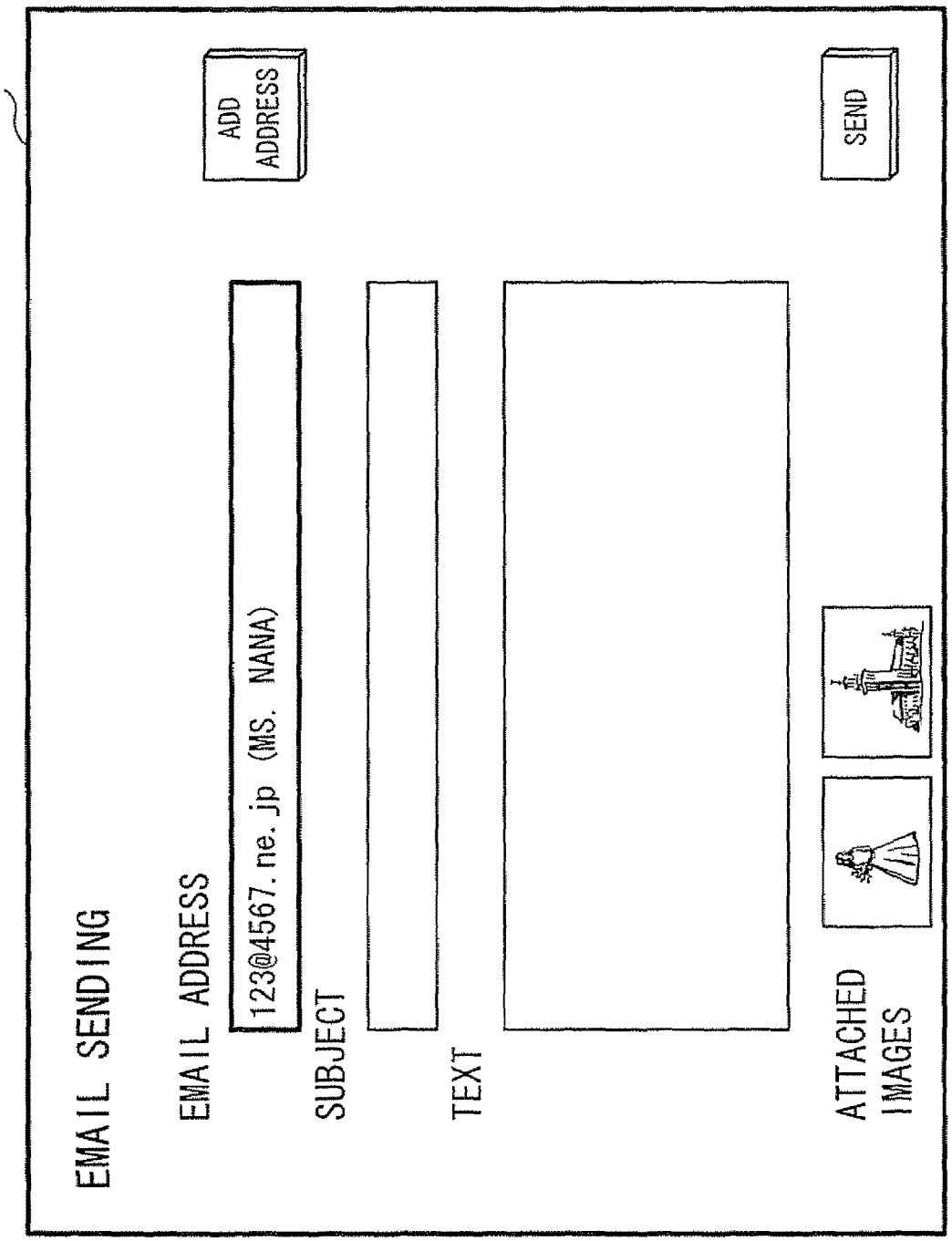
FIG. 20 is a figure showing an example of a screen display that is displayed upon the monitor 104 of the digital camera 1.

And when "send email" is selected by the user, the screen changes over to the screen shown in FIG. 20, for selecting between the items "email address", "email title" and "email text".

If the user selects "email address" in FIG. 20, then the user is enabled to select an email address that is already registered. In the state in which the user has selected "email address", the email address that was selected the previous time is selected, including also image data other than the image data that is being selected at the moment. Due to this, in the case of sending an email to an address that is the same as the email address to which an email was sent the previous time, it is not necessary to perform selection over again. Moreover, in FIG. 20, it is possible to set a plurality of email addresses by selecting "add address", and this makes it possible to send emails having the same contents to a plurality of addresses.

Next, the case when the user has selected "email title" or "email text" will be explained with reference to FIG. 20.

By selecting "email title" or "email text", it becomes possible to input the title of an email or the text of an email.

First, the method for inputting the text of an email will be explained. When "email text" is selected, the screen changes over to the screen display shown in FIG. 21.

Figure 21:
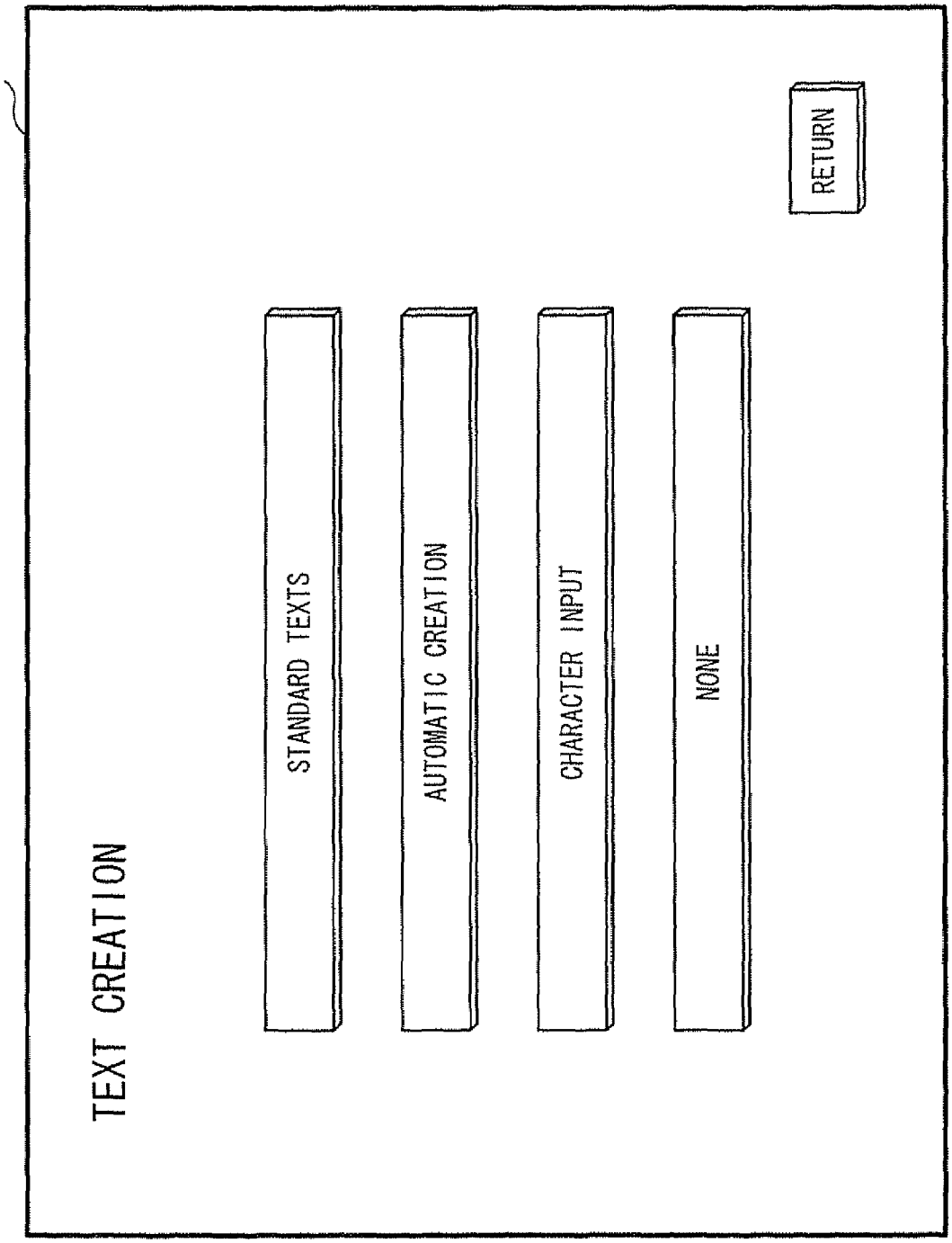
FIG. 21 is a figure showing an example of a screen display that is displayed upon the monitor 104 of the digital camera 1.

When "standard texts" is selected on the screen display of FIG. 21, it is possible to read out standard documents that have been stored in the memory within the digital camera 1 in advance before shipment of the digital camera 1. For example, it is possible to select standard documents such as "Good day! I am sending a photograph." or "Are you well?". Furthermore, not only may standard documents that have been stored in advance in the digital camera before shipment be selected and read out, but also documents that have been created by the user and that have been registered in the memory as standard documents. In a similar manner to the case with the address information, it is also possible to register documents that have been inputted using a personal computer, in cooperation with software upon the personal computer.

Furthermore, when "automatic creation" is selected on the screen display of FIG. 21, the CPU 101 creates an email text automatically, using registered information that is stored in the digital camera 1, such as recognition of the photographic subject, photographic information including GPS information, the calendar function (i.e. the scheduling function), addresses for sending emails, and so on.

For example, as shown in FIG. 22, an email document may automatically be created consisting of "Dear Ms. Nana, this is Kurobuta. Here is a photograph of Ms. Momo taken at Ms. Ake's wedding reception party. Jul. 7, 2005 at 19:35, Roppongi."

In the email document described above, the portion "Dear Ms. Nana" is created on the basis of the email address of the destination of this email to be sent. In other words, by referring to the names that are registered together with email sending addresses in the address register, it is possible automatically to create the name of the opposite party, who is to be the recipient. And the portion "this is Kurobuta." is made from the name of the user, which is registered in advance in the digital camera 1.

The portion "taken at Ms. Ake's wedding reception party." is created on the basis of the photographic information that is included in the photographed image data, and the calendar function; in other words on the basis of event information that is registered in the schedule function. In other words, this digital camera 1 stores in advance, in its internal memory, information about various events that have been set in correspondence to dates and times. By referring to the date and the time at which "Ms. Ake's wedding reception party" was set in this event information, and to the information in the photographic information that specifies the date and the time of photography, it is understood that the photographed image of FIG. 18 is one that was photographed at "Ms. Ake's wedding reception party". Accordingly, it is possible to create an email document like the one described above automatically.

The portion "Here is a photograph of Ms. Momo" is created on the basis of the result of recognition of the photographic subject. In other words, with this digital camera 1, it is possible to perform recognition of photographic subject by performing pattern matching or the like with images that are registered in advance on the basis of photographed image data that has been recorded in the memory card, and thereby it is possible to specify the photographic subject who is being photographed. If the photographic subject has been specified in this manner, then it is possible to create an email document like the one described above automatically on the basis of this photographic subject information, for example on the basis of the name of the photographic subject or the like.

And the portion "Jul. 7, 2005 at 19:35" is created on the basis of the information about the date and the time of photography that is recorded as photographic information. Moreover, the portion "Roppongi" is created on the basis of the GPS information that is included in the photographic information. In other words, the position of photography may be acquired by the digital camera 1 receiving the signals from the GPS satellites at the time of photography, and this position of photography may be included in the photographic information as GPS information. By doing this, it will be understood that the photographed image of FIG. 18 was photographed in "Roppongi". Accordingly, it is possible to create an email document like the one described above automatically. It should be understood that it would also be acceptable for the information specifying the position of photography not to be included in the photographic information, but to be appended when the data for the photographed image was read out.

If any of the information of the types described above is lacking, then it would be acceptable to create an email document automatically in which the portion that would correspond to this information is omitted. For example, if the event information is not registered, then it would be acceptable to create an email document in which the portion "taken at Ms. Ake's wedding reception party" is omitted.

Furthermore, it would also be acceptable to arrange to acquire map information specifying the position of photography on the basis of information about that position of photography, and to create an email for sending, to which this map information that has been acquired is attached along with the photographed image. By doing this, it would be possible to inform the recipient of the email of the position of photography in a manner that is easily understood. At this time, it would be acceptable to arrange to store the map data base that is used for searching for and acquiring the map information corresponding to the position of photography within the digital camera 1; or it would also be acceptable to arranged to acquire this map information corresponding to the position of photography from a server by wireless communication. Or it would also be acceptable for the digital camera 1 not to attach the map information, but to arrange for the map information to be attached by the server for sending email.

Figure 23:
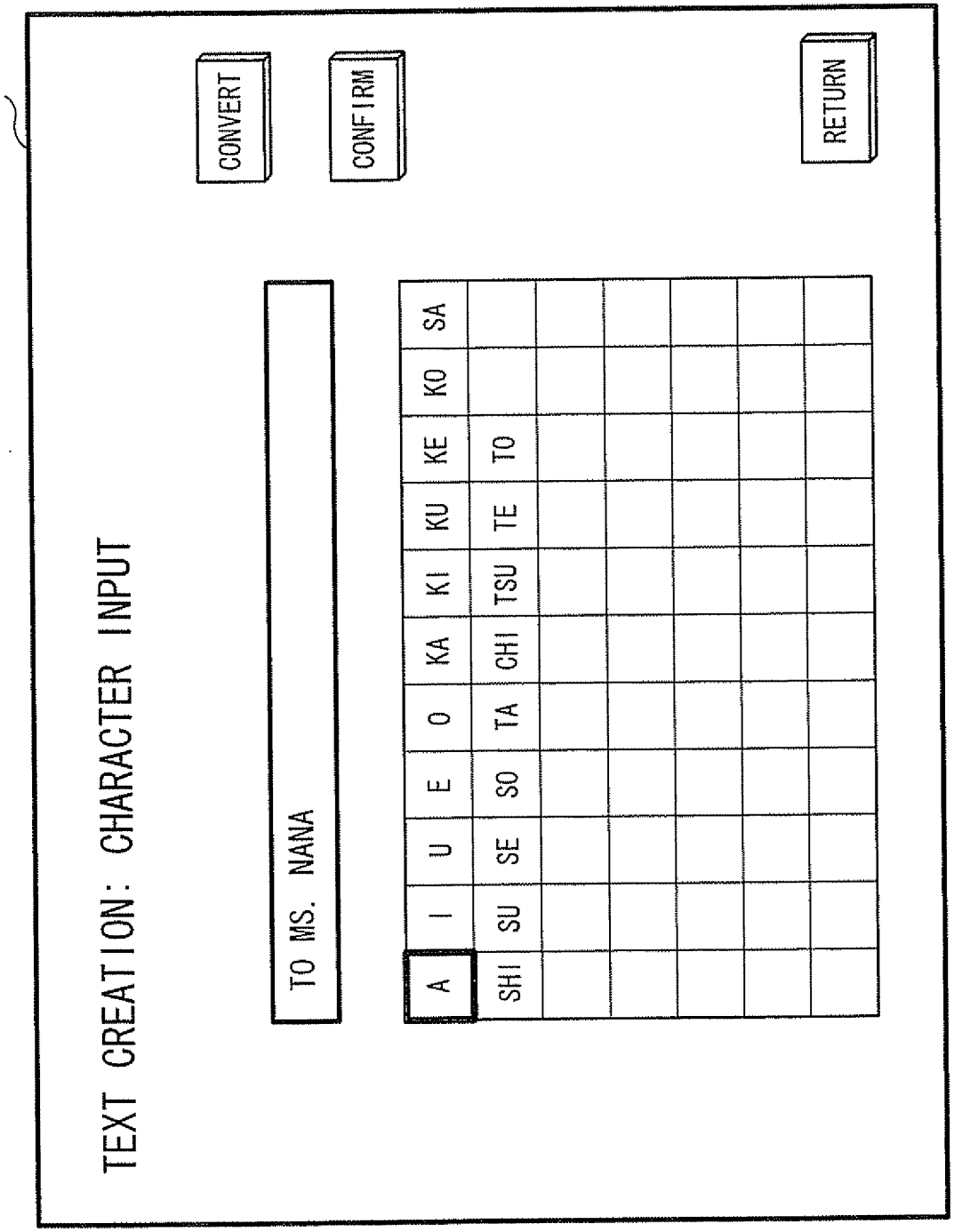
FIG. 23 is a figure showing an example of a screen display that is displayed upon the monitor 104 of the digital camera 1.

Furthermore, when "character input" is selected on the screen display of FIG. 21, or "edit" is selected on the screen display of FIG. 22, it is possible for the user to create a document freely by performing character input using the jog dial. If "edit" has been selected, then, under the control of the CPU 101, the text of an email for sending that has been created automatically in the fashion described above may be edited by actuation by the user. Accordingly, when the contents of a document that has been created automatically are not pleasing, the user may edit them freely. A screen display for performing kana character input is shown in FIG. 23. By selecting the kana characters shown upon the virtual keyboard with the jog dial and actuating the right button, and thereby building up a kana character string, the user is able to convert the character string into kanjis by actuating the lower button of the jog dial.

It would also be acceptable to arrange for a touch panel to be overlaid upon the monitor 104, so that input could be performed by direct touch upon a virtual keyboard. Moreover, it would also be acceptable to arrange to convert audio that was inputted from a microphone into text using a voice recognition function. Even further, it would also be acceptable to arrange to input text by photographing characters written upon paper or the like, by using an OCR function.

When "OK" is selected upon the screen display of FIG. 22 or upon the screen display of FIG. 23, the screen display changes over to the one shown in FIG. 20, but in the state in which the email text has been inputted. Furthermore, when "return" is selected upon the screen display of FIG. 22 or the screen display of FIG. 23, the screen display changes over to the previous screen display.

It should be understood that the method for inputting the title of an email is omitted, since it is the same as the method for inputting the text of an email.

As explained above, it is possible to create a title or text for an email to be sent, on the basis of at least one of the image that is attached to that email to be sent, and the email address that is the destination of that email to be sent. By doing this, it is possible to generate the title or the text of the email to be sent with appropriate contents automatically, even if the user does not actuate the digital camera 1 to input such text.

As described above, the CPU 101 is able automatically to create a title or text for an email to be sent, on the basis of the photographic information that is included in the photographed image data, or on the basis of information about the photographic subject that has been specified on the basis of the photographed image data. With regard to the type of photographic information, it would be possible to use information about the date and the time of photography, or to use GPS information, in other words positional information that has been acquired from GPS signals, or the like. Moreover, it would also be possible to create the title or the text of an email to be sent, on the basis of information about the date and the time of photography in the photographic information, and of event information that has been stored in advance. Accordingly, it is possible to create a title or text automatically from various types of details.

It should be understood that, if a predetermined email address is set as the destination for an email to be sent, then it would also be acceptable to arrange to change the image aspect ratio of the photographed image data, according to this email address. For example, if the email address of a portable telephone is set, then, because the screen of a typical portable telephone is portrait format, the aspect ratio may be changed in conformity therewith, so that the vertical dimension of the image of the photographed image data is longer than its horizontal dimension. At this time the aspect ratio may, for example, be changed by deleting the left and right edges of the image. An email to be sent is created with the attached image to be sent being based upon the photographed image data with the aspect ratio of the image changed in this manner, and is sent to the email address that has been set. By doing this, it is possible to send an email with an attached image that is adapted to the display format of the recipient.

Figure 24:
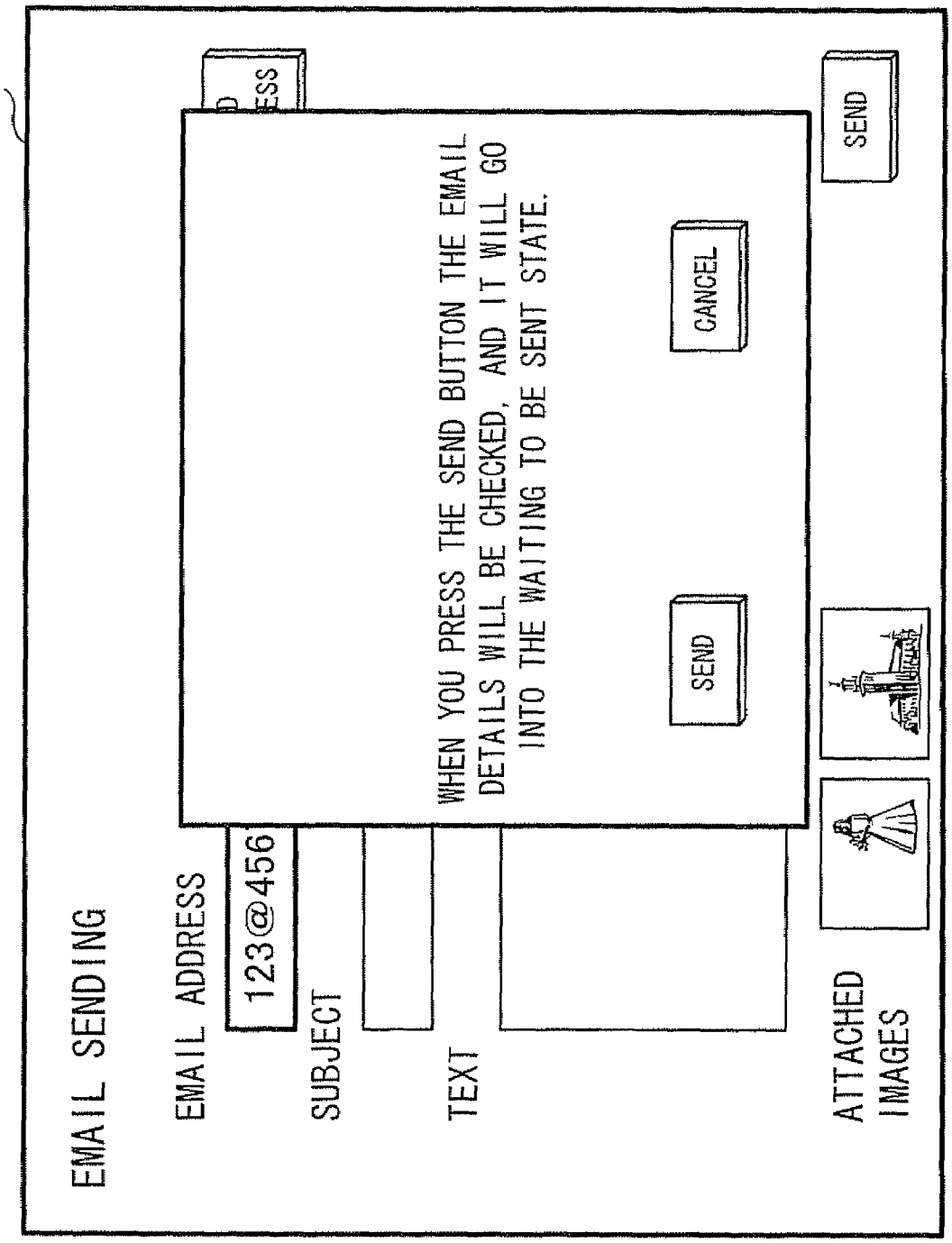
FIG. 24 is a figure showing an example of a screen display that is displayed upon the monitor 104 of the digital camera 1.

When "send" is selected upon the screen display of FIG. 20, then the screen changes over to displaying the screen of FIG. 24. And, when "send" is selected upon the screen display of FIG. 24, then control is performed with the email that has been created now being in the waiting to be sent state.

Figure 25:
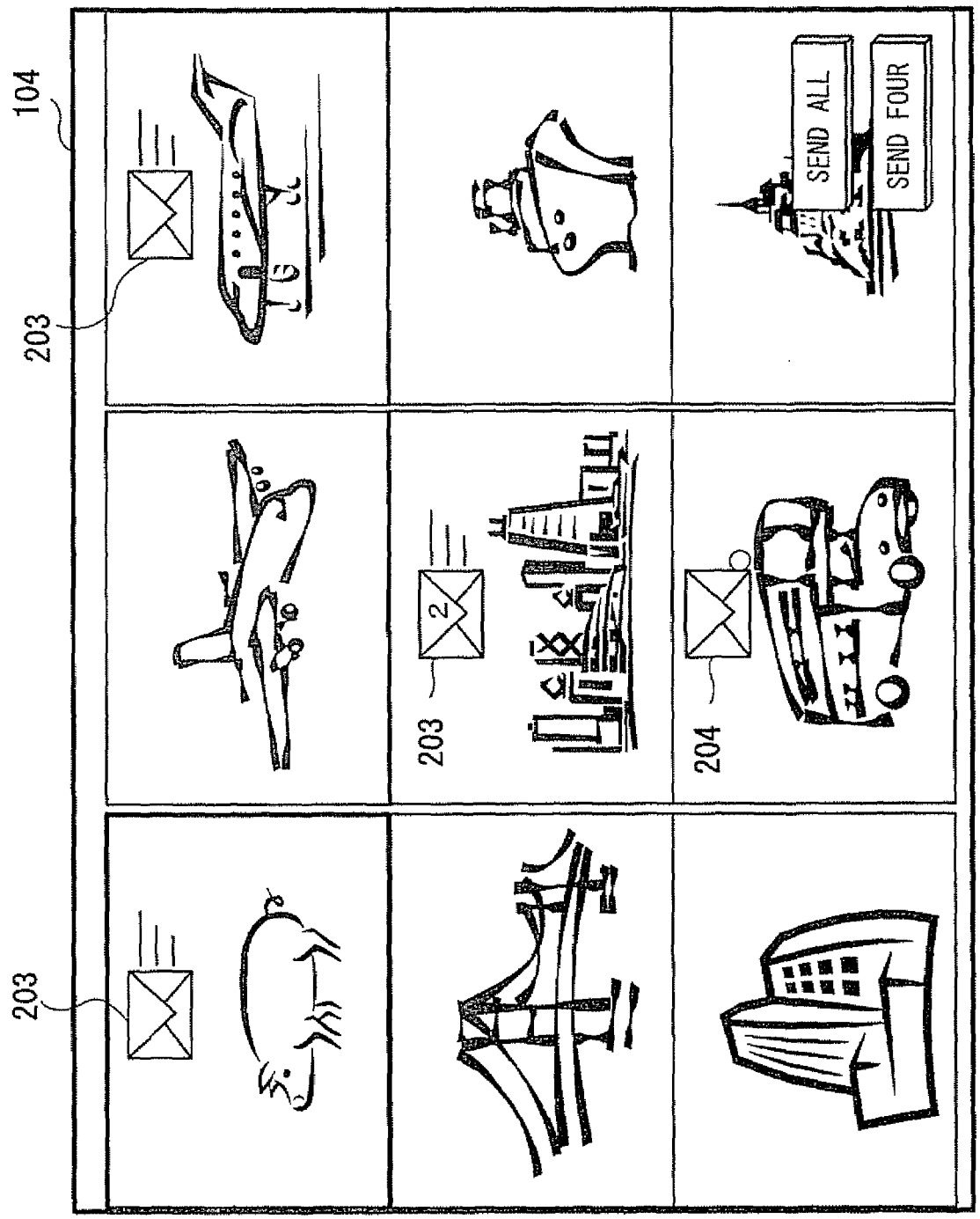
FIG. 25 is a figure showing an example of a screen display that is displayed upon the monitor 104 of the digital camera 1.
Figure 26:
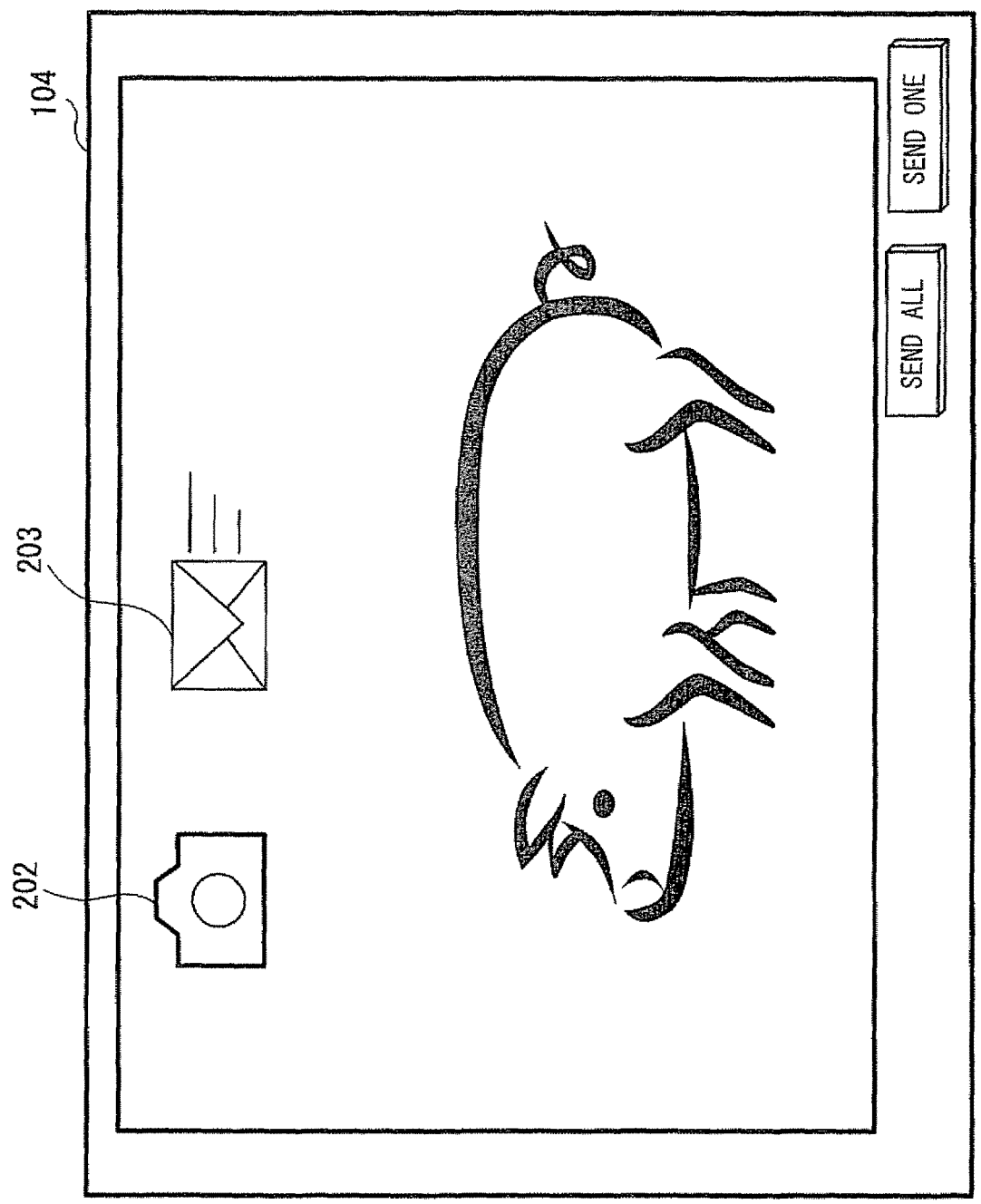
FIG. 26 is a figure showing an example of a screen display that is displayed upon the monitor 104 of the digital camera 1.

FIGS. 25 and 26 are screen displays that are provided when an image is in the waiting to be sent state.

FIG. 25 is an example of screen display in a display mode in which a plurality of images are being displayed at the same time as shrunk down thumbnail images, and FIG. 26 is an example of screen display in a display mode in which a single image is being displayed. As shown in FIGS. 25 and 26, an email to be sent icon 203 is appended to images that are in the waiting to be sent state. The numeral in this email to be sent icon 203 specifies the number of times this email is to be sent, and "2" is displayed here if this email is to be set to two people at the same time. It should be understood that, in FIG. 25, a sending completed icon 204 is also displayed to show that the corresponding image has already been sent. Moreover, in FIG. 26, in a similar manner to the case with FIGS. 9 through 12 described above, a camera icon 202 is also displayed to indicate that this image is an image that has been photographed. It should be understood that, in the case of an image that has been received by email, a received email icon 201 is displayed instead of this camera icon 202.

When one of the thumbnail images displayed in the list of FIG. 25 is selected by actuation by the user, the image received by email or the photographed image that corresponds to this thumbnail image is displayed as magnified, as shown in FIG. 26. Moreover, in the case of an image received by email, it would also be acceptable to display it together with its email text, as shown in FIG. 10.

Furthermore, when "send four" upon the screen of FIG. 25 is selected, then, among the emails that are in the waiting to be sent state at the time point of this selection, four emails to which images displayed in FIG. 25 are attached are sent. And, when "send one" upon the screen of FIG. 26 is selected, then, among the emails that are in the waiting to be sent state at the time point of this selection, only one email to which an image displayed in FIG. 26 are attached is sent. Moreover, when "send all" is selected upon the screen of FIG. 25 or 26, or when the send and receive button 24 is actuated, then all of the emails that are in the waiting to be sent state are sent.

(Setting the Address of an Email to be Sent)

Figure 27:
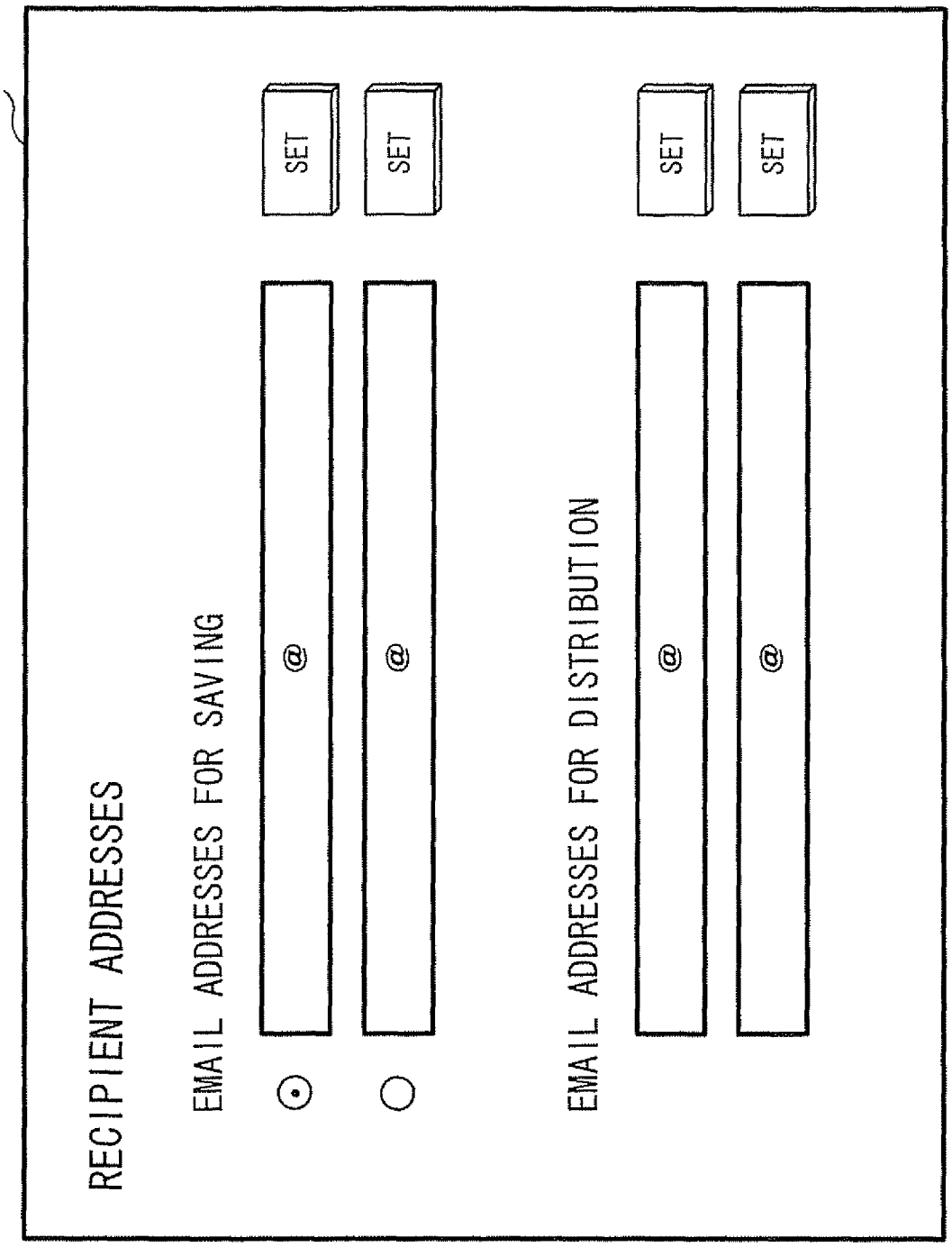
FIG. 27 is a figure showing an example of a screen display that is displayed upon the monitor 104 of the digital camera 1.

FIG. 27 shows a setting screen for the recipient email address. In FIG. 27, it is possible to set an "email address for saving" and an "email address for distribution".

An email address for saving is not one to which image data is sent in order for it to be seen by an opposite party such as a friend or the like, but rather is an address that is used for saving image data in an external memory, in a similar manner to the user recording it himself in the memory of the digital camera 1. In other words, image data that has been sent to an email address for saving is saved upon a server, and is not sent by email. On the other hand, an email address for distribution is an address for sending an email to another person, so as to distribute an image.

As described above, as the email address that is the destination of an email for sending, the CPU 101 sets an email address for distribution, which is for distributing an image to another person, and an email address for saving, which is for the user to save an image, distinguishably. Accordingly, it is possible for the user to set an email address according to the objective in view, without any setting mistake taking place.

While the inputting of an email address, and the setting for each email address, can naturally be performed by the digital camera 1, it can also be performed by inputting data using a personal computer, and completing the setting by transferring this data to the digital camera 1.

Two email addresses for saving may be inputted. Furthermore, sending is preferentially performed to the email address that is checked in the check box positioned to the left of its email address input field. If both the email addresses are checked, then sending is perfected to both these email addresses at the same time.

Figure 51:
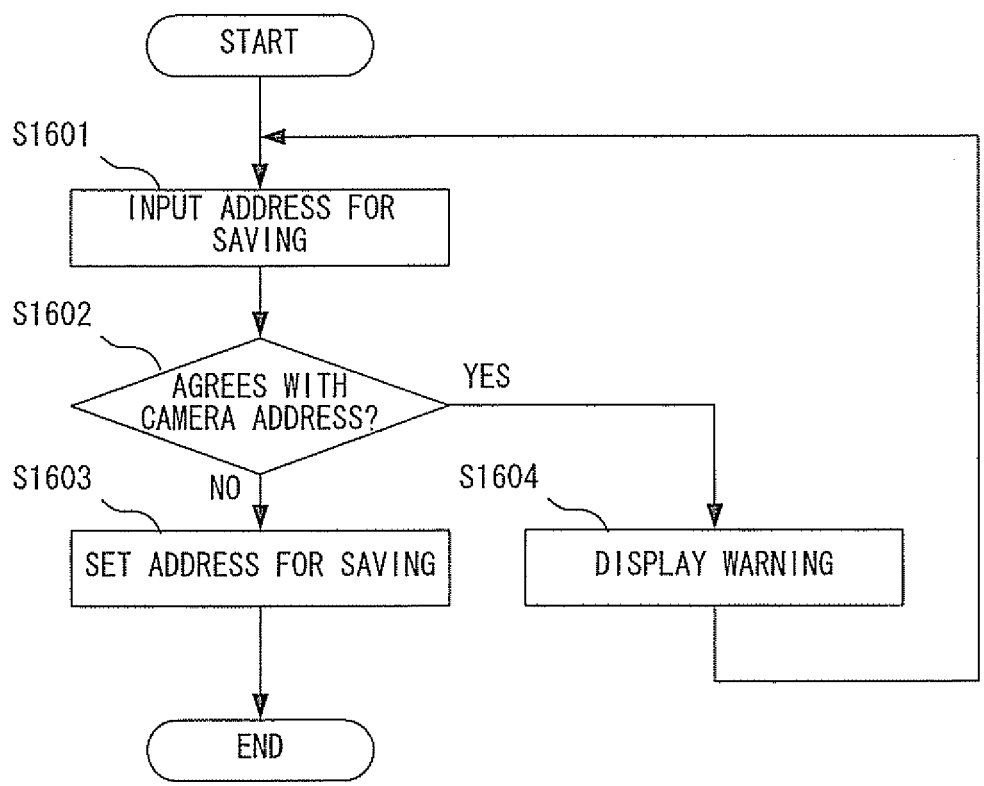
FIG. 51 is a flow chart showing setting control for an address for saving that is executed by the CPU 101 of the digital camera 1.

FIG. 51 is a flow chart showing the address setting control for saving that is executed by the CPU 101 of the digital camera 1 when setting the above described email address for saving. In a step S1601, the email address for saving is inputted. At this time, it would be acceptable to arrange for the email address for saving to be inputted according to actuation by the user, as previously described; or it would also be acceptable to arrange for the email address for saving to be inputted as data transferred from a personal computer.

In a step S1602, a decision is made as to whether or not the email address for saving that was inputted in the step S1601 and an address that is intrinsic to the digital camera 1 agree with one another. This information about the camera address is stored in advance in the digital camera 1. If the email address for saving that has been inputted agrees with the camera address, then the flow of control is transferred to a step S1604, whereas if they do not agree with one another then the flow of control proceeds to a step S1603.

In the step S1603, the email address for saving that has been inputted is set as the email address of the recipient. By doing this, when sending and receiving email in the future, emails with images appended will be send to this email address for saving that has been set. When the step S1603 has been executed, the flow chart of FIG. 51 terminates.

On the other hand, in the step S1604, a warning display is provided to the effect that it is not possible to use the email address for saving that has been inputted, since it is the same as the camera address. When this step S1604 has been executed, the flow of control returns back to the step S1601 and the user is invited to try again to input the email address for saving for a second time. By doing this, and by issuing a warning if the camera address has been set as the email address for saving, it is possible to invite the user to input again a different email address for saving.

(Setting an Email to be Sent)

When "set", which is positioned to the right of the email address input field, is selected, it is possible to set the email to be sent to that email address.

Figure 28:
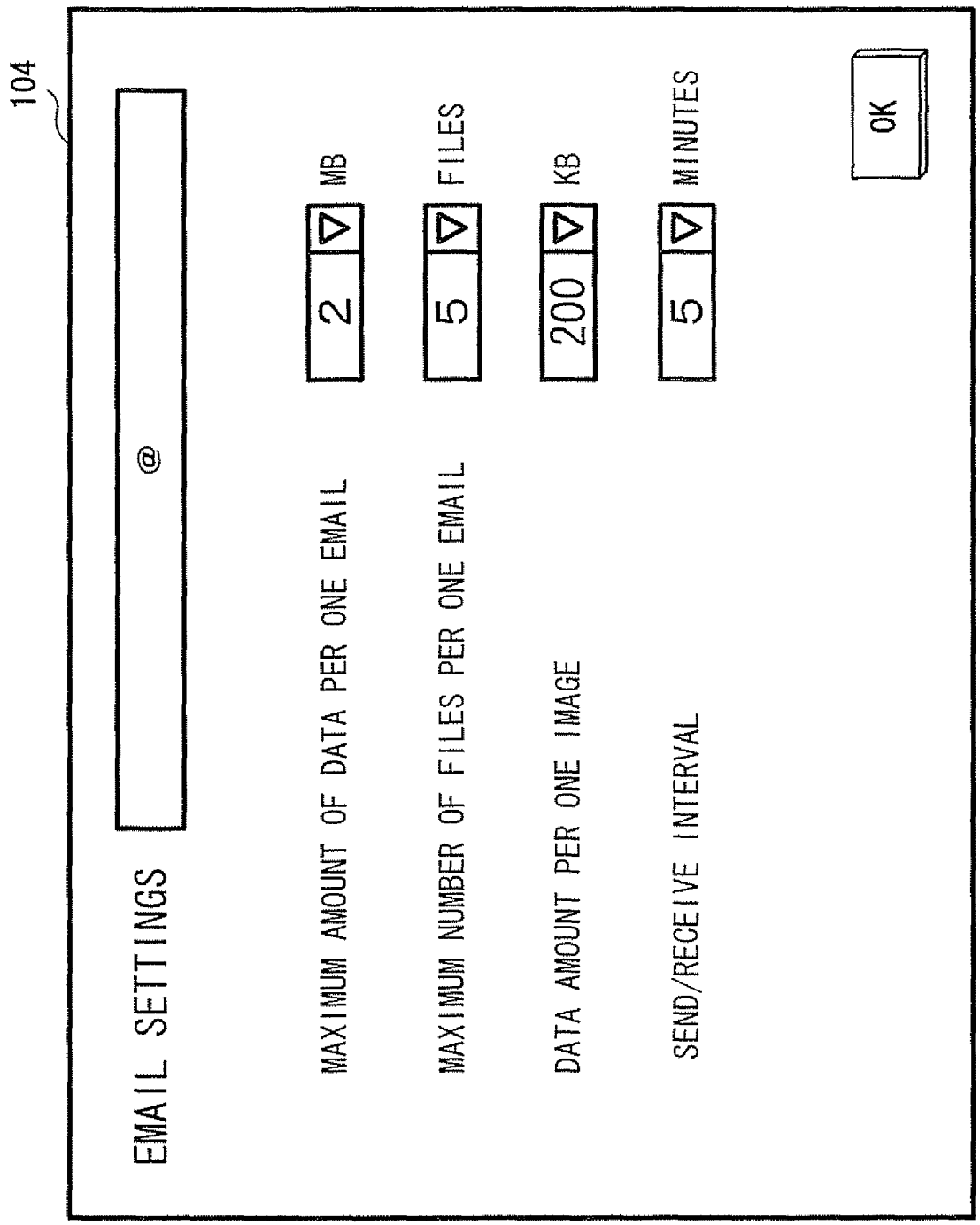
FIG. 28 is a figure showing an example of a screen display that is displayed upon the monitor 104 of the digital camera 1.

On the setting screen shown in FIG. 28, it is possible to select and to set parameters related to emails to be sent, i.e. "maximum amount of data", "maximum number of files", "data amount per one image", and "send/receive interval".

With "maximum amount of data", it is possible to set the maximum amount of data that can be attached to one email. With "maximum number of files", it is possible to set the number of image files that can be attached at the same time to one email. When sending images attached to an email, the upper limit for the data amount of the images, or the upper limit for the number of images, is determined for each email address according to the values of these settings. As a result, when an email to be sent is created with an image attached, and the email address of the destination is set, the upper limit for data amount or the upper limit for the number of files for the images attached to the email is set according to the email address that has been set. Due to this, it is possible to send emails with images attached to be set, in a manner that is appropriate for the processing capability of the recipient or the like.

Although the "maximum amount of data" and the "maximum number of files" may also be set by the user, a data base of mail servers and email capacities is provided in the digital camera 1, or in an external memory, and they are automatically set from this information. Information about the email capacity of the email service supplied by the main provider is inputted to this data base. Or it may be decided from the character string after the "@" in the email address of the recipient.

Since there is a possibility that the details of the email service may change, it is desirable to update the data base. Thus, it is made possible for the newest data base to be published upon the internet, and to automatically download and update it using the wireless LAN.

With this data base, the digital camera 1 automatically finds the data capacity that can be attached per one email, the number of images that can be attached, and so on, and sets these as initial values.

With the "data amount per one image", it is possible to set the data amount for a single image. It is possible to set the size of image data send by being attached to an email, for each email address. For example, when the user desires to send an image of high quality to his own email address, if such image of high quality is sent to a portable telephone of a friend or the like, a serious inconvenience is caused such as the mailbox becoming full, a very large communication cost being entailed, and so on, accordingly the sending of an image of low resolution is set in advance. When the sending size setting for each email address is not changed, an initial value setting for sending at a low resolution of around 200 KB is established, in order not to cause any inconvenience. For an email address of a portable telephone, only one image of around 200 KB should be attached. By doing this, it is also possible further to set an upper limit data amount for each individual image to be sent that is attached to an email.

With the "send/receive interval", it is possible to set the time period gap between performing sending and performing reception. If the user desires only to perform sending and receiving when he actuates the camera manually, and thus not to perform automatic sending and reception, this parameter may be set to "none".

It is necessary to set the mail server to which mail is to be sent for one's own external storage (i.e. its email address) and the mail server for receipt by the camera, differently. If they are set to be the same, then emails with image data attached sent by oneself will be received back by oneself, and this is undesirable.

If emails with attachments are to be sent, then it is necessary to register the amount of data that can be received by the opposite party to sending, and his capacity for receipt of email. Or it is necessary to acquire these before sending. It is possible to resize an email to the data amount that can be received and then to send it. If a plurality of items of image data are attached, then the number of emails is determined in accordance with the data amount that can be received.

There are considered to be two main reasons for sending image data attached to an email. One is because the user wishes to have the image data viewed by another person. The other is in order to use a mail server that is dedicated to image storage as a temporary storage memory. Image data that has been sent to an email address set for temporary saving is automatically deleted from the memory within the camera.

It would also be acceptable to arrange to change the address for sending automatically according to the image size and the compression ratio that have been set. For example, if it is only possible to attach photographed image data of image size up to 2 MB to one email to the email address that is selected, then a setting may be established to send data of up to 5 MB per one email, to another email address for which such data can be attached.

Furthermore, when registering a plurality of email addresses, it is possible to affix a priority order to them. The camera sends the email to which the image data is appended to the email addresses to which it can be sent, according to this priority order.

Furthermore, depending upon the recipient, it may be better that private information should not be sent. For example, it may be made possible to send an email in which the photographic information that is appended to the Exif, such as the day of photography, the camera that took the photograph, and so on, is eliminated. In other words it may be made possible, depending upon the email address of the destination of the email that is to be sent, as set on the screen of FIG. 20, to create and to send an email for sending with an image to be sent attached based upon image data in which the photographic information has been deleted from the photographed image data. By doing this, it is possible to prevent such private information becoming known by an opposite party who is not intended to know it, since this would be undesirable. Furthermore, since it is considered that information that can specify an individual person may be included in the file name of the image data, accordingly the image data is attached and sent after having been automatically renamed. For example, if an unregistered email address is set upon the screen of FIG. 20 as a destination for an email for sending, then the file is attached to the email for sending, and is sent, with its file name that was set by the photographed image data being replaced by simple digits or symbols or the like.

Conversely, when sending an email to a close friend, the file name is renamed to one to which information specific to that individual person is added, so that, just by looking at the file name, it will be understood from whom the image has been sent. For example, if the email address that has been set as a destination for an email for sending upon the screen of FIG. 20 is one that has already been registered, then a portion of the file name that is set for the photographed image data may be replaced by the name or the email address or the like of the user, and the file may then be attached to the email for sending and sent. By doing this, the file name of the image to be sent that is attached to the email for sending is determined according to the email address that has been set for the email for sending. Due to this, it is possible to set an appropriate file name, depending upon the recipient.

Furthermore, it is possible to make a setting so that email that has been received by this digital camera 1 is not deleted from the mail server, so that it can be received for a second time upon a terminal of another personal computer or the like.

(Embedding the Email Text in an Image)

Sometimes it is difficult for the email text and the image data to be handled separately.

The email text may be superimposed upon the image data. Or a margin may be created, and the email text may be embedded in that margin. By doing this, provided that a device is one that can transfer images, it can be used in a manner equivalent to email, even if it is a device that cannot send or receive email.

Moreover, provided that it is possible to see the image data, it is still possible to read the text of the email, even if no email browser software is available.

As far as the email address of the recipient is concerned, the same address is used as was used the previous time, until a change command is issued. It is possible to set either a mode in which emails are created one at a time and sent, or a mode in which a predetermined number of images are accumulated and then sent. During sequential shooting photography, images are sent in the mode in which a predetermined number are accumulated and then sent. However, since the maximum data size that can be attached to a single email is determined, accordingly it is made to be impossible, if a large image size is selected, to select the send mode in which images are accumulated and then sent. It should be understood that, if a user orders more images to be sent attached to an email than the upper limit for the number of images to be sent that has been set upon the setting screen of FIG. 28 described above, then a plurality of emails for sending are created, according to this upper limit number. In other words two or more emails for sending are created, with a number of the designated images to be sent less than or equal to the set upper limit number of images being attached to each of them. Due to this, it is possible to send a greater number of images than the upper limit number thereof, as attached to several emails.

If a plurality of emails are to be sent to the same email address, then it would also be acceptable to arrange to consolidate them into one email for sending. In other words, if a plurality of emails for sending are created, and the same email address is set for all of them, then this plurality of emails for sending may be consolidated together by being combined into one single email for sending. At this time, the images that were attached to each email for sending before consolidation are all attached to the single email for sending that has been consolidated. By doing this, it is possible to reduce the amount of electronic mail data that is to be sent from the wireless LAN circuit, since the number of emails to be sent is reduced.

When the execute button is actuated, the image data that has been photographed up to this time is automatically attached and sent. When the camera is being used by a plurality of persons, if the sender (the user) is set, then the recipient address may be set according to the sender.

(Images that have been Sent by Email)

For image data that has been attached to an email the sending of which has been completed, the original image attached to the email is deleted, and the thumbnail image is stored as an attached image.

For an attached image, its image data is not stored in the sending completed email folder, but only its link information is stored. When the original is deleted, it is shifted to an email folder.

(User Authentication)

When the authentication password cannot be inputted, the digital camera 1 according to this embodiment of the present invention is limited to camera operation.

Instead of the authentication password being inputted by character, the buttons that are actuated and the order of actuation of the buttons are stored for authentication. For example, authentication may be performed by actuating the zoom button 13 (UP)→the shutter button 11→the zoom button 13 (DOWN). The account name and password for connecting to the mail server are already stored within the camera. Inputting characters one by one in order to connect gives trouble, and a camera is not good for inputting characters. However, in this case, when using the camera, anybody can send and receive email, and this is not desirable, because a problem arises with security. Thus, a button password that is inputted by actuation of the buttons is a method of input for permitting an account name and password that are stored to be transmitted. It would be acceptable to demand that this be inputted every time changeover is performed to the email sending and receiving mode; or it would also be acceptable to make it be inputted only once, when the power supply is turned on. Furthermore, it would also be acceptable for this process to be performed at some other timing.

Moreover, a button password may be registered for each mail server. If the same button password is set for each of a plurality of mail servers, then it becomes possible to access that plurality of mail servers by inputting the password just once.

Figure 29:
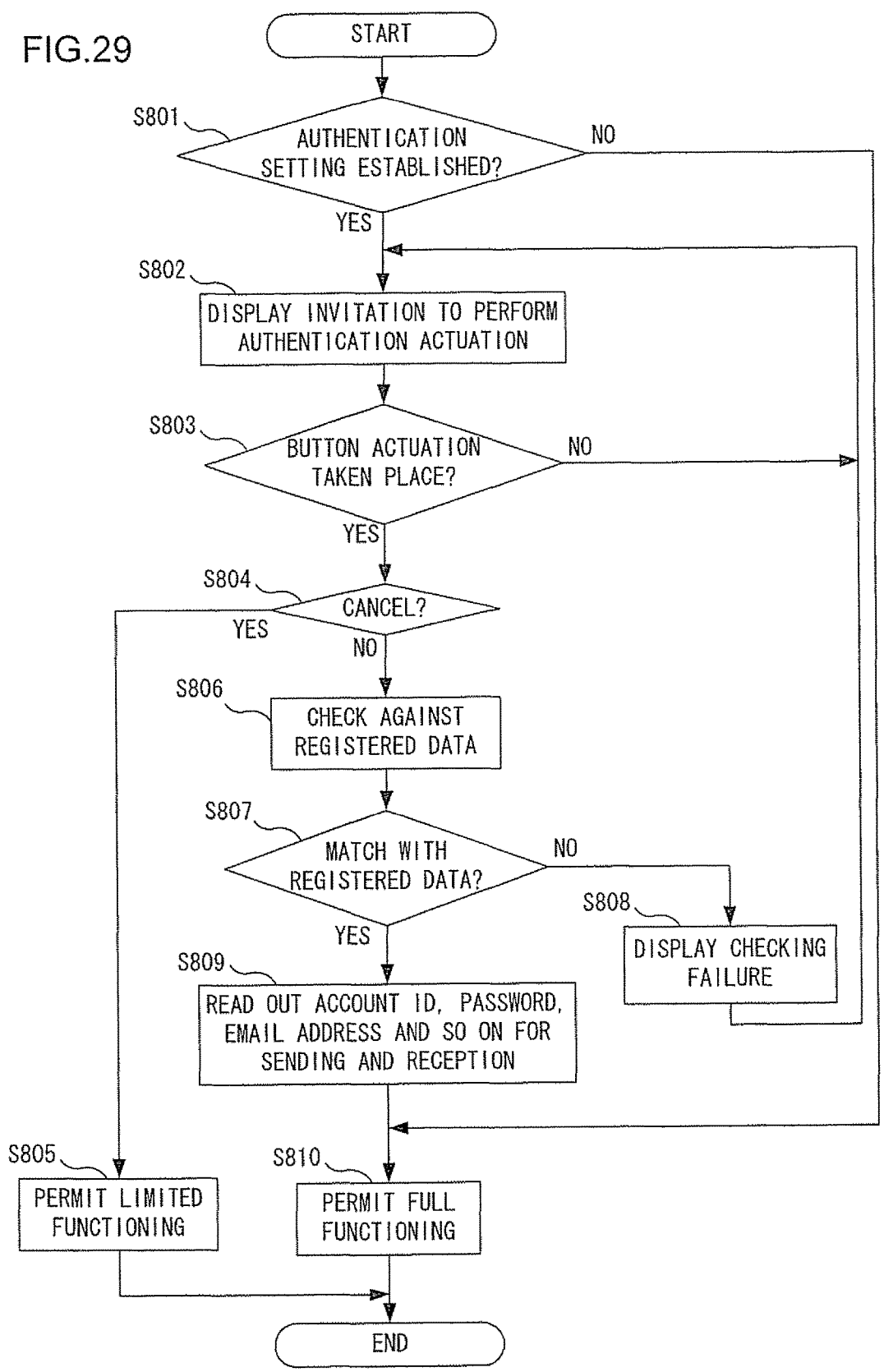
FIG. 29 is a flow chart showing authentication control that is executed by the CPU 101 in the digital camera 1.

Next, the authentication control that is performed by this digital camera 1 will be explained. FIG. 29 is a flow chart showing the authentication control performed by the CPU 101 in the digital camera 1. This flow starts when it is detected that the power supply button 12 has been actuated by the user, so that the power supply to the digital camera 1 has been turned on.

First, in a step S801, a decision is made as to whether or not the authentication setting that is set for the digital camera 1 is set so as to make authentication necessary. If it is set so as to make authentication necessary, then the flow of control proceeds to a step S802, whereas if it is not set so as to make authentication necessary then the flow of control is transferred to a step S810.

Next, in the step S802, a display is provided upon the monitor 104 asking the user to perform the actuation of the buttons that has been registered for authentication. And next, in a step S805, it is detected whether the button actuation has been performed. If actuation of the buttons has been detected then the flow of control proceeds to a step S804, whereas if no button actuation is detected then the flow of control returns to the step S802.

In the step S804, a decision is made as to whether or not the button actuation that has been detected is button actuation for canceling the authentication. For example, sometimes actuation of the delete button 16 may constitute button actuation for cancellation. If a button actuation that cancels authentication has taken place then the flow of control proceeds to a step S805, whereas if no such button actuation that cancels authentication has taken place then the flow of control proceeds to a step S806.

And, in the step S805, a setting is made to limit the functioning of the digital camera 1. In its state in which its functioning is limited, the digital camera 1 is prohibited from performing sending or reception of email, and from reading received email and so on. On the other hand, in the step S806, the button actuation that has been detected is checked against the registered data that is recorded within the digital camera 1. Next, in a step S807, a decision is made as to whether or not the button actuation that has been detected is such as to accord with the registered data that is recorded within the digital camera 1. If it is such as to accord therewith, then the flow of control is transferred to a step S809, whereas if it is not such as to accord therewith, then the flow of control proceeds to a step S808. In the step S808, a display is provided on the monitor 104 that specifies that the authentication has failed, and then the flow of control returns to the step S802.

On the other hand, in the step S809, the email address settings, the account name for the mail server, the password for the mail server, and other settings, which are registered by the user who corresponds to the registered data that has matched, are read out. Next, in the step S810, a setting is made so that it is possible to utilize all the functions of which the digital camera 1 is capable.

As explained in the above, the CPU 101 decides whether or not this user is a legitimate user by judging whether or not the user has performed actuation of the various buttons in the actuation sequence that has been set. According to the result of this decision, it is determined whether or not to cancel the functional limitation of the digital camera 1, and, if the functional limitation is not cancelled, then reading of emails and so on is prohibited. Due to this, it is possible to prevent important information from being acquired by an improper user.

(Sending and Reception Timing)

This digital camera 1 is not usually able to performing sending and receipt of email, since when it is not performing photography its power supply is turned off, and in this it differs from a portable telephone. Moreover, it is also necessary to prevent sending and receipt of email becoming any hindrance to photography.

With this digital camera 1 according to an embodiment of the present invention, the sending and receipt of email is performed in circumstances such as those described below.

When the power supply is turned on, connection to the mail server is performed. Connection to the registered mail server is performed at the same time that the camera is changed over to the wireless LAN mode, and a check is made as to whether or not email has arrived. And connection to the mail server is performed at the same time that the camera is changed over from the photographic mode to some other mode. It is arranged for it to be possible to set the interval between connections to the mail server, and checking of the mail server is performed at the interval that has been set.

According to the battery capacity, the gap between connections to the mail server may be increased, so that the number of times connection is established is reduced. If the battery capacity drops below some predetermined value, connection to the mail server may no longer be performed in order to save power. Sending of email is prioritized over reception of email, and reception may not be performed due to low battery capacity.

If the memory within the camera has become full during email reception, then automatically the connection is broken, so that the email that was being received remains upon the server. Moreover, when the memory within the camera is full before connection (i.e. when the remaining capacity is less than or equal to a predetermined value), connection to the mail server is not performed. Connection is performed when an email is waiting to be sent. During connection timing to the mail server, establishment of a connection may be delayed according to the state of the camera (for example, the photographic mode), and according to the state of communication with the access point; and connection may be performed when the state of the camera or the state of communication has changed. Connection is not performed until the next period.

Reading out and performing email reception are also performed in the background during photographic operation.

Naturally, a send and receive email button is provided, so that it is possible to connect to the mail server manually and to perform sending and reception of email at any desired timing.

The sending and reception control for the digital camera 1 will now be explained in concrete terms in the following.

Figure 30:
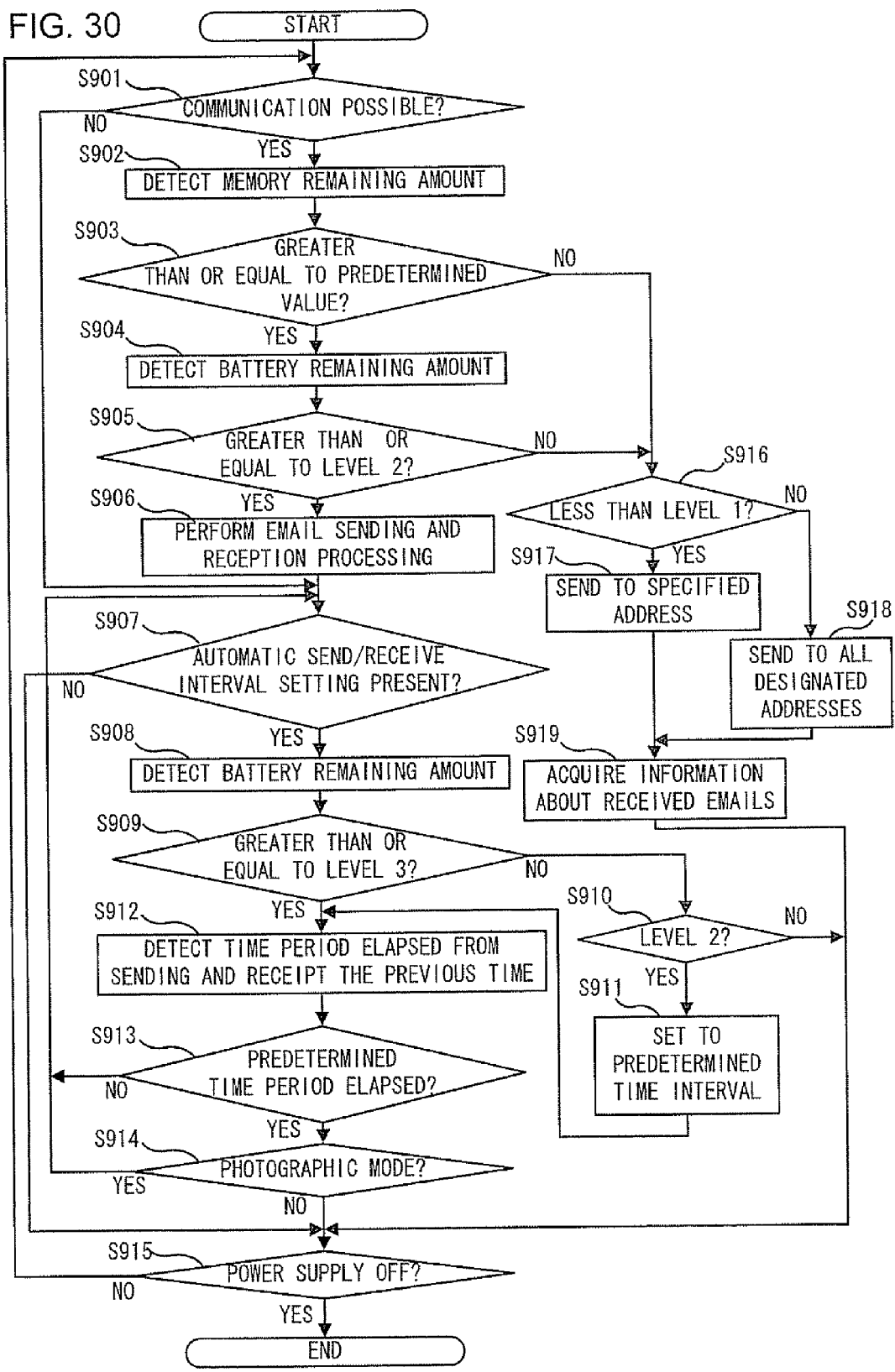
FIG. 30 is a flow chart showing email sending and reception control that is executed by the CPU 101 in the digital camera 1.

FIG. 30 is a flow chart showing the email sending and reception control that is executed by the CPU 101 in this digital camera 1. This flow is started when the user actuates the power supply button 12, the power supply to the digital camera 1 is turned on, and it is detected that the authentication control shown in FIG. 29 has been completed. Accordingly, if the setting to make authentication necessary is not made, then this flow starts directly after the power supply button 12 is actuated.

First, in a step S901, it is detected whether the current state is one in which it is possible to communicate with an access point 2. If it is possible to communicate in the current state, then the flow of control proceeds to a step S902, while if it is not possible to communicate in the current state, then the flow of control is transferred to a step S907.

Next, in the step S902, the remaining capacity of the memory within the digital camera 1 (i.e. the memory remaining capacity) is detected. Next, in a step S903, a decision is made as to whether the memory remaining capacity is greater than or equal to a predetermined capacity. If it is greater than or equal to the predetermined capacity then the flow of control proceeds to a step S904, whereas if it is not greater than or equal to the predetermined capacity then a message is displayed to the effect that it is not possible to receive any email due to shortage of memory, and then the flow of control is transferred to a step S916. And, in the step S904, the remaining amount in the battery 110 that is installed in the digital camera 1 is detected. Next, in a step S905, a decision is made as to whether the remaining amount in the battery 110 is greater than or equal to a level 2. For the level of the remaining amount in the battery 110, the result of detection by the CPU 101 of the remaining amount in the battery 110 is expressed in four stages of level, level 0 through level 3, and the greater the remaining amount is, the higher is the level. If the level is greater than or equal to level 2, then the flow of control proceeds to a step S906, whereas if the level is not greater than or equal to level 2, then a message is displayed to the effect that it is not possible to receive any email due to shortage of battery power, and then the flow of control is transferred to the step S916.

Figure 46:
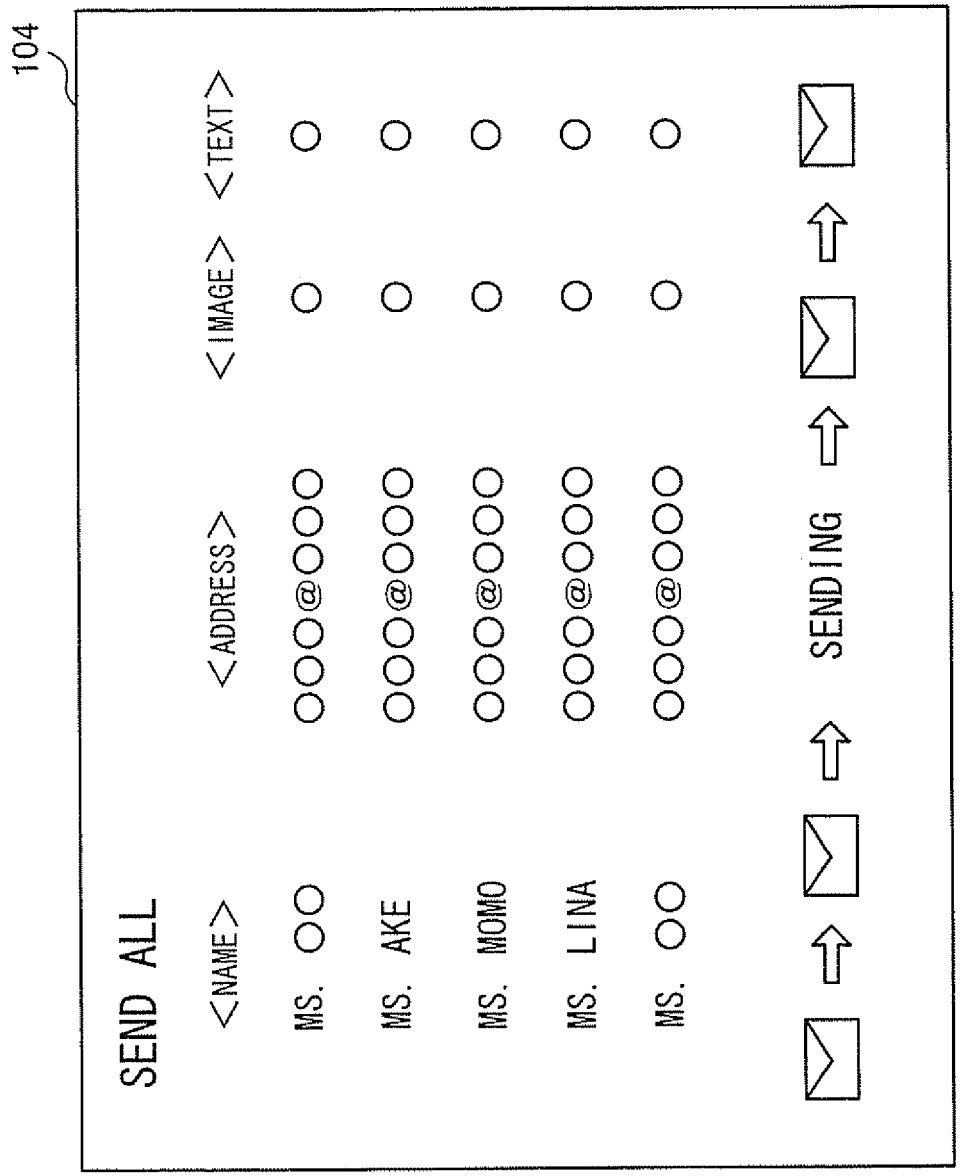
FIG. 46 is a figure showing an example of a screen display that is displayed upon the monitor 104 of the digital camera 1.
Figure 47:
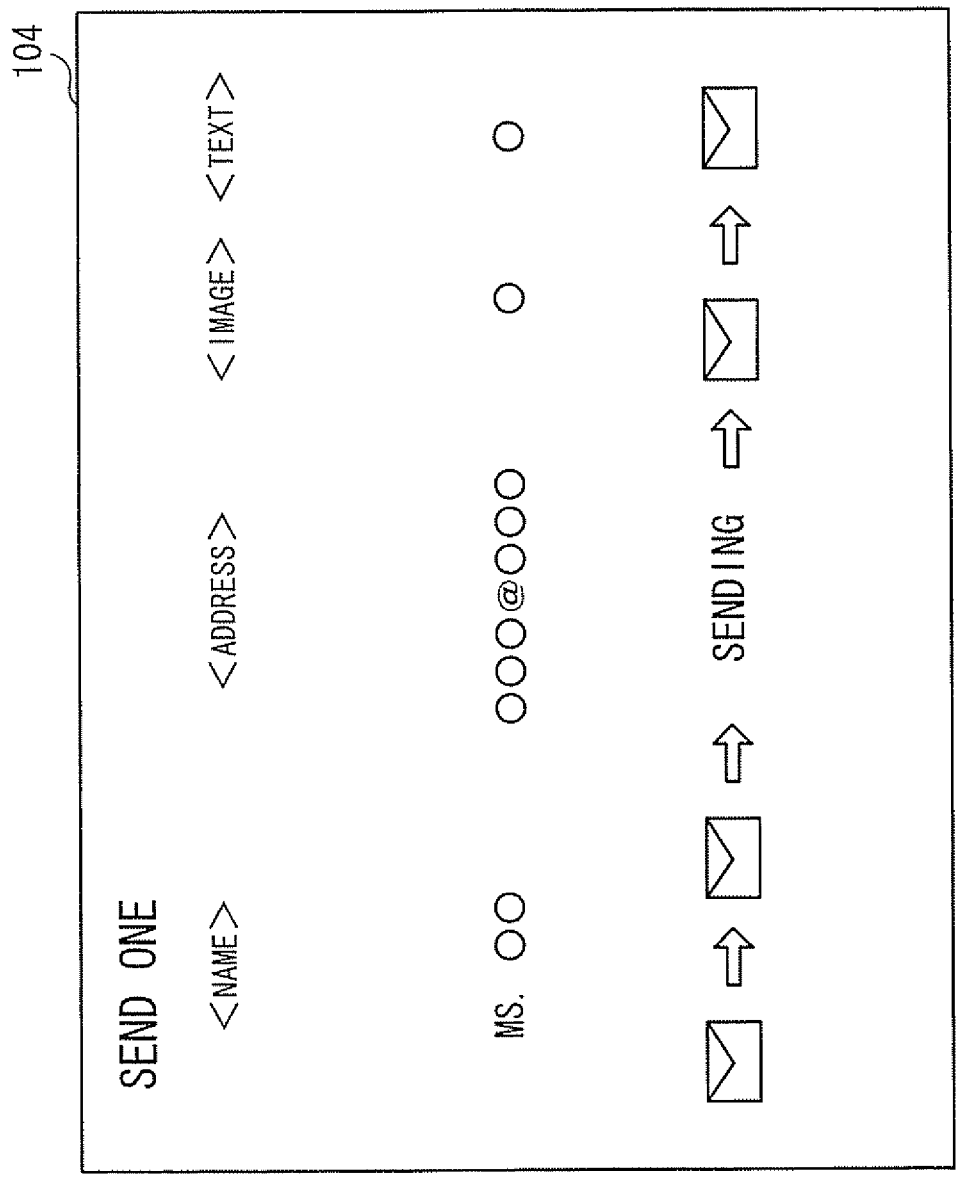
FIG. 47 is a figure showing an example of a screen display that is displayed upon the monitor 104 of the digital camera 1.

And, in the step S906, sending and reception processing for email is performed by accessing the mail server that is set via the wireless LAN circuit and by sending and receiving electronic mail data. At this time, a screen such as that shown in FIG. 46 or FIG. 47 is displayed. FIG. 46 is an example of a display screen when all of a plurality of emails are being sent, while FIG. 47 is an example of a display screen when only one email is being sent. Next, in a step S907, a decision is made as to whether a setting is made to perform sending and reception of email by accessing the mail server automatically at fixed time intervals. For example, the send/receive interval may be set in units of minutes. As an initial value, the send/receive interval may be set to three minutes by the digital camera 1. And, in a step S908, the remaining amount in the battery 110 that is installed in the digital camera 1 is detected for a second time. Next, in a step S909, a decision is made as to whether the remaining amount level of the battery 110 is level 3, this being the full state. If it is level 3, then the flow of control is transferred to a step S912, whereas if it is not level 3, then the flow of control proceeds to a step S910.

In this step S910, a decision is made as to whether the remaining amount in the battery 110 is level 2. If it is level 2 then the flow of control proceeds to a step S911, whereas if it is not level 2 then the flow of control is transferred to a step S915. And in the step S911, by changing the send/receive interval for electronic mail data, the interval for automatically accessing the mail server via the wireless LAN circuit 106 and sending and receiving email is set to, for example, 10 minutes. Naturally, if the interval that is set in advance is 10 minutes or greater, no change to this setting is performed. By changing the send/receive interval for electronic mail data by the wireless LAN circuit 106 in this manner according to the remaining amount in the battery 110, and by thus limiting frequent access to the mail server, it is possible to prevent any obstacle to photography arising due to shortage of the battery remaining amount.

Furthermore, in a step S912, the time period from when the mail server was accessed and sending and receipt of email was performed the previous time is measured. Next, in a step S913, it is detected whether the time period that is set for the send/receive interval has elapsed. If the set time period has elapsed, then the flow of control proceeds to a step S914, whereas if the set time period has not elapsed, then the flow of control returns to the step S907.

And, in a step S914, it is detected whether the current camera mode is the photographic mode. Since there is a fear that a bad influence will be exerted upon photographic processing if email sending and reception is performed during photography, accordingly email sending and reception is not performed as much as possible during the photographic mode so that the sending and reception of electronic mail data by the wireless LAN circuit 106 is prohibited. If the current mode is the photographic mode, then the flow of control returns to the step S907, whereas if it is not the photographic mode, then the flow of control proceeds to a step S915. And, in this step S915, it is decided whether the power supply to the digital camera 1 has been turned OFF, and if it is OFF then this flow terminates, whereas if it is not OFF then the flow of control returns to the step S901.

On the other hand, in the step S916, a decision is made as to whether the remaining amount in the battery 110 is less than level 1. If it is less than level 1 then the flow of control proceeds to a step S917, whereas if it is not less than level 1 then the flow of control is transferred to a step S918. And, in the step S917, since there is almost no amount remaining in the battery, email is only sent to a specified email address. This specified email address is an email address that the user of the digital camera 1 has himself set for image storage. At this time, the sending of email to any other email address than the specified one is prohibited. Due to this, when the remaining amount in the battery 110 has become less than the predetermined value, sending of electronic mail data via the wireless LAN circuit 106 to the specified recipient is permitted, but sending of electronic mail data via the wireless LAN circuit 106 to any other recipient is prohibited. By thus permitting or prohibiting sending of electronic mail data via the wireless LAN circuit 106 according to the remaining amount in the battery 110 that has been detected, it is possible to suppress the consumption of electrical power to the minimum level, while still ensuring that it is possible to send email for image storage.

On the other hand, in the step S918, sending email to the email addresses that are set is performed, since the battery remaining amount is low. And, in a step S919, although reception of email text and attached image data is not performed since the remaining amount in the battery is low, still information about the emails that have been received by the mail server is received. At this time, reception of electronic mail data by the wireless LAN circuit 106 is prohibited. The item "emails not yet received" is created upon the screen display shown in FIG. 13 due to this information about emails that have been received.

Figure 31:
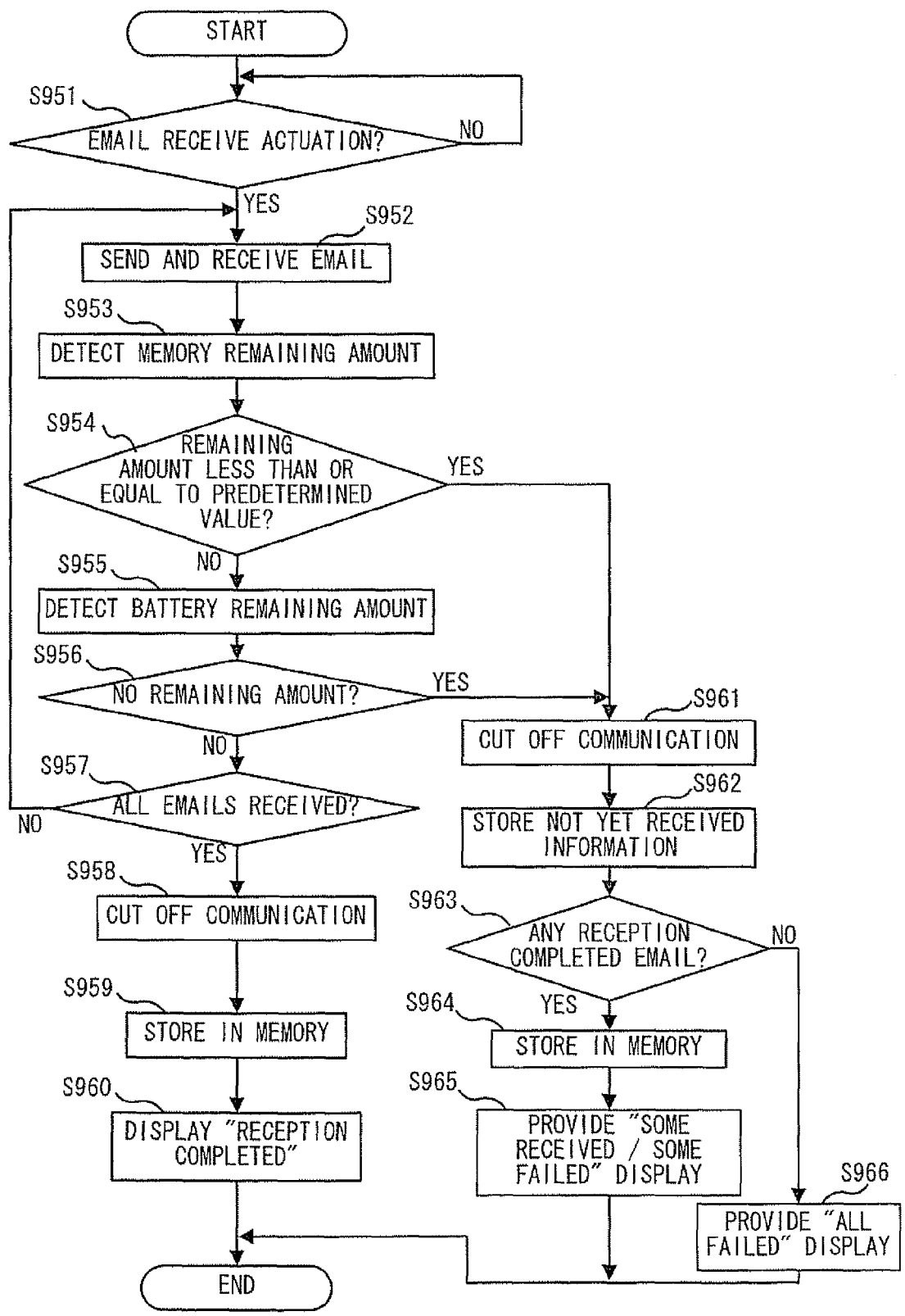
FIG. 31 is a flow chart showing manual email sending and reception control that is executed by the CPU 101 in the digital camera 1.

Next, the method by which the user can perform email sending and reception manually at any desired timing will be explained. FIG. 31 is a flow chart showing manual email sending and reception control that is executed by the CPU 101 within the digital camera 1. This flow starts upon detection that "emails not yet received" has been selected upon the screen shown in FIG. 13, or upon detection of actuation of the send and receive button 24.

First, in a step S951, it is detected whether the current state is one in which it is possible to communicate with an access point 2. If it is possible to communicate in the current state, then the flow of control proceeds to a step S952, while if it is not possible to communicate in the current state, then this processing terminates. And, in the step S952, the mail server that is set is accessed, and, if there is some email which must be sent, then send processing is performed; while, if there is some received email upon the mail server, then reception processing is performed. Moreover, priority is given to receiving any received emails for which "emails not yet received" is being displayed upon the screen display of FIG. 13, and that could not be received the previous time. At this time, a screen like that of FIG. 4C or FIG. 47 is displayed, in a similar manner to the case during the step S906 of FIG. 30, described above.

Next, in a step S953, the remaining capacity of the memory of the digital camera 1 is detected. Next, in a step S954, a decision is made as to whether the memory remaining capacity is greater than or equal to a predetermined capacity. If the memory remaining capacity is less than the predetermined capacity then a message is displayed to the effect that it is not possible to receive any email due to shortage of memory, and then the flow of control is transferred to a step S961; whereas, if the memory remaining capacity is greater than or equal to the predetermined capacity then the flow of control proceeds to a step S955. And, in the step S955, the remaining amount in the battery 110 that is installed in the digital camera 1 is detected. Next, in a step S956, a decision is made as to whether the remaining amount in the battery 110 is not an amount that is just sufficient for performing communication processing. If the remaining amount in the battery 110 is less than a predetermined value, then a message is displayed to the effect that it is not possible to receive any email due to shortage of battery power, and then the flow of control is transferred to the step S961, whereas if it is greater than or equal to the predetermined value then the flow of control proceeds to a step S957.

And, in this step S957, it is detected whether reception of all of the email upon the mail server has been completed. If reception of all of the email has been completed, then the flow of control proceeds to a step S958, whereas if it has not been completed then the flow of control returns to the step S952. In the step S958, communication with the access point 2 is cut off, since the sending and reception of email has been completed. Next, in a step S959, the received email is recorded in the memory. And next, in a step S960, a screen is displayed upon the monitor 104 to the effect that reception has been completed.

On the other hand, in the step S961, since due to the memory remaining amount or the battery remaining amount being insufficient it is not possible to receive email, accordingly communication with the access point 2 is cut off. Next, in a step S962, if there was any email that has not yet been received, then email not yet received information is recorded. And, in a step S963, it is detected whether there is any email of which reception has been completed. If there is any email of which reception has been completed, then the flow of control proceeds to a step S964, whereas if there is not email of which reception has been completed then the flow of control is transferred to a step S966.

In the step S964, the email that has been received is recorded in the memory. Next, in a step S965, a screen is displayed upon the monitor 104 that informs the user that reception of some of the email has been completed, but that a failure has occurred with reception of some of the email.

Moreover, in the step S966, a screen is displayed upon the monitor 104 that informs the user that failure has occurred with reception of all of the email.

As has been explained above, the remaining capacity in the battery 110 and the remaining capacity in the memory are detected, and, when the remaining amount in the battery 110 is less than the predetermined value, or when the memory remaining capacity is less than the predetermined value, reception of electronic mail data via the wireless LAN circuit 106 is prohibited. By doing this, sending and reception control for email is performed, and sending and reception of electronic mail data via the wireless LAN circuit 106 is either permitted or prohibited, according to the remaining amount in the battery 110 and the remaining capacity in the memory. By these procedures, it is possible to operate the digital camera 1 in an appropriate manner, even if decrease of the remaining amount in the battery or decrease of the memory remaining capacity has occurred.

(Reception Control)

Figure 32:
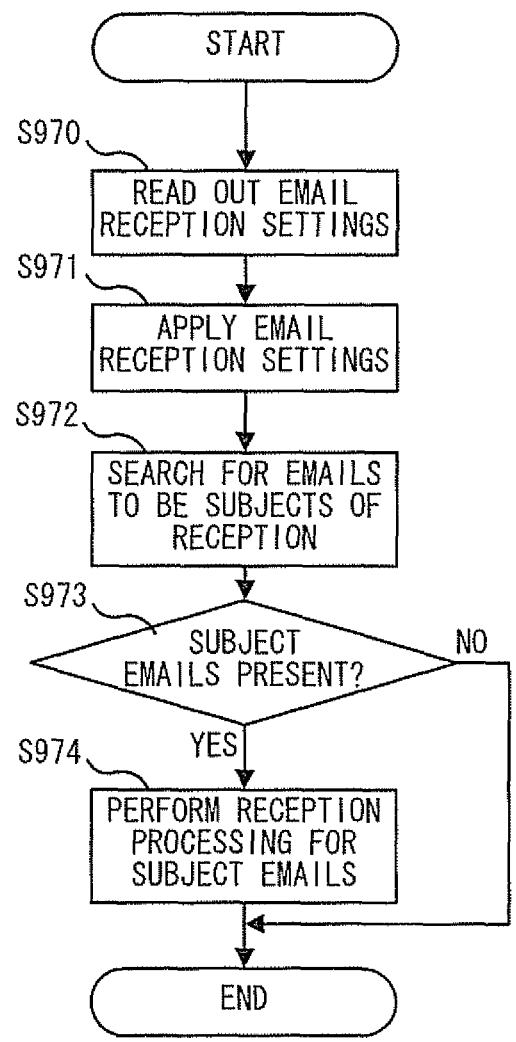
FIG. 32 is a flow chart showing reception control that is executed by the CPU 101 in the digital camera 1.

Next, the reception processing in the sending and reception processing that is executed in the step S906 of FIG. 30 and the step S952 of FIG. 31 will be explained. FIG. 32 is a flow chart showing reception control that is performed by the CPU 101 within the digital camera 1. This flow starts after the sending control in the sending and reception control step has terminated.

Figure 48:
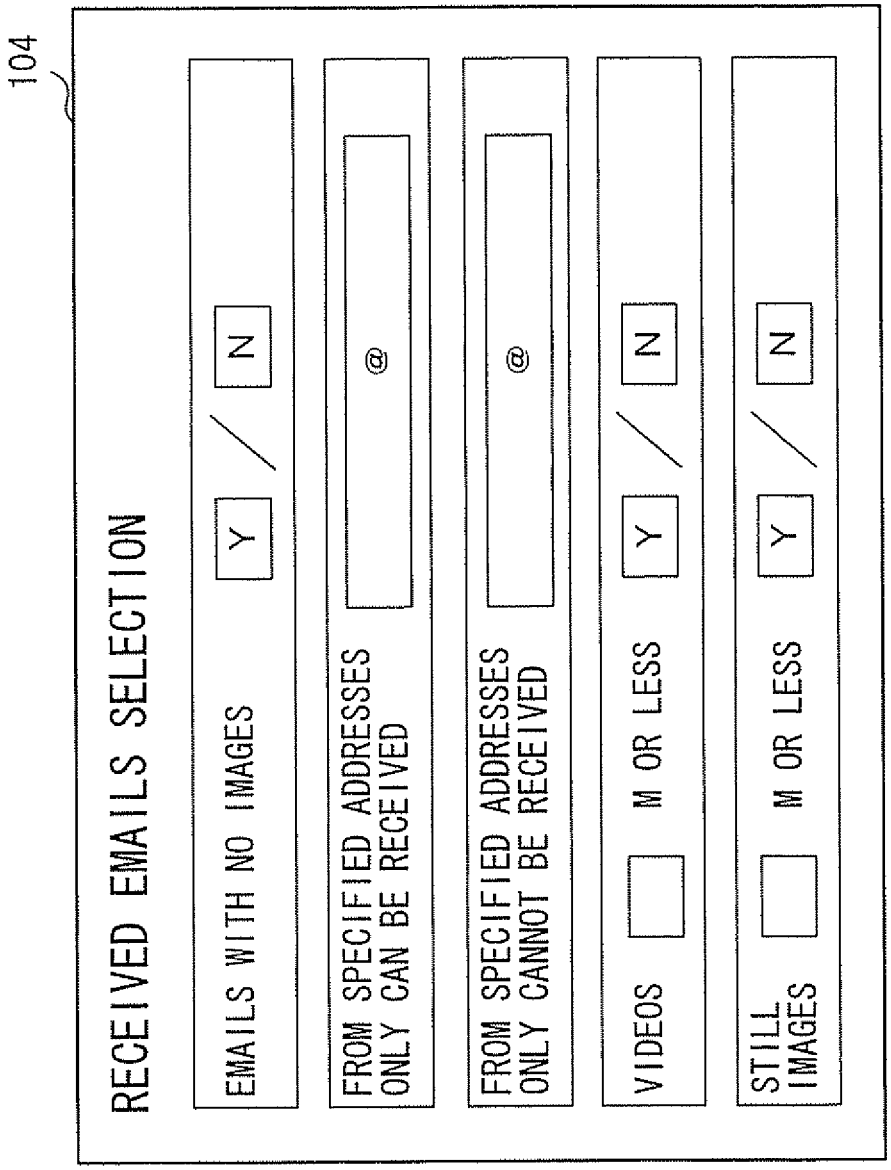
FIG. 48 is a figure showing an example of a screen display that is displayed upon the monitor 104 of the digital camera 1.

First, in a step S970, the email reception settings that are set in the digital camera 1 are read out. Next, in a step S971, these email reception settings that have been read out are applied. A screen like the one shown in FIG. 48 is displayed with these reception settings. The following settings can be made with this screen: among the email that is being stored upon the mail server, not to receive email from a specified email address; or, among the email that is being stored upon the mail server, to receive email only from a specified address; or, to receive only emails to which image data is appended; or, not to receive emails to which data is appended that cannot be handled by the digital camera 1; or, for each of videos and still images, to provide a limit upon the size of files that are received. It should be understood that, if the user has set the email address for saving images and the email address for reception as being the same, then naturally an email that has been sent from the digital camera 1 for saving an image is not received.

And, in a step S972, email agreeing with the conditions that have been set is searched for on the server. Then in a step S973 a decision is made as to whether or not emails exist that are to be the subjects of reception. If some such emails exist then the flow of control proceeds to a step S974, whereas if none exist then this processing flow terminates. And, in the step S974, the emails that are to be the subjects of reception are received.

(Sorting the Received Emails)

When an email is received, before receiving the attached image, the data size of the image data is displayed. At the same time, the remaining capacity of the memory card, rather than the number of shots, is displayed. By providing this display, it is possible for the user to check that the image data can be received, before receiving it.

If the number of emails that have accumulated upon the mail server and/or the amount of data is greater than or equal to a predetermined amount, then it is queried whether or not to receive them, since a considerable time will be taken for receiving them, and this may exert an influence upon other types of control.

First only the text (the title) of an email is received, and the image is received subsequently. It is possible to issue an order to receive an attached file. Thumbnail images of the attached images are received and displayed, and a image may be selected to be received.

The reception of an image may be refused.

According to the type of the attached file, it may be decided whether or not to receive an email. Only files that can be replayed by the camera may be received, i.e. still images, audio, and video.

If an email is a reply to an email that has been sent from this camera, then it is received and displayed even though no image may be attached to it.

Furthermore, it is possible to designate an email address to be received from. Moreover, it is also possible to designate an email address to refuse receipt of emails from.

Emails that have been sent by a digital camera by itself are not received.

Replay and use of an image attached to an email)

(Replay)

When the camera is changed over to the replay mode, along with photographed images being displayed, images received by email are also displayed. At this time it is arranged that these images have been received by email, and that there is some unread email. The recipient email addresses may be displayed by the properties.

When a received email is opened, the attached image is mainly displayed.

If there are a plurality of unread emails to which images are attached is unread, then the image that is attached to the first sent email may be initially replayed. Furthermore, the image that is attached to the last sent email may be initially replayed.

When opening an email to which a plurality of frames are attached, a list thereof is displayed. Or, the one whose date of photography is the oldest may be displayed, and they may be replayed in order of age, according to forward actuation. Or they may be replayed in the order in which they were attached. Or they may be replayed as a slide show. During such a slide show, the email text may be replayed as a subtitle. Or the email text may be displayed as scrolling. It is possible to select whether or not to display the email text together with the image.

According to information to the effect that the type of device that has sent an email is a portable telephone, the replay display of the image data is automatically displayed vertically. In other words, if the electronic mail data that has been received via the wireless LAN circuit 106 is data that has been created by a portable telephone, then a received image that is based upon image data included in this electronic mail data is replayed so that its vertical dimension is longer than its horizontal dimension. The image can be replayed in the correct orientation by doing this, since an image that has been photographed with a portable telephone with attached camera normally has a vertical dimension that is longer than its horizontal dimension.

On the replay menu, it is possible to select all images, photographed images only, or emailed images only.

(Recording in the Memory)

Image data that has been attached to a received email is stored in a folder, just as a photographed image is.

During storage, the address information or the name of the email sender is included in the file name.

Thumbnail images are created for image data that are not in Exif format, sent from a portable telephone or the like, and they are converted into Exif format and stored as such.

The fact that this is an image that has been received by email is recorded in the header information of the image file. By doing this, for image data that has been received by email, information is appended and recorded upon the memory card that specifies that this image data is image data that has been received by email. In this manner, when replaying an image such as previously described on the basis of photographed image data or received image data that is recorded upon the memory card, it is possible to distinguish between a photographed image and an image that has been received by email in a simple manner, according to the presence or absence of appended information.

A folder is created for each address from which email has been received, and image data that has been attached to emails received from that address are stored in that folder. In other words, when electronic mail data including image data is received via the wireless LAN circuit 106, the CPU 101 creates a plurality of folders corresponding to email addresses of the sources that have sent that electronic mail data. In this way, the data for the received images is recorded upon the memory card while being divided between the folders that have been created. By doing this, it is possible to make management of the images that have been received by email simple and easy.

It should be understood that, when storing the image data that is attached to a received email in the above manner, a folder is automatically created when greater than or equal to a predetermined number of images are received from the same address, and the image data is shifted to within that folder. In other words when, among the emails that have been received based upon electronic mail data received via the wireless LAN circuit 106, the total number of images attached to these emails that have the same email address as their origin has become greater than or equal to the predetermined number, then the CPU 101 creates a folder for that email address. And the destination for storage of the image data, among the received image data recorded upon the memory card, which has been sent from that address, is changed, so that the image data is shifted to within the folder that has been created. Due to this, it is possible to prevent the useless creation of a large number of folders.

The file names of the received images are renamed and recorded.

If no email text is written in a received email to which an image is attached, then it is not necessary subsequently to see the contents of the email. A reception log that specifies that the email has been received remains, while the email itself is not stored, but only its image data remains.

In the following control performed by this digital camera 1, for recording upon the memory card image data that has been received as attached to an email, will be explained.

Figure 33:
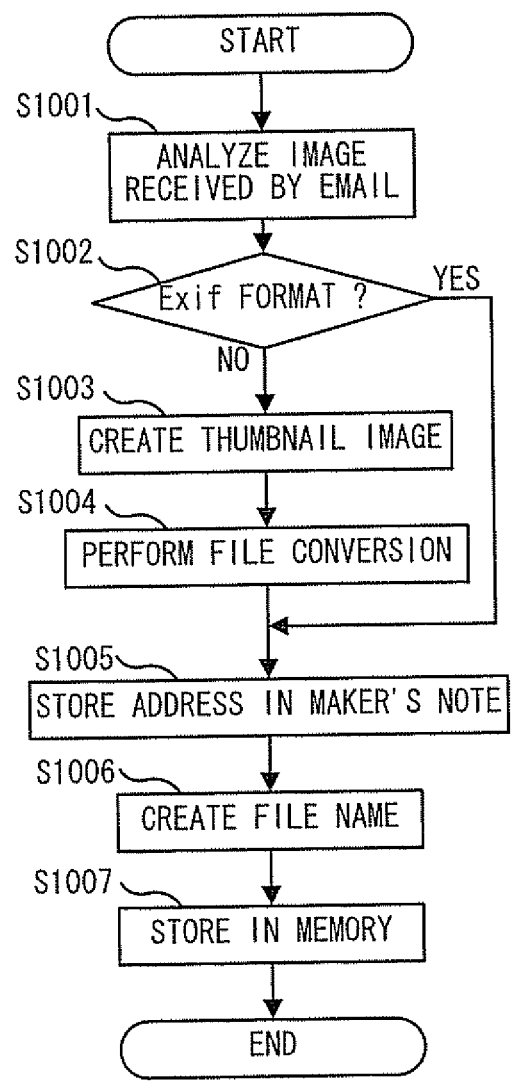
FIG. 33 is a flow chart showing image data recording control that is executed by the CPU 101 in the digital camera 1.

FIG. 33 is a flow chart showing image data recording control that is executed by the CPU 101 within the digital camera 1. This flow starts upon receipt of an email to which image data is attached.

First, in a step S1001, the image data that has been attached to an email and received is analyzed. Next, in a step S1002, a decision is made as to whether the result of this analysis is that the image data is image data of a format that is compatible with the Exif format. If it is image data in the Exif format then the flow of control is transferred to a step S1005, whereas if it is not image data in the Exif format then the flow of control proceeds to a step S1003.

And, in the step S1003, the image data that has been received is read out, and a thumbnail image of a size that matches the Exif format is created. If the received image data is compressed, the thumbnail image is created from the image after it has been subjected to expansion processing. Moreover, an image for display is also created by the digital camera 1 at the same time, since, apart from the thumbnail image, it is necessary to create image data for display that matches the resolution of the monitor 104.

Next, in a step S1004, file conversion to the Exif format is performed. In concrete terms, if JPEG compression is not already performed for the image data, JPEG compression is performed for the image data. Next, in a step S1005, the email address of the sender of the image data is appended to the maker's note, among the tags in the Exif format image data, which is managed uniquely by the maker. And next, in a step S1006, a new file name for recording is created. For example, with the objective of making it easy to tell the photographed images apart and in order not to create the same file name, the combination "MAIL001.JPEG", which is a combination of "MAIL" to mean that the image was received via email and "001" that is a number in sequence, may be created as a file name for the received image data that is recorded upon the memory card. Or a file name for the received image data may be created on the basis of information about the sender included in the electronic mail data that is received via the wireless LAN circuit 106. In other words, on the basis of the email address of the sender, or the name of the sender, or a portion of his nickname or the like, which are included in the received electronic mail data, a file name for the received image data may be created that includes these. For example "MOMOCHAN@001.JPEG", which is a combination of "MOMOCHAN@" and the number in sequence "001", or the like, may be created as a file name. By doing this, it is possible to create a file name that makes it easy to know from whom the image has been sent. Moreover, in order only not to create a file name that is the same, it would also be acceptable to arrange to create a file name by changing only the number in sequence of "DSC001.JPEG", which is created as a file name of photographed image data.

And, in a step S1007, the image data that is attached to the received email is recorded upon the memory card as received image data. At this time, as previously described, the image data is separated into folders that are created according to the email address of the senders, and the received image data is recorded upon the memory card under the file name that was created in the step S1006.

(Searching Emails)

It is possible to search the received emails, not only by its sender, its subject, or its text, but also by the image file name, the image file size, and the date and the time that the image was photographed. If a search keyword including any one of these is set, then a desired email from the received emails can be found on the basis of this search keyword. Accordingly, the user is able to find any desired received email reliably with a simple operation. It should be understood that by the date and the time of photography is meant the date and the time that the received image data appended to the email in question by the sender of the email were created.

It is possible to find a desired email not only from its email address, its subject, or its text, but also by displaying the attached images as thumbnails. The user selects any one of the thumbnail images that are displayed as a list, and, when he actuates the execute key, according to this actuation, the email text is displayed along with the magnified image. By doing this, under the control of the CPU 101, the image received by email that corresponds to the thumbnail image that was selected according to the actuation by the user, and the text of the received email to which that image was attached, are both displayed. Accordingly, the user is able to check the image and the text of the email in a simple manner, only by selecting the thumbnail image.

(Replying to an Email, and Forwarding an Email)

Figure 34:
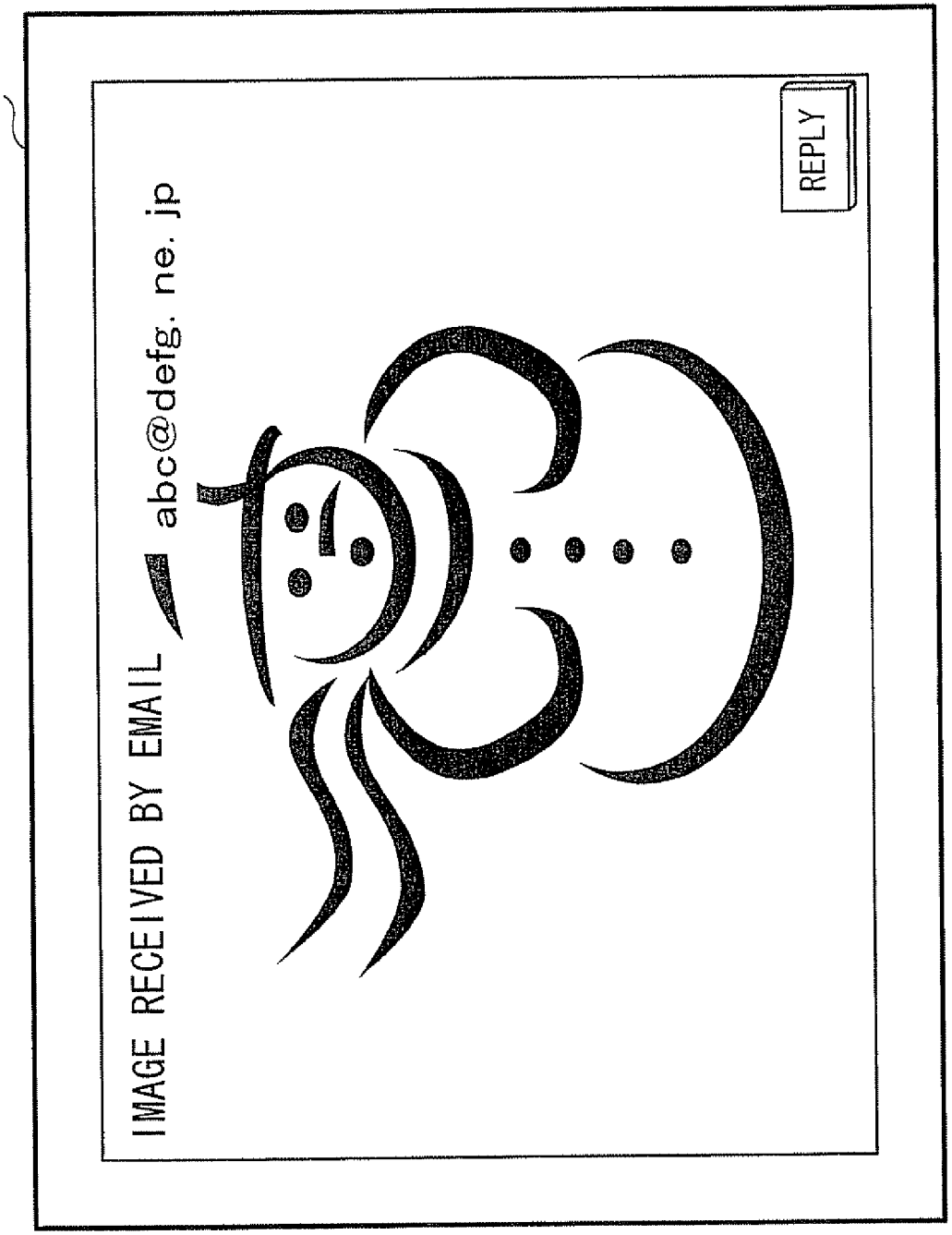
FIG. 34 is a figure showing an example of a screen display that is displayed upon the monitor 104 of the digital camera 1.
Figure 35:
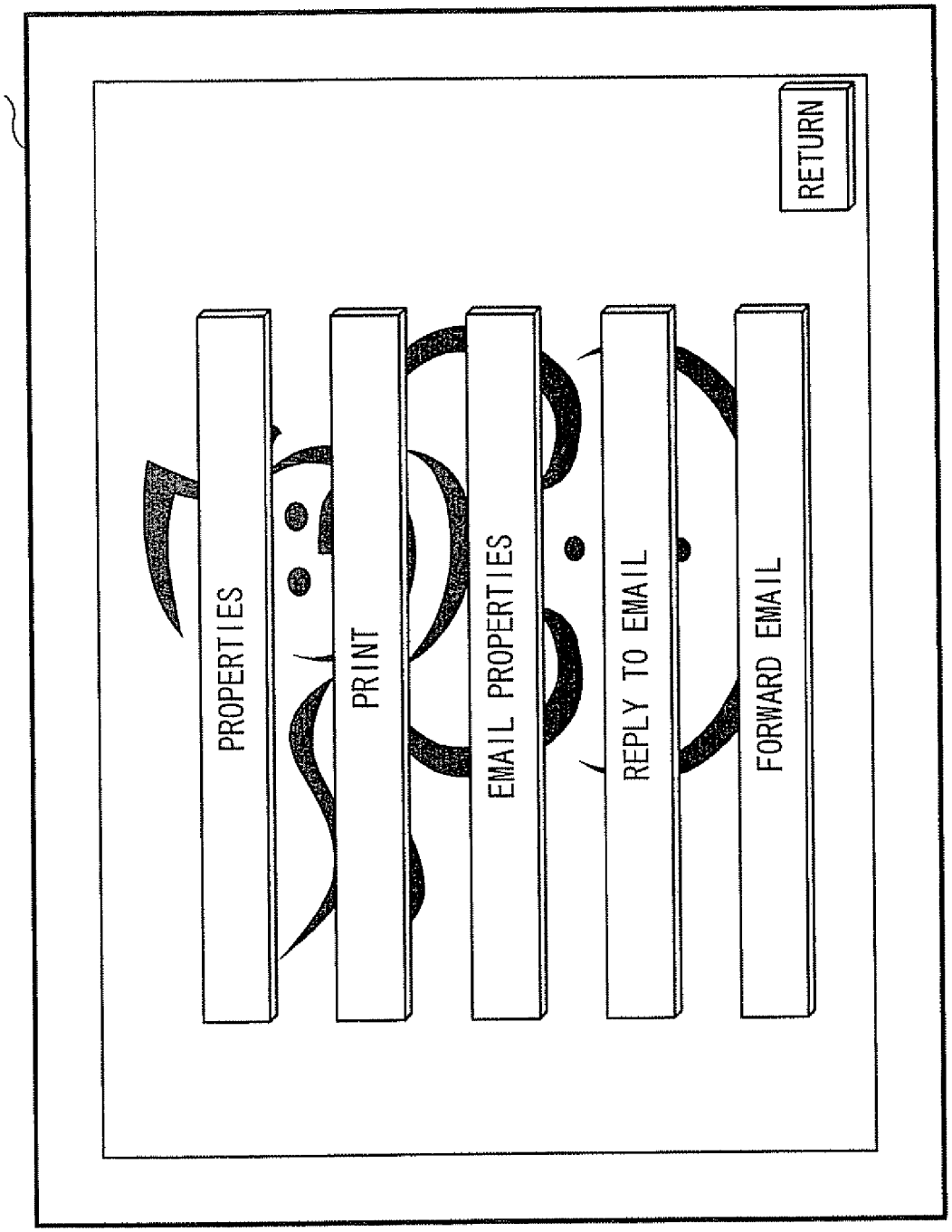
FIG. 35 is a figure showing an example of a screen display that is displayed upon the monitor 104 of the digital camera 1.

If the menu button 15 is actuated while the screen shown in FIG. 34 is being displayed, then the screen changes over to the screen shown in FIG. 35.

Figure 36:
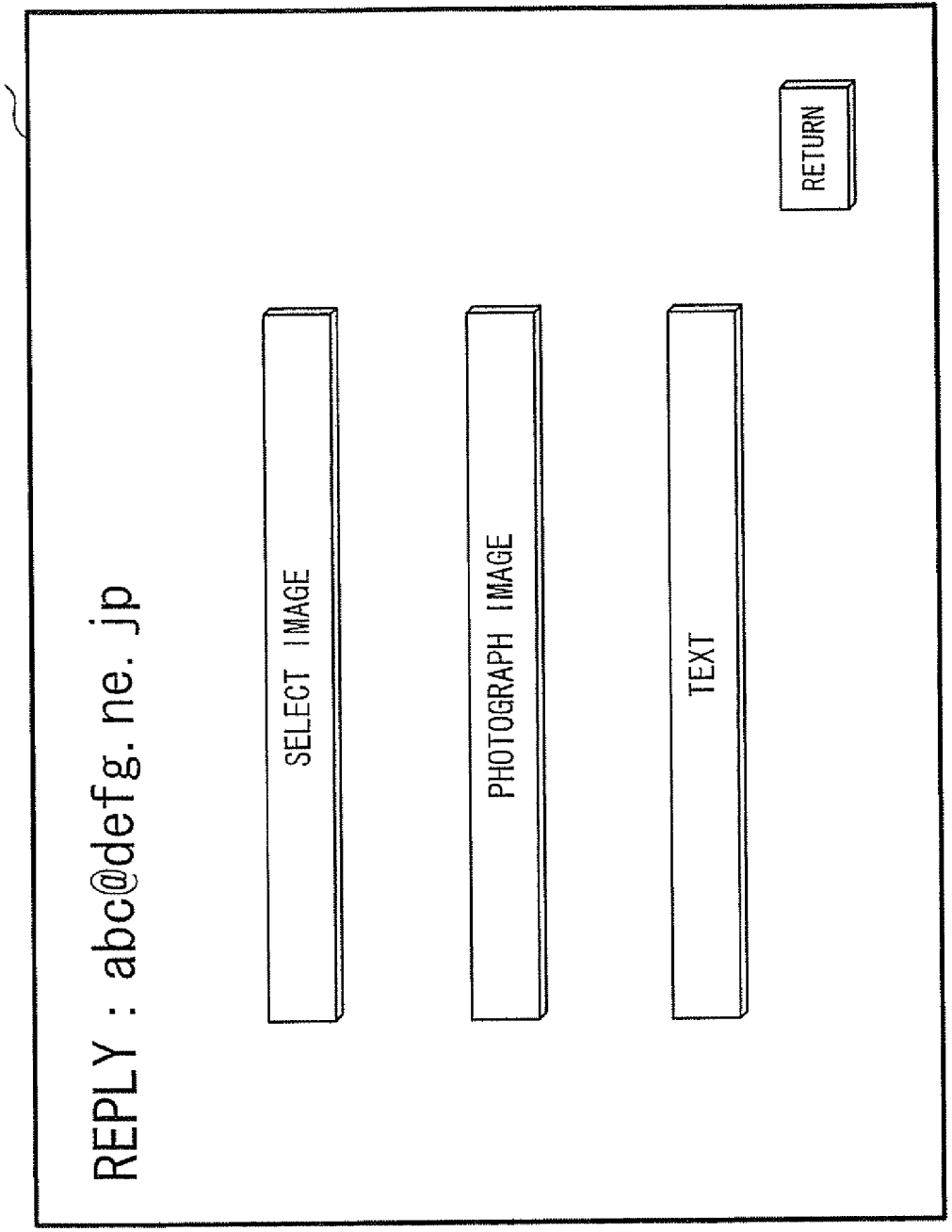
FIG. 36 is a figure showing an example of a screen display that is displayed upon the monitor 104 of the digital camera 1.

When "properties" is selected upon the menu screen display shown in FIG. 35, then the display changes to a screen upon which the properties of the image data are shown. When "print" is selected, the display changes over to the screen shown in FIG. 39. When "email properties" is selected, then the display changes over to a screen upon which the properties of an email to which image data is attached are displayed. When "reply to email" is selected, then the display changes over to the screen shown in FIG. 36. And when "forward email" is selected, then the display changes over to a screen for forwarding email.

On the screen shown in FIG. 34a "reply" button is provided, so that it is possible directly to select "reply to email" whose frequency of usage from the menu of FIG. 35 is high. When "reply" is selected upon the screen of FIG. 34, or "reply to email" is selected on the screen of FIG. 35, then the display changes over to displaying the screen shown in FIG. 36.

If an email with an image attached is sent in reply to a received email to which an image was attached, then the received image and the sent image (the reply image) are stored in correspondence with one another. In other words, when the reply email is created, and the electronic mail data for this reply email has been sent via the wireless LAN circuit 106, the received image data for the received email that corresponds to that reply email, and the photographed image data that corresponds to the reply image attached to that reply email, are recorded upon the memory card in mutual correspondence with one another. Due to this, if either the received image or the reply image is designated, it is possible to specify the other in a simple manner. Moreover, the resolution of the sent image is made to be of the same order as that of the received image.

In the following, the processing for generating image data attached to an email in reply to an email to which a received image has been attached, will be explained in concrete terms.

Figure 37:
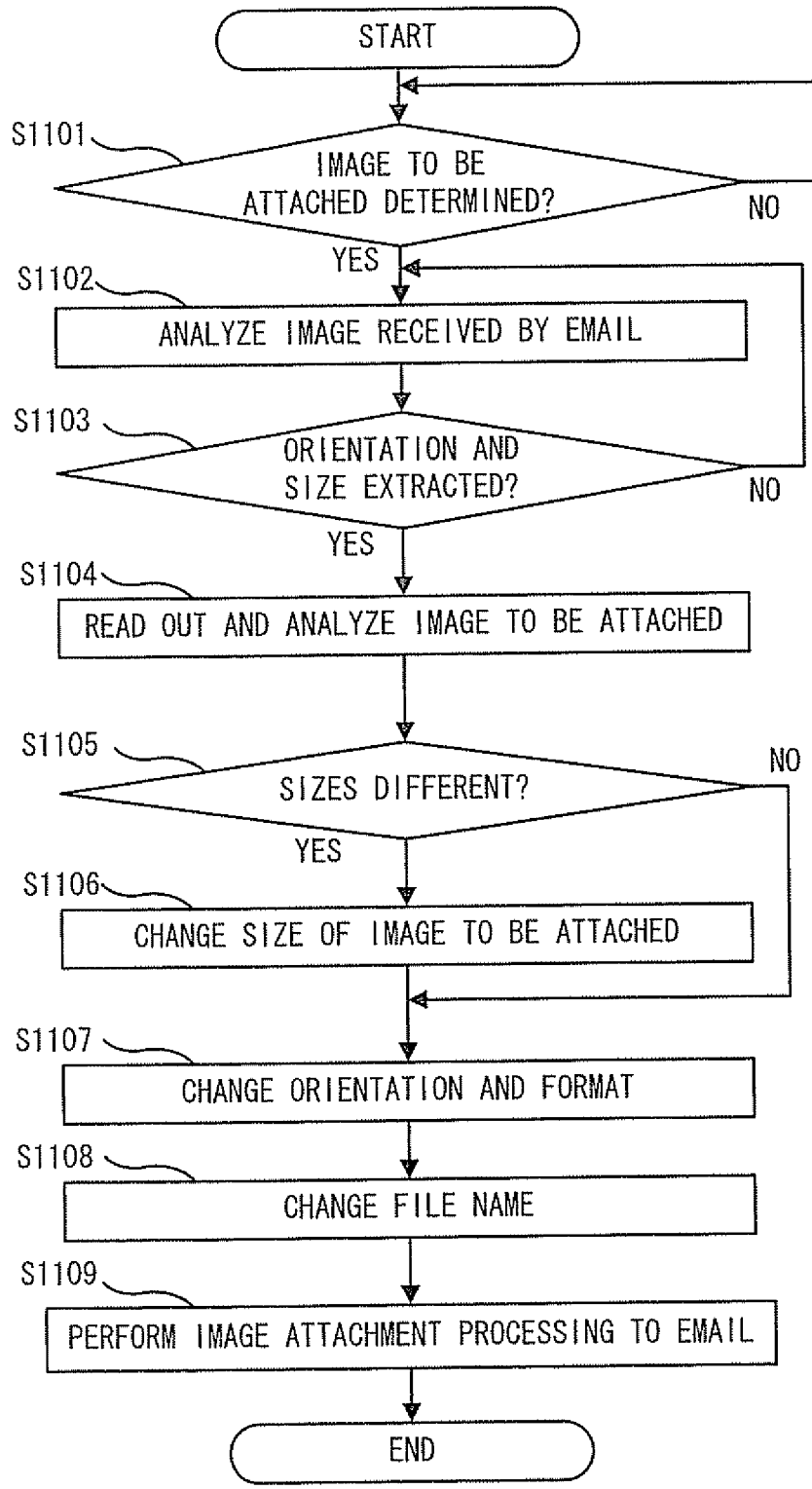
FIG. 37 is a flow chart showing image attachment control that is executed by the CPU 101 in the digital camera 1.

FIG. 37 is a flow chart showing image attachment control that is performed by the CPU 101 within the digital camera 1. This flow starts when "image selection" is selected upon the screen display shown in FIG. 36, upon which the display changes over to a screen for selection of an image to be attached.

First, in a step S1101, it is detected whether an image has been determined for attachment to the reply email. If an image has been determined then the flow of control proceeds to a step S1102, whereas if no image has been confirmed then the flow of control returns to this step S1101 again. And, in the step S1102, the received image data that was attached to the received email is analyzed. The image size, data amount, image orientation, compression method, file format and so on of the image data are analyzed. And in a step S1103, a decision is made as to whether the analysis has been completed. If the analysis has been completed then the flow of control proceeds to a step S1104, whereas if it has not been completed then the flow of control returns to the step S1102, and the analysis processing is continued.

Next, in the step S1104, the attached image data determined in the step S1101 is read out and analyzed. In this analysis, the image size of the image data is detected. Next, in a step S1105, the image size of the received image data that was analyzed in the step S1102 and the image size of the data for the image to be attached that was analyzed in the step S1104 are compared together. If the image size of the image data to be attached is the larger, then the flow of control proceeds to a step S1106, whereas if it is not the larger, then the flow of control is transferred to a step S1107.

And, in the step S1106, image processing is performed so as to change the image size of the image data to be attached to make it almost equal to the image size of the received image data. By doing this, an upper limit data amount is set for the image to be sent that is to be attached to the reply email in response to the received email, according to the data amount of the image that was attached to that received email. Due to this, it is possible to set an upper limit data amount automatically, as appropriate to the communication environment of the destination for reply.

And next, in a step S1107, the orientation of the image data to be attached is changed to match the orientation of the image of the received image data. Moreover, the data for the image to be attached is changed to a compression method and a file format that are the same as the compression method and the file format of the received image data. Furthermore, depending upon the email address for sending, in a similar manner to when creating an email for sending as described previously, tag information (photographic information) that is appended to the image data is deleted, so that it is ensured that information that is related to privacy does not leak.

Next, in a step S1108, the file name of the attached image data is renamed. If the recipient is a friend, then it is renamed to a file name such as "KUROBUTA@001" or the like, in which the email address or the nickname of the user who is the sender is included. Furthermore, if the recipient is not an acquaintance, then it may be renamed to a file name such as "ASDFF.JPEG" or the like, in which a random character sequence that cannot specify any individual person is included. The file name for the image to be sent is determined in this manner by renaming it according to the email address to which it is to be sent. And, in a step S1109, attachment processing is performed, so that the attached image data may be sent by email. By doing this, a reply email is created to which an image to be sent based upon the photographed image data is attached, and electronic mail data corresponding to this reply email is then sent via the wireless LAN circuit 106.

According to the control described above, it is possible to send image data without imposing any onerous burden upon the recipient terminal.

Furthermore, the digital camera 1 is able, not to select image data to be attached to the reply email from image data that has already been photographed, but rather to take a new photograph for attachment.

Figure 38:
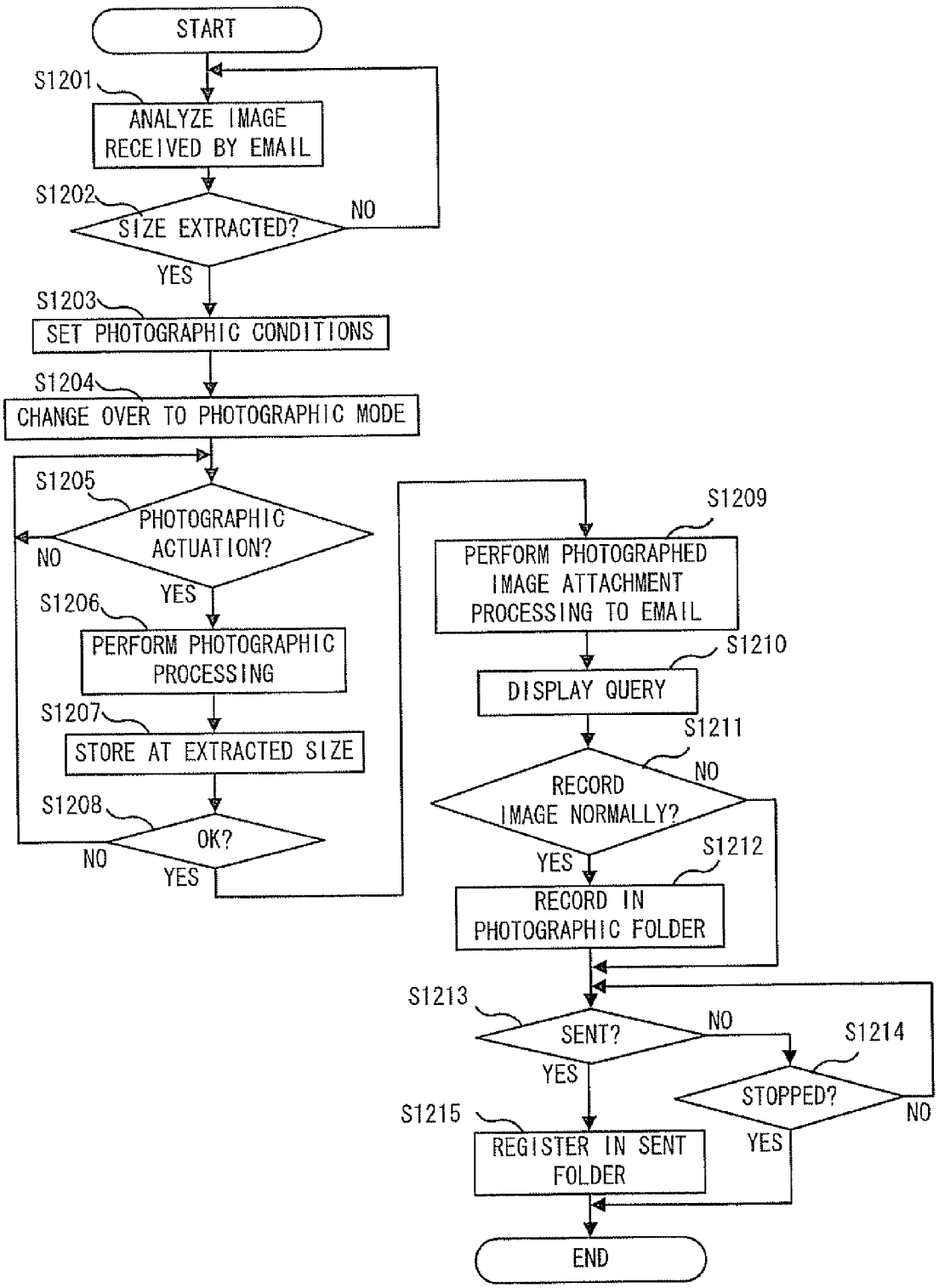
FIG. 38 is a flow chart showing image attachment control that is executed by the CPU 101 in the digital camera 1.

Next, this control by the digital camera 1 for using image data that has been newly photographed as attached image data for a reply email will be explained. FIG. 38 is a flow chart showing image attachment control that is executed by the CPU 101 within the digital camera 1. This flow starts when "photograph image" is selected upon the screen display shown in FIG. 36.

First, in a step S1201, the received image is analyzed. Next, in a step S1202, a decision is made as to whether this analysis has been completed.

In a step S1203, the photographic conditions are set to match the results of analysis. In concrete terms, the image size, the compression method, and the file format of the image data to be photographed are made equal to those of the received image. Next, in a step S1204, the mode is changed over to the photographic mode. Next, in a step S1205, actuation by the user of the shutter button 11 to full press is detected. When full press actuation is detected, then the flow of control proceeds to a step S1206, while if full press actuation is not detected then the detection operation is continued.

And, in a step S1206, photographic processing is performed under the photographic conditions that were set in the step S1203. Next, in a step S1207, the image data is temporarily stored in the memory 108 within the digital camera 1. Furthermore, along with replaying the image that has been photographed upon the monitor 104, a query is also displayed asking whether the image to be sent is "OK" or whether to "retake picture".

Next, in a step S1208, a decision is made as to whether "OK" has been selected or "retake picture" has been selected. If "OK" has been selected then the flow of control proceeds to a step S1209, whereas if "retake picture" has been selected then the flow of control returns to the step S1205.

Next, in a step S1209, processing is performed to attach the image to an email.

Then in a step S1210, a query screen is displayed upon the monitor 104, asking whether or not to record the image data that has been photographed as photographed image data, in a similar manner to normal photographic operation Next, in a step S1211, it is detected which of selection actuation for "record normally" and selection actuation for "do not record normally" has been performed. If "record normally" has been selected, then the flow of control proceeds to a step S1212, whereas if "do not record normally" has been selected, then the flow of control is transferred to a step S1213.

Next, in the step S1212, the image data is recorded in the photography folder And next, in the step S1213, a decision is made as to whether actuation has been performed for sending the email with the image attached. If that actuation has been performed then the flow of control is transferred to a step S1215, whereas if the actuation has not been performed then the flow of control proceeds to a step S1214.

And, in the step S1214, it is detected whether the sending of email has been stopped, or the attachment of the image has been stopped. If it is detected that one of these has been stopped, then this processing flow terminates, whereas if it has not been so detected, then the flow of control returns to the step S1213. And, in the step S1215, the image data is recorded in the sent folder.

It should be understood that, when a reply email has been sent to a received email, a slide show that includes the image attached to the reply email is replayed.

(Printing Control)

Figure 39:
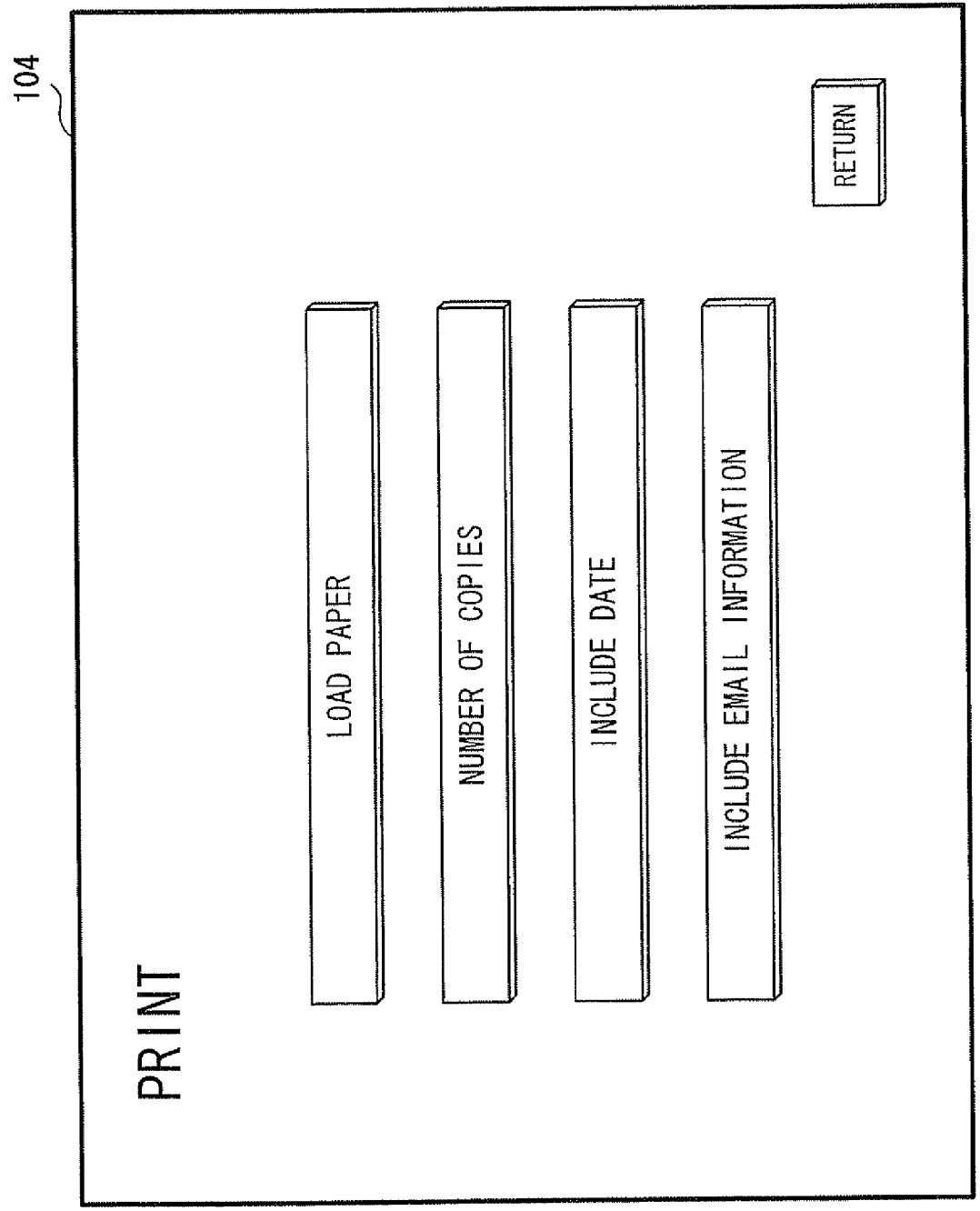
FIG. 39 is a figure showing an example of a screen display that is displayed upon the monitor 104 of the digital camera 1.
Figure 40:
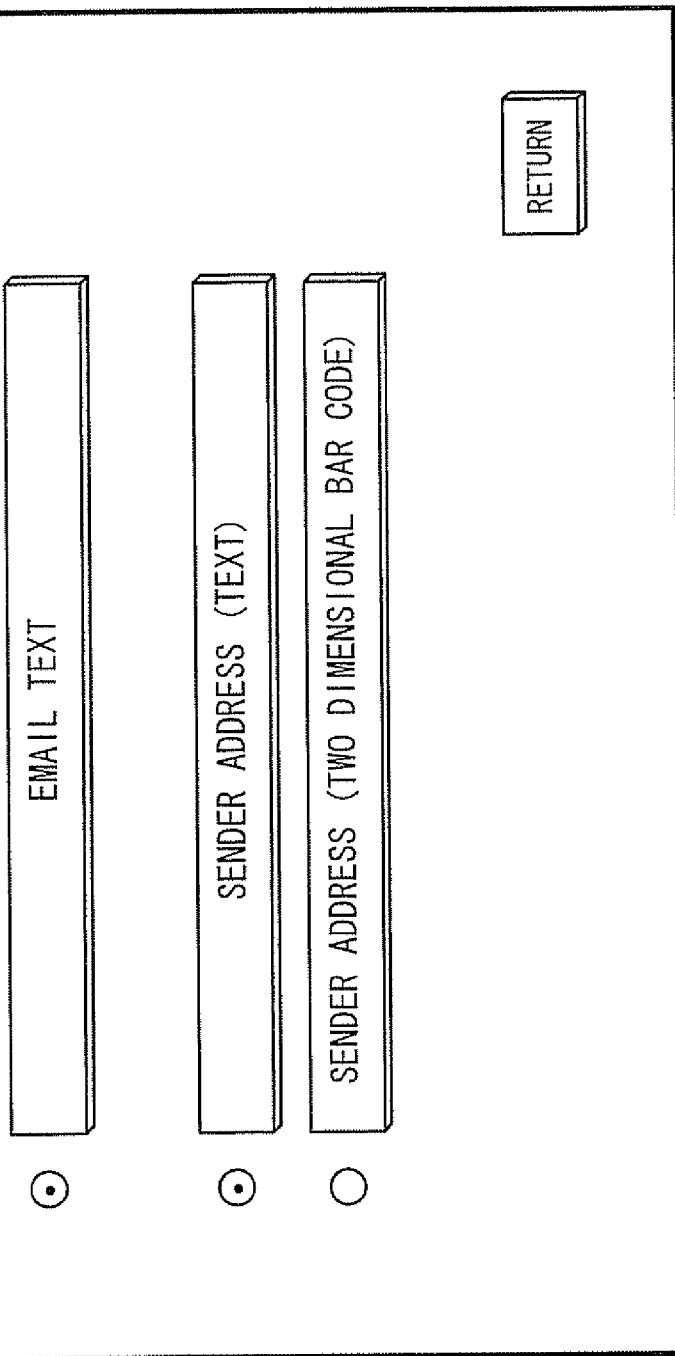
FIG. 40 is a figure showing an example of a screen display that is displayed upon the monitor 104 of the digital camera 1.

Furthermore, when "print" is selected upon the screen shown in FIG. 35, which is displayed by actuation of the menu button 15 when image data that has been received is being replayed, then the display changes over to the screen shown in FIG. 39. FIG. 39 is a menu screen for performing print settings that are required during printing processing. On the screen display shown in FIG. 39, any of the setting items "load paper", "number of copies", "include date", and "include email information" may be selected. Since each of the items "load paper", "number of copies", and "include date" is also provided to a prior art type digital camera, explanation thereof will be omitted. Here, only "include email information" will be explained. With this digital camera 1, print control is not primarily performed for email text, but rather primarily for attached image data; this is different from the case of printing an email with email software on a personal computer or the like. When "include email information" is selected, the display changes over to the screen shown in FIG. 40. When "email text" is selected on the screen shown in FIG. 40, the email text is printed as superimposed over the image data. And, when "sender address" is selected, the address of the sender is printed as superimposed over the image data.

Figure 41:
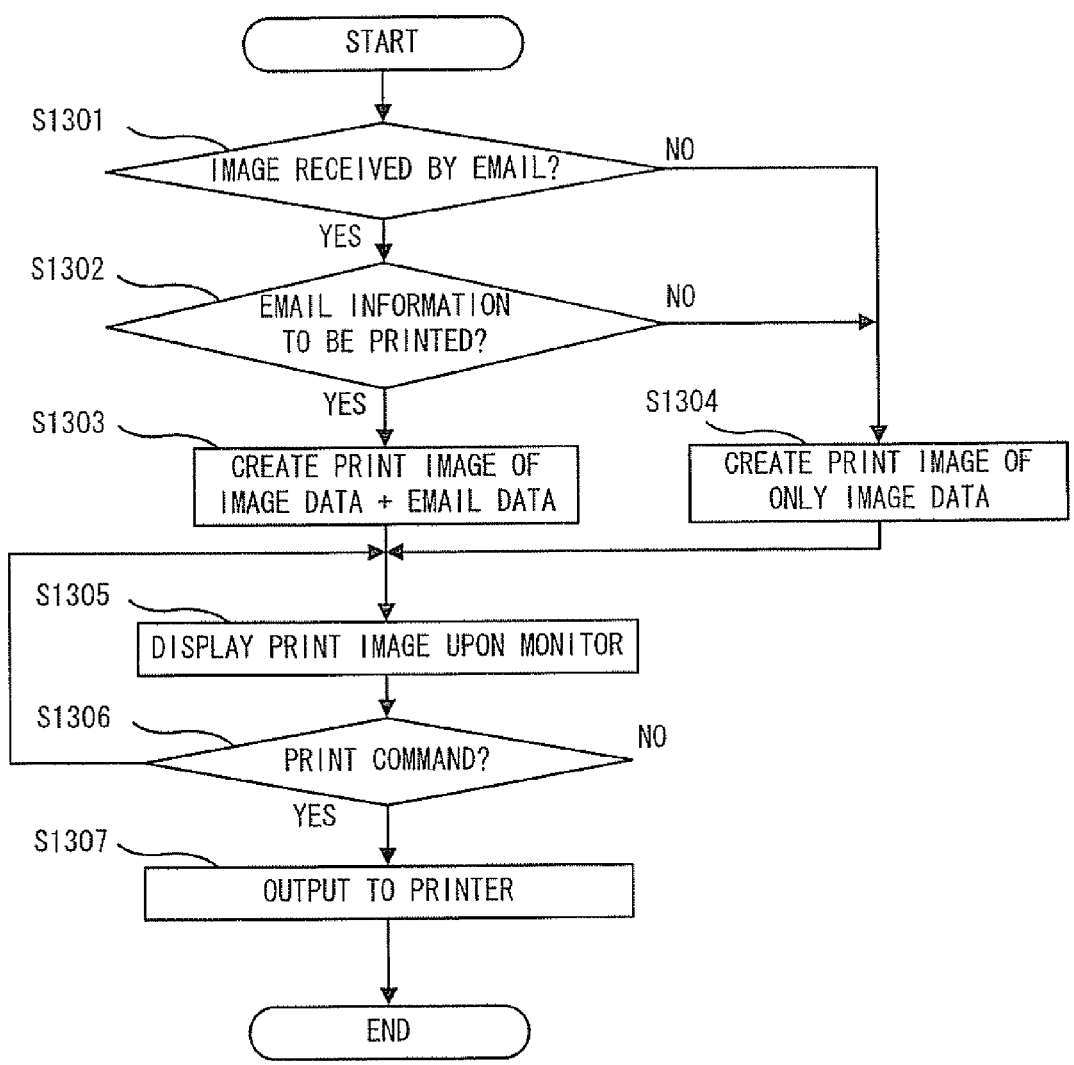
FIG. 41 is a flow chart showing print control that is executed by the CPU 101 in the digital camera 1.

FIG. 41 is a flow chart showing print control that is performed by the CPU 101 within the digital camera 1. This flow starts upon detection of the end of print setting upon the display screen shown in FIG. 39.

First, in a step S1301, a decision is made as to whether the image data that has been ordered to be printed is received image data attached to the received email. If the image data is such received image data, then the flow of control proceeds to a step S1302, whereas if the image data is not received image data then the flow of control is transferred to a step S1304.

And in the step S1302 a decision is made, from the print setting, as to whether a setting is established to perform printing including the email information. If a setting is established to perform printing including the email information, then the flow of control proceeds to a step S1303, whereas if such a setting is not established the flow of control is transferred to the step S1304. By doing this, it is determined whether or not to print the text of the received email.

Figure 42:
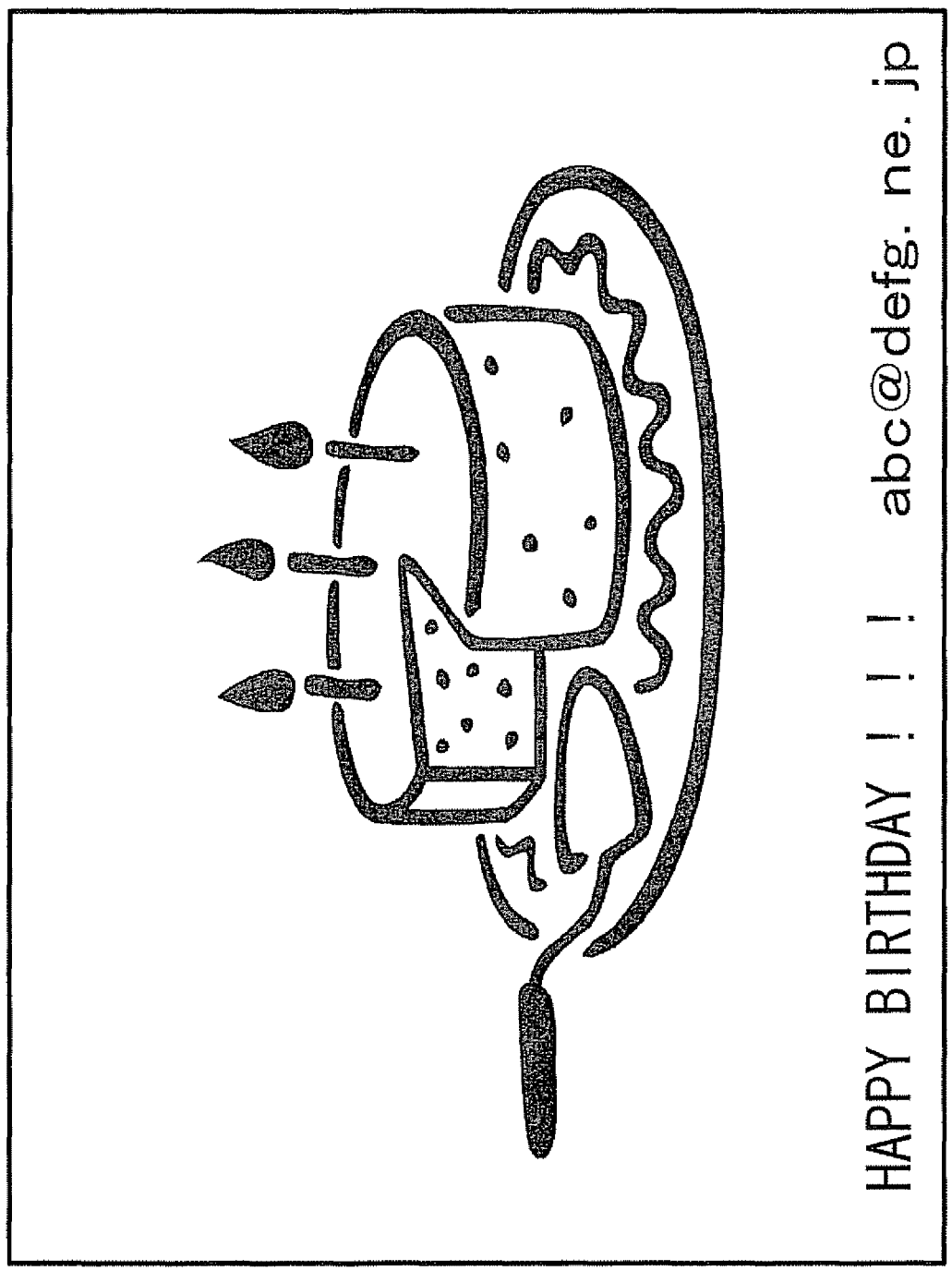
FIG. 42 is a figure showing an example of a screen display that is displayed upon the monitor 104 of the digital camera 1.
Figure 43:
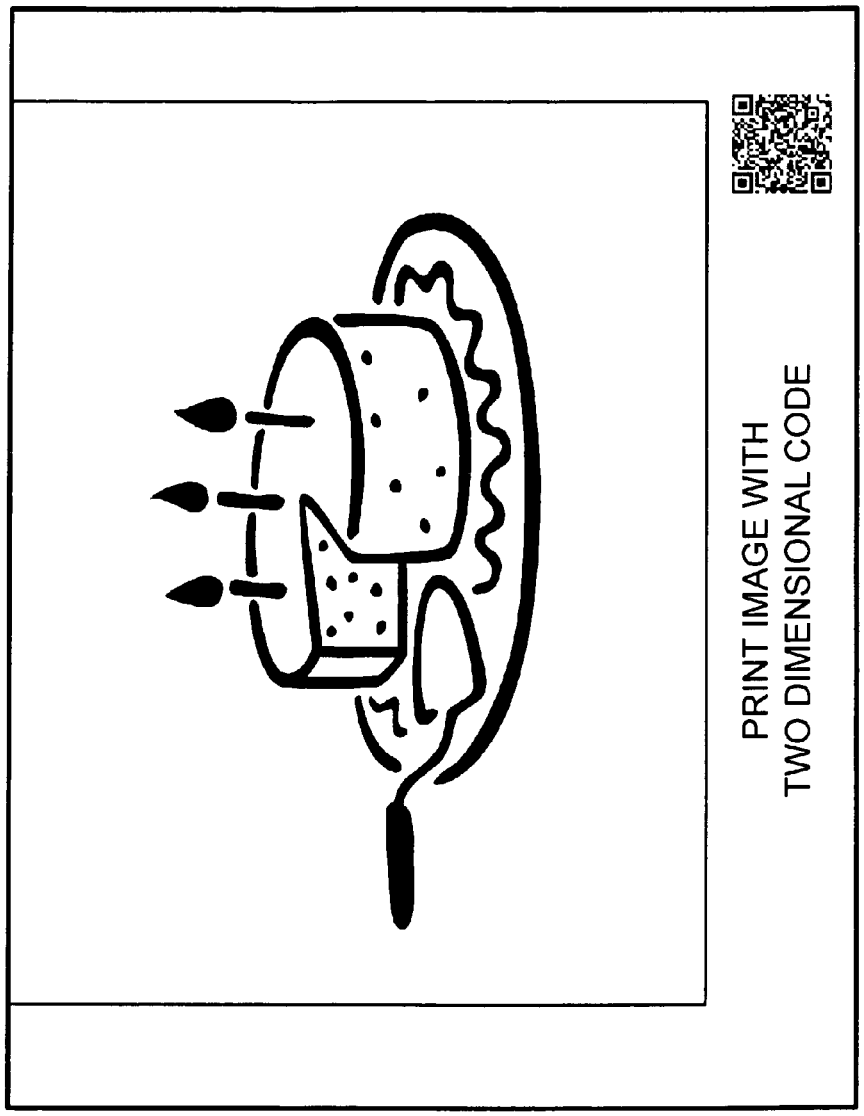
FIG. 43 is a figure showing an example of a screen display that is displayed upon the monitor 104 of the digital camera 1.

In the step S1303, a print image is created by combining the email information and the image that have been set to be printed. FIG. 42 shows an example of such a print image that is set to be printed, including both the email text and the email address. And FIG. 43 shows an example of such a print image in which a pattern is to be printed in which the email address is encoded as a two dimensional code, together with the received image data.

On the other hand, in the step S1304, a print image including only the image is created.

And, in a step S1305, the print image that has been created is displayed upon the monitor 104. Then in a step S1306, it is detected whether print execution actuation has been performed. If print execution actuation has been detected, then the flow of control proceeds to a step S1307, whereas if it has not been detected then the flow of control returns to the step S1305. And, in the step S1307, the print image that has been created is outputted to the printer. In other words, if it has been determined in the step S1302 that the text of the received email is to be printed, then a signal is outputted to the printer for printing the text of the received email along with the received image based upon the received image data recorded upon the memory card. On the other hand, if it has been determined in the step S1302 that the text of the received email is not to be printed, then a signal is outputted to the printer for printing only the received image based upon the received image data recorded upon the memory card.

Since, with the print control as described above, if the user wishes, he can print not only the image that was received via email, but also the text of the email together therewith, and accordingly the convenience of use is enhanced.

(Deletion Control)

Figure 44:
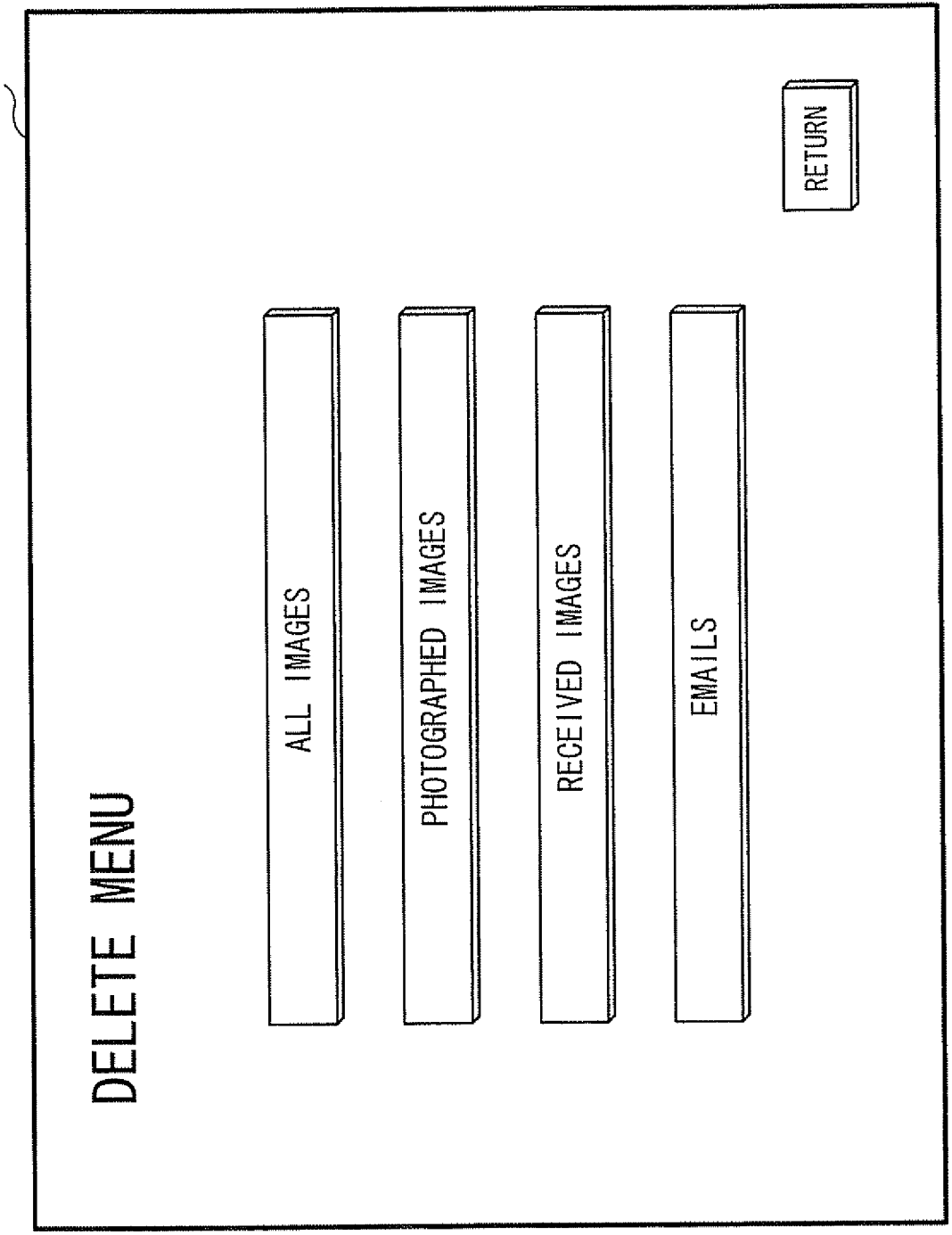
FIG. 44 is a figure showing an example of a screen display that is displayed upon the monitor 104 of the digital camera 1.

When the delete button 16 is actuated in the state in which no image is being replayed, the screen shown in FIG. 44 is displayed. FIG. 44 shows an example of screen display of a delete menu for deleting data within the digital camera 1.

When "all images" is selected upon the screen display shown in FIG. 44, it is possible to delete all of the image data in the digital camera 1. Furthermore, when "photographed images" is selected, it is possible to delete the photographed image data, but not the image data that has been appended to received emails. Moreover, when "received images" is selected, it is possible to delete the image data that has been attached to received emails, but not the photographed image data. And, when "emails" is selected, it is possible to delete the email information.

(Transfer Control)

When transferring data to an external memory such as a portable computer, it is possible to set whether or not image data, email data, and soon will be transferred automatically. Moreover, it is possible to select whether or not the data that has been transferred will be deleted from within the digital camera 1.

Figure 45:
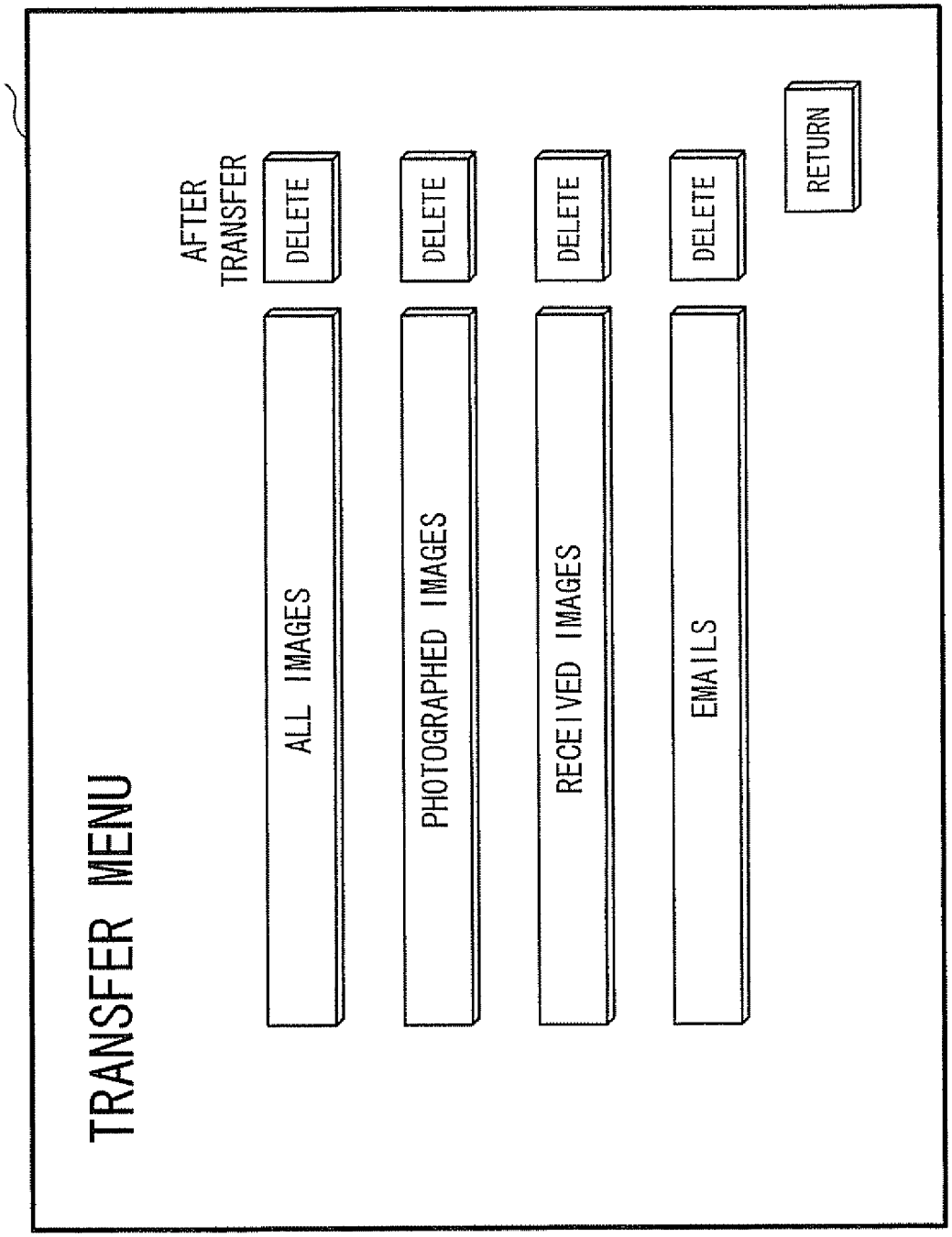
FIG. 45 is a figure showing an example of a screen display that is displayed upon the monitor 104 of the digital camera 1.

When "all images" is selected upon the screen display shown in FIG. 45, it is possible to transfer the data for all of the images in the digital camera 1. Moreover, when "photographed images" is selected, it is possible to transfer the photographed image data, but not the image data that has been appended to received emails. Moreover, when "received images" 1 is selected, it is possible to transfer the image data that has been attached to received emails, but not the photographed image data. And, when "emails" is selected, it is possible to transfer email information.

Furthermore, when "delete" to the right of each item is selected, then it is possible to delete the corresponding data from the digital camera 1 automatically, after it has been transferred.

Figure 53:
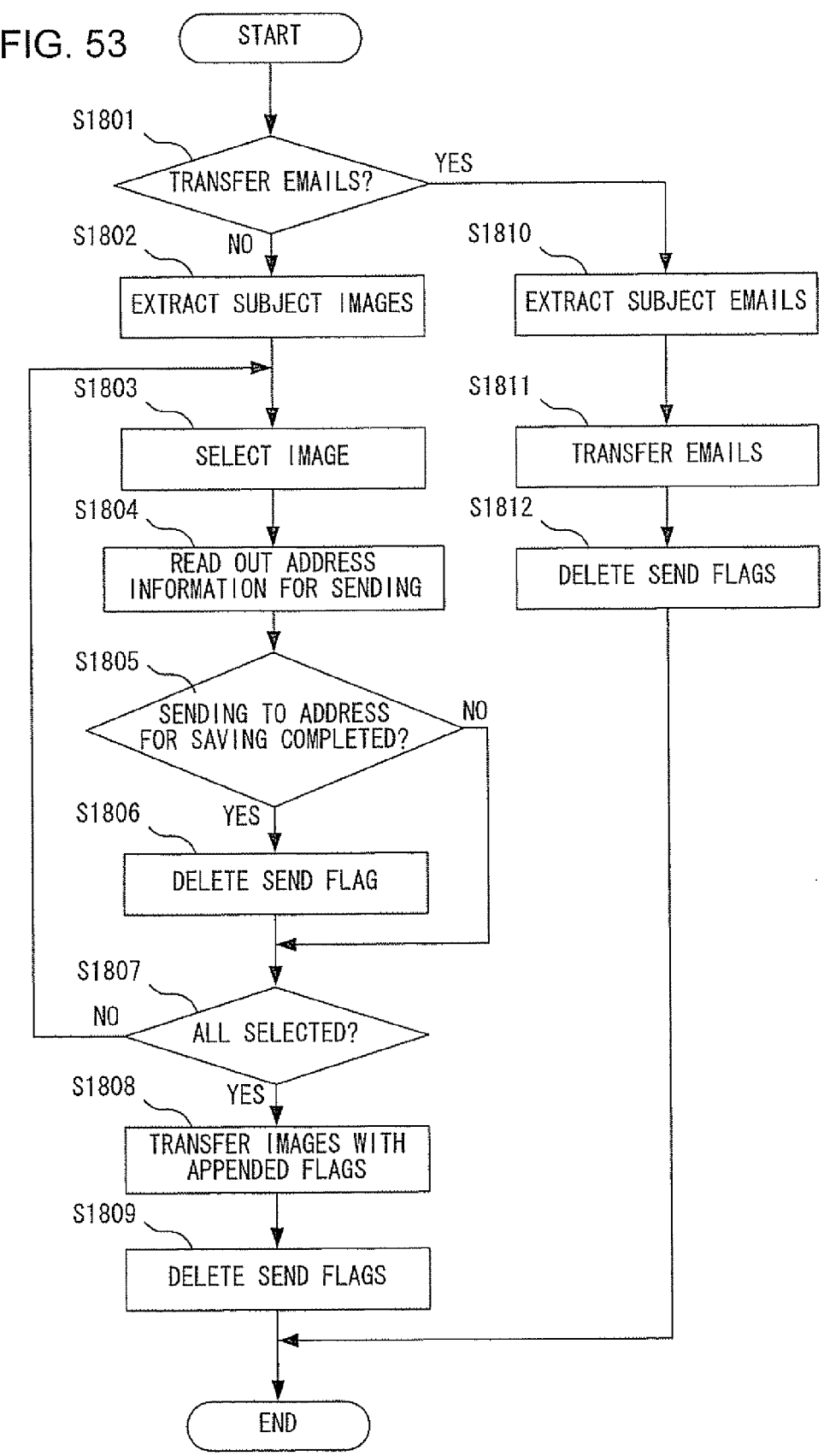
FIG. 53 is a flow chart showing transfer control that is executed by the CPU 101 in the digital camera 1.

FIG. 53 is a flow chart showing transfer control that is performed by the CPU 101 when transferring data from the digital camera 1. In a step S1801, a decision is made as to whether or not emails are to be transferred. If any one of "all images", "photographed images", or "received images" has been selected upon the screen of FIG. 45, then it is decided that emails are not to be transferred, and the flow of control proceeds to a step S1802. On the other hand, if "emails" has been selected, then it is decided that emails are to be transferred, and the flow of control proceeds to a step S1810.

In the step S1802, the images that are to be the subject of transfer are extracted. If "all images" has been selected upon the screen of FIG. 45, then, among the photographed image data and the received image data recorded upon the memory card, those images for which the image data has not yet been transferred are extracted as the subject images. Moreover, if photographed images or "received images" has been selected upon the screen of FIG. 45, then, among either the photographed image data or the received image data recorded upon the memory card, those images for which the image data has not yet been transferred are extracted as the subject images. It should be understood that whether an image has been transferred or not is decided according to a send flag that is appended to the image data. The fact that such a send flag is appended to an item of image data, means that it has not yet been transferred.

In a step S1803, one of the subject images that was extracted in the step S1802 is selected. And in a step S1804, the address information for sending, which is included in the data for this image that was selected in the step S1803 is read out. This address information for sending specifies the email address that was the destination if the selected image was attached to an email and sent. In other words, by reading out the address information for sending, it can be understood to what email address this image has been sent.

In a step S1805, on the basis of the address information for sending, which was read out in the step S1804, a decision is made as to whether or not sending of the selected image to the email address for saving has been completed. This email address for saving is, as described previously, the address that is used by the user himself as an external memory for saving image data, and is set via the screen of FIG. 27. If sending of the selected image to the email address for saving has been completed, then the flow of control proceeds to a step S1806, and, after the send flag has been deleted, the flow of control proceeds to a step S1807. On the other hand, if sending of the selected image to the email address for saving has not been completed, then the flow of control is transferred to the step S1807, without the step S1806 being executed.

In the step S1807, a decision is made as to whether or not all of the subject images that were extracted in the step S1802 have been selected in the step S1803. If all of them have already been selected, then the flow of control proceeds to a step S1808, whereas if there remains some subject image that has not yet been selected, then the flow of control returns back to the step S1803.

In the step S1808, the data is transferred for those images, among the subject images that were extracted in the step S1802, that have appended flags, i.e. to which send flags are appended. By doing this, among the image data that has not yet been transferred, the image data is transferred to the email address for saving, except for that image data whose transfer has been completed. And in a step S1809, the send flags are deleted from the images that have been transferred. At this time, if "delete" has been selected upon the screen of FIG. 4S, then not only the send flag, but also the image data itself is deleted. When the step S1809 has been executed, the flow chart of FIG. 53 terminates.

Moreover, if a decision was taken in the step S1801 that emails are to be transferred, then in the step S1810 the received emails that are to be the subjects of transfer are extracted. Here, among the received emails that are recorded upon the memory card, those received emails that have not yet been transferred are extracted as the subject emails.

In the step S1811, the subject email that was extracted in the step S1810 is transferred. Due to this, the received email that has not yet been transferred is transferred. And, in the step S1812, the send flags are deleted from the emails that have been transferred. At this time, if "delete" was selected upon the screen of FIG. 45, then not just the send flag, but the data itself is deleted. When the step S1812 has been executed, the flow chart of FIG. 53 terminates.

(Storing in Separate Folders)

A setting may also be established to store images that have been attached to emails sent from the digital camera 1, or images that are attached to emails received by the digital camera 1, in separate folders that are created for each day upon which the received emails arrived, or for each day upon which the emails for sending were sent.

Figure 49:
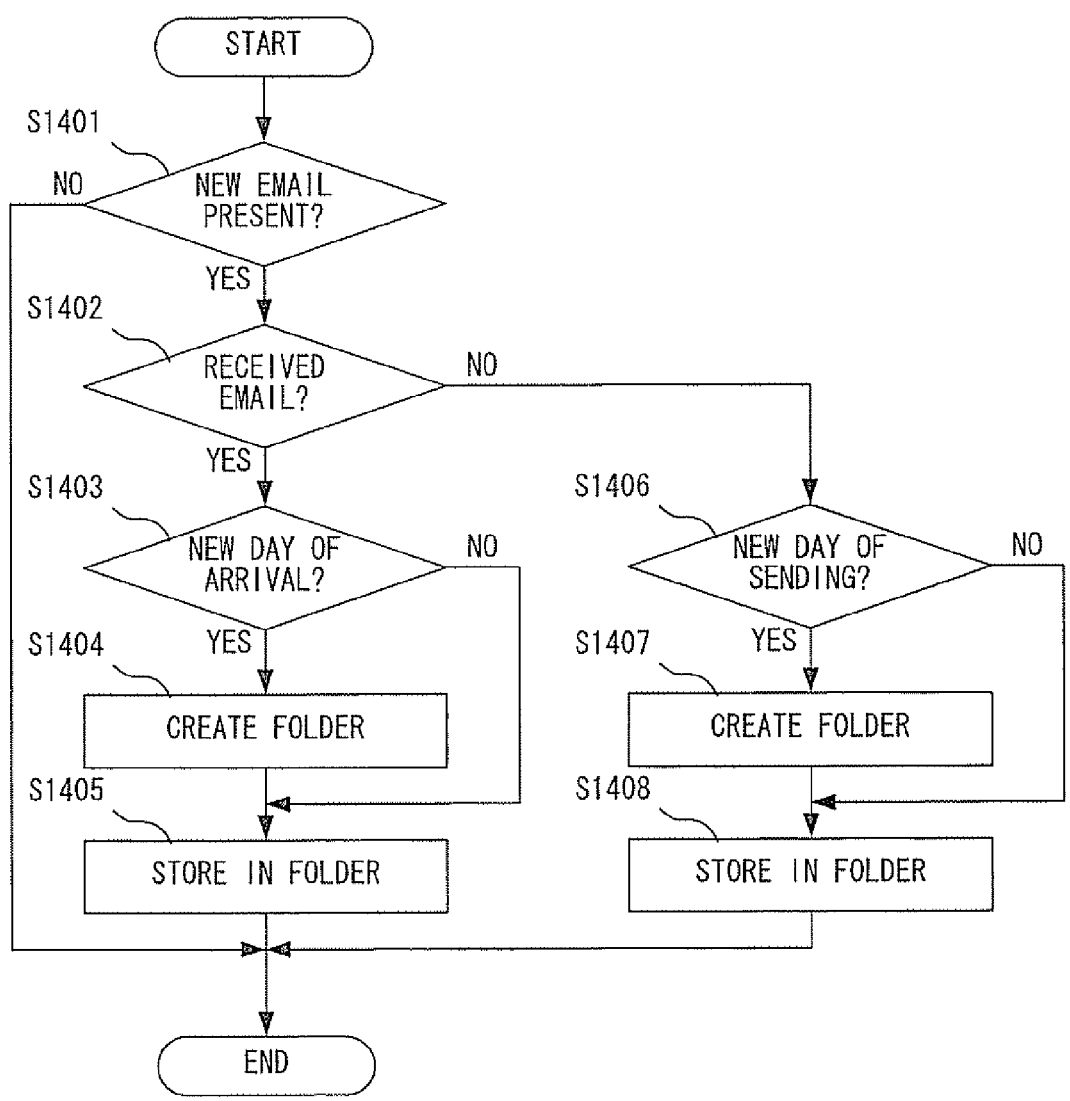
FIG. 49 is a flow chart showing separate folder storage control that is executed by the CPU 101 in the digital camera 1.

FIG. 49 is a flow chart showing separate folder storage control that is executed by the CPU 101 of this digital camera 1. This separate folder storage control may be executed, for example, after the email send and receive processing. In a step S1401, a decision is made as to whether or not there is any new email for which electronic mail data has been sent or received via the wireless LAN circuit 106. If there is any new email then the flow of control proceeds to a step S1402, whereas if there is none then the flow chart of FIG. 49 terminates. In the step S1402, a decision is made as to whether or not this new email is received email. If it is received email then the flow of control proceeds to a step S1403, whereas if it is not received email, in other words if it is sent email, then the flow of control is transferred to a step S1406.

In the step S1403, a decision is made as to whether or not the day of arrival of this received email is a new day of arrival. If it is a new day of arrival, in other words if it is a day of arrival upon which no email has been received up until now, then the flow of control proceeds to a step S1404. In this step S1404, a new folder is created to correspond to this day of arrival. When the step S1404 has been executed, then the flow of control proceeds to a step S1405. On the other hand, if in the step S1403 it has been decided that this is not a new day of arrival, then the flow of control is transferred to the step S1405 without the step S1404 being executed.

In the step S1405, the image that is attached to the received email is stored within the folder. At this time, the received image data that specifies these images is recorded upon the memory card, split between the folders that have been created for the various different days of arrival. When the step S1405 has been performed, then the flow chart of FIG. 49 terminates.

On the other hand, in the step S1406, a decision is made as to whether or not the day of sending of this sent email is a new day of sending. If it is a new day of sending, in other words if it is a day of sending upon which, up until now, no email was sent, then the flow of control proceeds to a step S1407. In this step S1407, a new folder is created to correspond to this day of sending. When the step S1407 has been executed, then the flow of control proceeds to a step S1408. On the other hand, if in the step S1406 it has been decided that this is not a new day of sending, then the flow of control is transferred to the step S1408 without the step S1407 being executed.

In the step S1408, the image that is attached to the sent email is stored within the folder. At this time, the image data included in the electronic mail data that has been sent via the wireless LAN circuit 106 is recorded upon the memory card as sent image data, split between the various folders that have been created for the various different days of sending. When the step S1408 has been performed, then the flow chart of FIG. 49 terminates.

Figure 50:
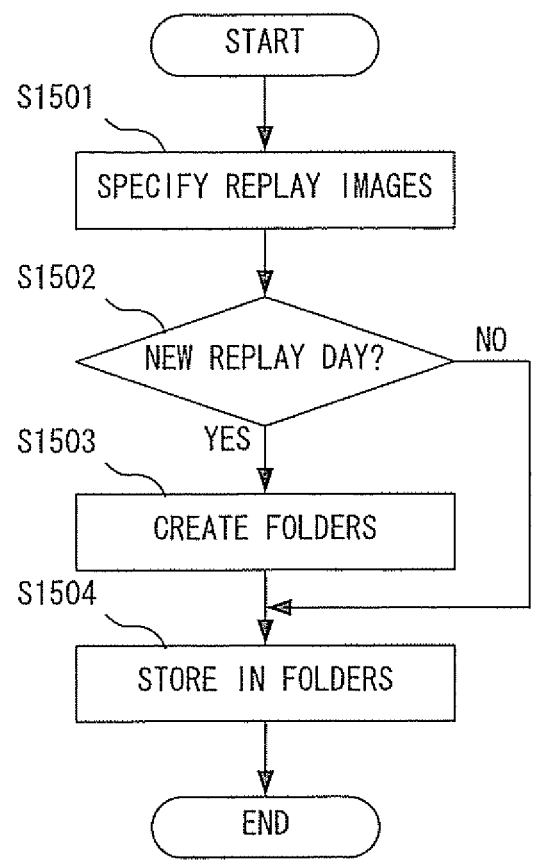
FIG. 50 is a flow chart showing separate folder storage control that is executed by the CPU 101 in the digital camera 1.

Or, it would also be acceptable to arrange to make a setting so that the images that are attached to emails received by this digital camera 1 are stored while being separated into folders created for each day of image replay. FIG. 50 is a flow chart showing separate folder storage control that is executed by the CPU 101 of the digital camera 1 at this time. This separate folder storage control is executed when, for example, the camera is changed over from the replay mode to some other mode. In a step S1501, from among the image data recorded upon the memory card, the images that have been replayed are specified.

In the step S1502, a decision is made as to whether or not any day upon which the images that have been specified in the step S1501 were replayed is a new replay day. If the day is a new replay day, in other words if the day is a day for which, up until now, no image has yet been replayed, then the flow of control proceeds to a step S1503. In this step S1503, folders that correspond to each replay days are newly created. When the step S1503 has been executed, the flow of control proceeds to a step S1504. However, if it has been decided in the step S1502 that there is no new replay day, then the flow of control is transferred to the step S1504 without the step S1503 being executed.

In the step S1504, the images that are attached to the received emails are stored in the folders. At this timer the received image data that gives those images is recorded upon the memory card, by being divided between the folders that have been created for the various replay days. When the step S1504 has been executed, then the flow chart of FIG. 50 terminates.

As has been explained above, for images that are attached to received emails, a plurality of folders are created that correspond to the days of arrival of these received emails, or to the days that these images were replayed. In this manner, the received image data is recorded upon the memory card by being divided between the folders that have been created. Moreover, for images that have been attached to emails for sending, a plurality of folders are created corresponding to the days of sending of those emails for sending. By doing this, the image data that is included in the electronic mail data that was sent via the wireless LAN circuit 106 is recorded upon the memory card as sent image data, distributed between these folders that have been created. In this manner, it is possible for the user of the digital camera 1 to specify simply and easily in which folder the image that he desires to replay is stored.

It should be understood that it would also be acceptable to create the folders, not in units of days, but in units of some period of time. In other words, it would also be possible to create a plurality of folders that correspond to the date and time of arrival of the received emails, or to the replay date and time of the images, or to the sending date and time of the emails, and to store the image data therein. If this is done, it is possible to distribute the images between folders in a more finely subdivided manner.

(Email not Yet Received Notification)

Figure 13:
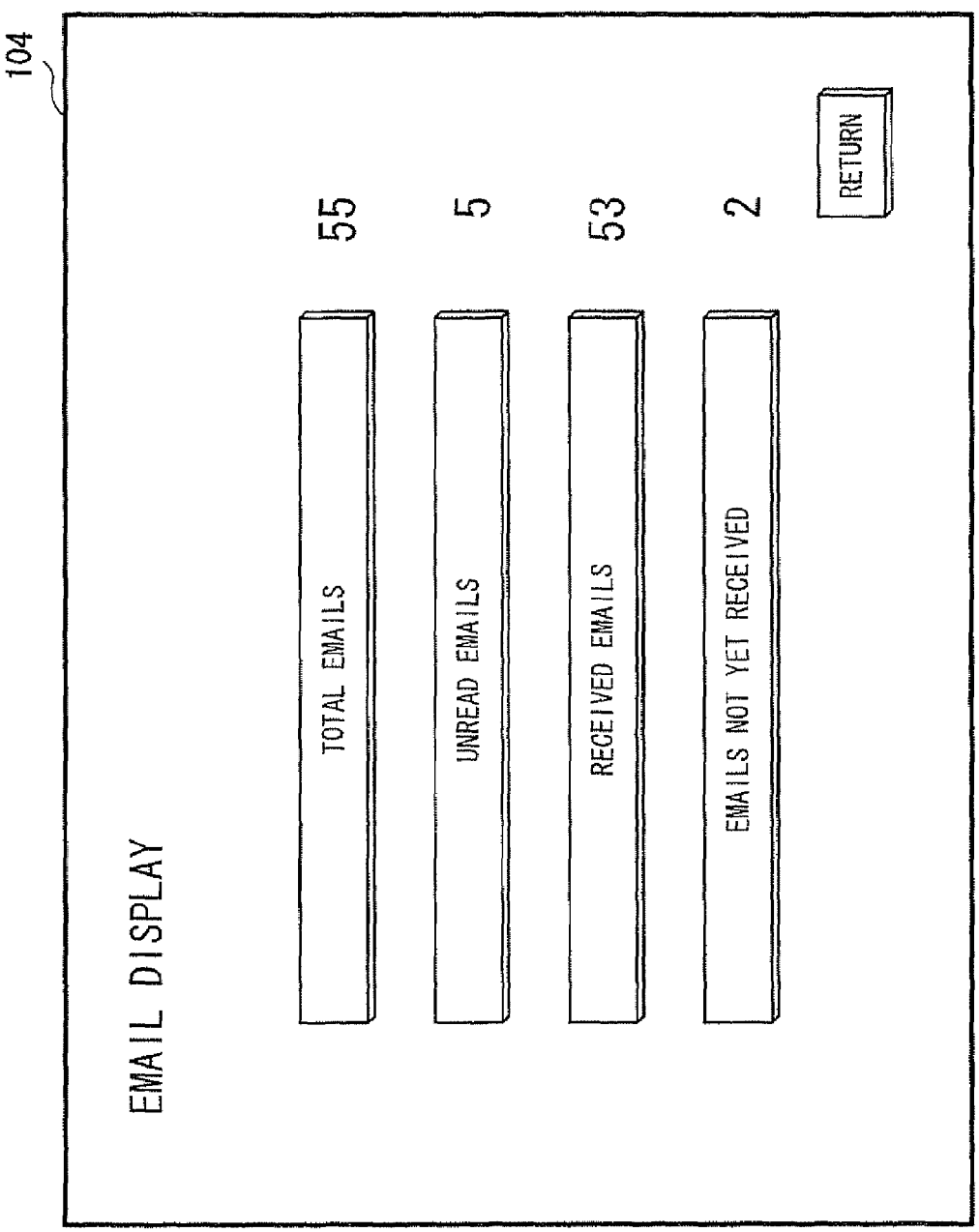
FIG. 13 is a figure showing an example of a screen display that is displayed upon the monitor 104 of the digital camera 1.

As shown on the screen example of FIG. 13, if any emails are present that have not yet been received, then the existence of these not yet received emails is notified to the user. At this time, the existence of these emails that have not yet been received may be notified to the user even by some method other than screen display via the monitor 104, such as by illuminating the LED for AF 21, or the LED for memory access 22, or the LED for power supply 23, or the like.

Figure 52:
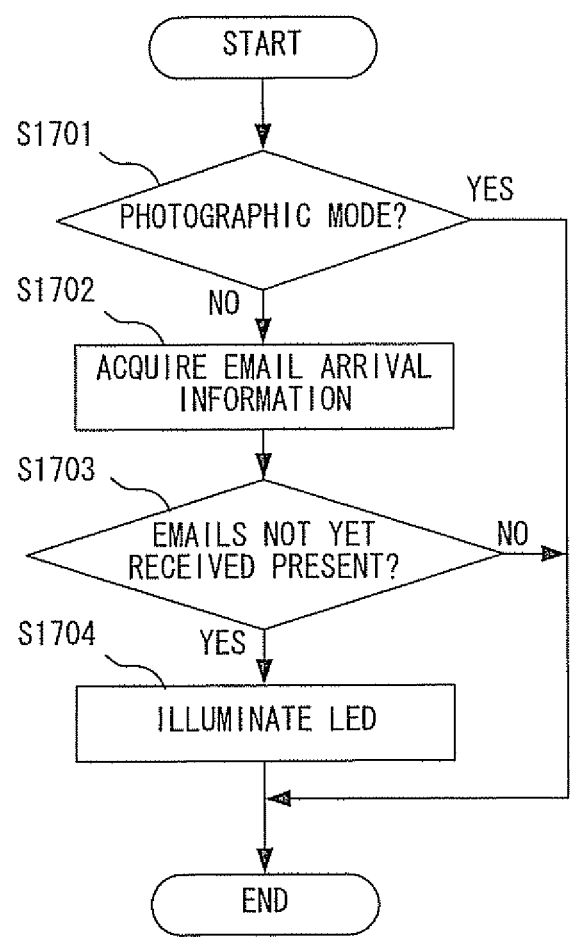
FIG. 52 is a flow chart showing not yet received email notification control that is executed by the CPU 101 in the digital camera 1.

FIG. 52 is a flow chart showing not yet received email notification control that is performed by the CPU 101 within the digital camera 1 when notifying that email has not yet been received. This flow chart may be, for example, executed at predetermined intervals set in advance. In a step S1701, a decision is taken as to whether or not the photographic mode is set. If the photographic mode is set, then the flow chart of FIG. 52 terminates. By doing this, when the photographic mode is set, even if there is some email that has not yet been received, none of the LED for AF 21, the LED for memory access 22, or the LED for power supply 23 is illuminated, so that no notification is provided to the user of the existence of this email that has not yet been received. Accordingly, it is possible to prevent any hindrance to photography being caused by any lamp lighting up in an unanticipated manner.

On the other hand, if the photographic mode is not set, then the flow of control proceeds to a step S1702.

In this step S1702, arrived email information is acquired from the mail server. Then in a step S1703, on the basis of this arrived email information that has been acquired in the step S1702, a decision is made as to whether or not there is any email that has not yet been received. If there is some email that has not yet been received, then the flow of control proceeds to a step S1704. But if there is no email that has not yet been received, then the flow chart of FIG. 52 terminates.

In the step S1704, at least one of the LED for AF 21, the LED for memory access 22, or the LED for power supply 23 is illuminated. As previously described, these various LEDs are respectively provided for being illuminated when at least one of the conditions holds that the digital camera 1 is in the focused state, or the memory access state, or the power supply turn on state. Thus, by lighting up one of these LEDS (i.e. illuminating it), the user may be notified that email that has not yet been received is present. It should be understood that it would also be acceptable to change the number of LEDs that are illuminated according to the amount of email that is not yet received at this time, or to turn on some LED at some different blinking interval. When the step S1704 has been executed, the flow chart of FIG. 52 terminates.

As has been described above, if there is some not yet received email for which the electronic mail data has not yet been received via the wireless LAN circuit 106, then the CPU 101 notifies the user of the existence of such not yet received email by lighting up the LED for AF 21, or the LED for memory access 22, or the LED for power supply 23. By doing this, it is possible to notify the user that email that has not yet been received is present, even if the display upon the monitor 104 is off.

It should be understood that it would also be acceptable to issue this notification that email that has not yet been received is present, using the LED for AF 21, or the LED for memory access 22, or the LED for power supply 23. And, for example, it would also be acceptable to arrange to provide a LED for notification of not yet received email to the digital camera 1.

According to the embodiment explained above, the following beneficial operational effects are obtained.

(1) This digital camera 1, along with capturing an image of the photographic subject with the CCD 113 and thereby acquiring image data, also sends and receives electronic mail data including image data via the wireless LAN circuit 106. Moreover, under the control of the CPU 101, along with the image data that has been acquired by the CCD 113 being recorded as photographed image data upon the memory card, which is a recording medium, image data that is included in electronic mail data received via the wireless LAN circuit 106 is also recorded as received image data upon the memory card. And, under the control of the CPU 101, photographed images based upon the photographed image data recorded upon the memory card, and also received images based upon the received image data recorded upon the memory card, are replayed. At this time, it is arranged to replay the images that have been photographed and the images that have been received distinguishably. Since this is done, it is possible for the digital camera 1 to replay the image data recorded upon the memory card while classifying it into photographed image data and images received by email. Due to this, it is possible to provide a control method that is suitable for a digital camera that sends and receives electronic mail with attached images.

(2) According to actuation by the user, under the control of the CPU 101, this digital camera 1 extracts either photographed image data or received image data recorded upon the memory card, and replays either photographed images or images that have been received by email, on the basis of this image data that has been extracted. Due to this, it is arranged to replay the photographed images and the received images distinguishably. Since this is done, it is possible to respond to the desire only to appreciate the photographic images, and to the desire only to appreciate the images received by email, respectively.

(3) Furthermore, under the control of the CPU 101, this digital camera 1 displays either or both of a photographed image and a received image, along with a camera icon 202 or a received email icon 201, which is a mark for indicating the type of the image. By doing this, it is arranged to replay the photographed images and the received images distinguishably. Since this is done, accordingly, even during replay of images, it is possible to distinguish clearly whether these images belong to photographed images or received images.

(4) If received image data for a plurality of received images is recorded upon the memory card, then, under the control of the CPU 101, this digital camera 1 sets a replay sequence for this plurality of received images. At this time, it is possible to set this replay sequence on the basis of the dates and times that the received emails arrived, or on the basis of the dates and times of creation of the received images by the senders of the received emails. By doing this, it is arranged to display the plurality of received images in order according to the replay sequence that has been set. Since this is done, it is possible for the user to appreciate the images that have been received by email with good efficiency in the order that he desires.

(5) Furthermore, with this digital camera 1, under the control of the CPU 101, a plurality of folders are created for the images that are attached to received emails, according to the days of arrival of these received emails, or according to the days that these images were replayed. In this manner, the received image data is recorded upon the memory card while being separated into these folders that have been created. Moreover, a plurality of folders are created for the images that are attached to emails for sending, according to the day of sending of these emails for sending. In this manner, it is possible to record the image data included in electronic mail data that has been sent via the wireless LAN circuit 106 upon the memory card as sent image data, while separating them into the various folders that have been created. Since this is done, it is possible for the user of this digital camera 1 to specify in which folder is stored an image that he desires to replay, in a simple and easy manner.

(6) Furthermore, with this digital camera 1, under the control of the CPU 101, for image data that has been received via email, it is recorded upon the memory card with information appended that specifies the fact that this image data is image data that has been received via email. When replaying an image based upon photographed image data or received image data that is recorded upon the memory card, it is arranged to distinguish between a photographed image and an image that has been received via email on the basis of the information that has been appended in this manner. Since this is done, it is possible to distinguish between a photographed image and an image that has been received via email in a simple and easy manner.

(7) It is arranged for this digital camera 1, under the control of the CPU 101, to accord priority to replay those received images, among the received images, that have not yet been replayed in the past. Since this is done, it is possible for the user immediately to check the received images that are attached to unread emails.

(8) If electronic mail data that has been received via the wireless LAN circuit 106 is data that has been created by a portable telephone, then, under the control of the CPU 101, this digital camera 1 replays a received image on the basis of the image data included in this electronic mail data, with its vertical dimension made to be longer than its horizontal dimension. Since this is done, it is possible to replay a photographed image that has been sent from a portable telephone with attached camera in the correct orientation.

(9) Under the control of the CPU 101, this digital camera 1 creates an email for sending, which is an email for sending electronic mail data via the wireless LAN circuit 106, with an image to be sent attached that is based upon photographed image data that is stored upon the memory card, and sets the email address of the destination for the email for sending that has been created. At this time, under the control of the CPU 101, it is arranged to set an upper limit data amount for the image to be sent that is attached to this email for sending, or an upper limit for the number of images to be attached, according to the email address that has been set. Since this is done, it is possible to send an email with one or more images for sending attached, in a format that is appropriate according to the processing capability and so on of the recipient. By doing this, it is possible to provide a control method that is adapted for a digital camera that sends and receives electronic mail with images attached.

(10) Under the control of the CPU 101, it is arranged for this digital camera 1 also to be capable of setting an upper limit data amount for each single image to be sent that is attached to an email for sending, according to the email address that has been set. Since this is done, it is possible to send an email for sending with one or more images for sending attached, in an even more appropriate format according to the processing capability and so on of the recipient.

(11) Under the control of the CPU 101, this digital camera 1 creates an email in reply to a received email. At this time, it is arranged to set an upper limit data amount for the image to be sent that is to be attached to this reply email to the received email, according to the data amount of the image that was attached to the received email. Since this is done, it is possible to set an upper limit data amount automatically, according to the communication environment of the destination for reply.

(12) If the user has designated a number of images to be sent to be attached to an email, which exceeds the upper limit number of images to be sent that has been set, then, under the control of the CPU 101, it is arranged for this digital camera 1 to create two or more emails for sending, each with a number of images attached and designated for sending that is less than or equal to this upper limit. Since this is done, accordingly it is possible to send a number of images that exceeds the upper limit number of images, as appended to a plurality of emails.

(13) If the same email address has been set for a plurality of emails to be sent, then it is arranged for this digital camera 1, under the control of the CPU 101, to perform consolidation by combining together this plurality of emails for sending into one email for sending. Since this is done, it is possible to reduce the number of emails that are to be sent, thus reducing the amount of electronic mail data to be sent from the wireless LAN circuit 106.

(14) Under the control of the CPU 101, it is arranged for this digital camera 1 to create an email for sending to which an image to be sent is attached, on the basis of image data from which the photographic information has been deleted from the photographed image data, according to the email address that has been set as the destination address of this email for sending. Since this is done, it is possible to prevent private information from becoming known to an opposite party who is not intended to know such information, because this would be undesirable.

(15) Under the control of the CPU 101, it is arranged for this digital camera 1 to determine the file name of the image to be sent that is attached to the email for sending, according to the email address that has been set as the destination address of this email for sending. Since this is done, it is possible to set a file name that is appropriate for the recipient.

(16) Under the control of the CPU 101, it is arranged for this digital camera 1 to set, as the email addresses for sending emails that are to be sent, email addresses for distribution that are for distributing images to other people, and an email address for saving that is for the user to save images, while distinguishing between them. Since this is done, it is possible to perform this setting, according to the objective, while avoiding any mistake in the email addresses.

(17) It is arranged for this digital camera 1 to issue a warning, under the control of the CPU 101, if the email address that is intrinsic to this digital camera 1 and stored in advance, is set as the email address for saving. By doing this, it is possible to invite the user again to input some different email address for saving.

(18) Under the control of the CPU 101, it is arranged for this digital camera 1 to create the title or the text of an email for sending, on the basis of at least one of the photographed image data and the email address of the recipient. Since this is done, it is possible automatically to create the title or the text of the email for sending with appropriate contents, even if the user does not input any such text by actuation of the digital camera. Due to this, it is possible to provide a control method that is well adapted to a digital camera that sends and receives email with attached images.

(19) Under the control of the CPU 101, it is arranged for this digital camera 1 creates a title or text for an email to be sent, on the basis of the photographic information included in the data for the photographed image, or upon information about the photographic subject that has been specified on the basis of the data for the photographed image. At this time, the title or text for the email to be sent may be created on the basis of the photographic information included in the data for the photographed image, and event information that is stored and that is set according to the date and the time. Since this is done, it is possible to create a title or text with various kinds of contents.

(20) Under the control of the CPU 101, it is arranged for this digital camera 1 also to be able to create a title or text for an email to be sent, on the basis of at least one of the photographed image data, the email address of the recipient, or position information that has been acquired on the basis of a GPS signal when the photographed image data was acquired. Since this is done, it is possible to create a title or text with even more appropriate contents.

(21) Under the control of the CPU 101, this digital camera 1 is also able to acquire map information that specifies the position of photography on the basis of the position information acquired based upon the GPS signal, and to create an email for sending with the image to be sent and also this map information attached thereto. Since this is done, it is possible to inform the recipient of the email of the position of photography in an easily understood manner.

(22) Under the control of the CPU 101, this digital camera 1 is able to edit the title or the text of an email for sending, which has been created in the above described manner, according to actuation by the user. Since this is done, accordingly, if the user does not like the contents of the document that has been created, he is able to edit it freely.

(23) Under the control of the CPU 101, this digital camera 1 is able to change the image aspect ratio of the photographed image data, according to the email address that has been set for the recipient. For example, if the email address of a portable telephone has been set, then the image aspect ratio may be changed so that the vertical dimension of the image of the photographed image data becomes longer than its horizontal dimension. By doing this, it is arranged to create an email for sending to which the image to be sent is attached, on the basis of the photographed image data after the aspect ratio of its image has been changed. Since this is done, it is possible to send an email with an attached image that is adapted to the display format of the recipient.

(24) Under the control of the CPU 101, it is arranged for this digital camera 1, when electronic mail data including image data is received via the wireless LAN circuit 106, to create a plurality of folders according to the email addresses of the senders of this electronic mail data. And it is arranged to record the received image data upon the memory card, distributed among the folders that have been created in this manner. Since this is done, it is possible to manage the images that have been received by email in a simple and easy manner. Due to this, it is possible to provide a control method that is well adapted to a digital camera that sends and receives electronic mail with images attached.

(25) When the total number of images that are attached to emails, among the received emails, that have the same email address of a sender has become greater than or equal to a predetermined number, it is arranged for this digital camera 1 to create a folder for which email address, under the control of the CPU 101. Accordingly it is possible to prevent the useless creation of a large number of folders.

(26) Under the control of the CPU 101, it is possible for this digital camera 1 to create a file name for the received image data, on the basis of sender information included in the electronic mail data that has been received. In other words, it is possible to create a file name that includes the email address of the sender, or the name of the sender, in the sender information. And it is arranged to record the received image data upon the memory card with the file name that has been created in this manner. Since this is done, accordingly it is possible to set a file name from which it is easy to know from whom the image has been sent.

(27) Under the control of the CPU 101, this digital camera 1 creates a reply email to which is attached an image based upon photographed image data that is recorded upon the memory card. When electronic mail data for this reply email that has been created in this manner has been sent via the wireless LAN circuit 106, then it is arranged to record upon the memory card the received image data of the received email to which that reply email is a reply, and the photographed image data that corresponds to the reply image attached to that reply email, in mutual correspondence. Since this is done, accordingly, if either one of the received image and the reply image is designated, it is possible to specify the other one thereof in a simple and easy manner.

(28) Under the control of the CPU 101, this digital camera 1 determines whether or not to print the text of an email that has been received. And, if it has been determined that the text of a received email is to be printed, then a signal is outputted to the printer for printing the text of the received email, along with the received image based upon the received image data that is recorded upon the memory card. On the other hand, if it is determined that the text of the received email is not to be printed, then a signal is outputted to the printer for printing only the received image based upon the received image data that is recorded upon the memory card. Since this is done, if the user wishes, it is possible to print, not only the image received in the email, but also the email text together therewith. Accordingly, it is possible to enhance the convenience of use.

(29) Under the control of the CPU 101, with this digital camera 1, it is possible to set a search keyword including at least one of the file name of the received image data, the file size of the received image data, and the date and time of creation of the received image data by the sender of the email. In this manner, it is arranged for it to be possible to search for a desired email from among the received emails, on the basis of the search keyword that has been set. Since this is done, the user is able to search through the received emails as he desires in a reliable manner, with a simple actuation.

(30) Under the control of the CPU 101, it is arranged for this digital camera 1 to display a list of thumbnail images that have been shrunk down from the received images. When any one of the thumbnail images that have been displayed as a list in this manner is selected according to actuation by the user, it is arranged to display the received image that corresponds to that thumbnail image, and the text of the received email to which that received image was attached. Accordingly, simply by the user selecting a thumbnail image, it is possible for him to check the image and the email text in a simple manner.

(31) Under the control of the CPU 101, it is arranged for this digital camera 1 to decide whether or not a user is a legitimate user, by setting an actuation sequence for a plurality of buttons, and by deciding whether or not the user has actuated these buttons according to the actuation sequence that has been set. And it is arranged to determine, according to the result of this decision, whether or not to cancel functional limitation of the digital camera 1. Since this is done, it is possible to prevent important information from being acquired by an improper user.

(32) Under the control of the CPU 101, it is arranged for this digital camera 1 to detect the remaining amount in the battery 110 and the remaining capacity of the memory, and to permit or to prohibit the reception of electronic mail data via the wireless LAN circuit 106, according to the remaining amount in the battery 110 or the remaining capacity of the memory that has thus been detected. Since this is done, it is possible to cause the digital camera 1 to operate in an appropriate manner, even if decrease of the remaining amount in the battery or decrease of the remaining capacity of the memory has taken place. Due to this, it is possible to provide a control method that is well adapted to this digital camera that sends and receives electronic mail with images attached.

(33) With this digital camera 1 it is arranged, under the control of the CPU 101, to prohibit reception of electronic mail data via the wireless LAN circuit 106, when the remaining amount in the battery 110 is less than the predetermined value, or when the remaining capacity in the memory is less than the predetermined value. By doing this, it is possible to operate the digital camera 1 in an appropriate manner, by reducing the consumption of electrical power and the consumption of memory capacity, when the remaining amount in the battery or the remaining capacity in the memory has become low.

(34) Yet further, under the control of the CPU 101, it is arranged for this digital camera 1 to permit or to prohibit the sending of electronic mail data via the wireless LAN circuit 106, according to the remaining amount in the battery 110 that has been detected. In other words it is arranged, when the remaining amount in the battery 110 has become less than a predetermined value, to permit sending of electronic mail data via the wireless LAN circuit 106 to the specified recipient that is set for image storage, while prohibiting the sending of electronic mail data via the wireless LAN circuit 106 to other recipients. Since this is done, it is possible to suppress consumption of electrical power to the minimum level, while still ensuring that it is possible to send mail for image storage.

(35) Moreover, under the control of the CPU 101, it is arranged for this digital camera 1 to change the send/receive interval for electronic mail data via the wireless LAN circuit 106, according to the remaining amount in the battery 110 that has been detected. Since this is done, it is possible to limit frequent access to the mail server. Accordingly, it is possible to prevent any obstacle being caused to photography due to shortage of capacity of the battery.

(36) Furthermore, under the control of the CPU 101, it is arranged for this digital camera 1 to prohibit sending and receiving of electronic mail data via the wireless LAN circuit 106, when the photographic mode for capturing an image of a photographic subject is set. Since this is done, it is possible to prevent any bad influence from being exerted upon the photographic processing due to email sending and reception being performed during photography.

(37) If there are some emails that have not yet been received, it is arranged for this digital camera 1, under the control of the CPU 101, to notify the existence of these emails that have not yet been received by illuminating the LED for AF 21, or the LED for memory access 22, or the LED for power supply 23. Since this is done, it is possible to notify the user of the existence of this email that has not yet been received, even if the display upon the monitor 104 is turned off.

(38) It should be understood that it has been arranged, when the photographic mode is set, not to illuminate the LED for AF 21, the LED for memory access 22, or the LED for power supply 23, even if there is some email that has not yet been received, and thus not to notify the user of the existence of that not yet received email. By doing this, it is possible to prevent any impediment being caused to photography by the unanticipated lighting up of a lamp.

Although various embodiments and variant embodiments have been explained in the above description, the present invention is not to be considered as being limited to the details thereof. Other variations that may be considered to be within the technical concept of the present invention are also included within the scope of the present invention.

The disclosures of the following priority applications are incorporated herein by reference:

Japanese Patent Application No. 2006-180559 (filed on Jun. 30, 2006);

Japanese Patent Application No. 2006-180560 (filed on Jun. 30, 2006);

Japanese Patent Application No. 2006-180561 (filed on Jun. 30, 2006);

Japanese Patent Application No. 2006-180562 (filed on Jun. 30, 2006); and

Japanese Patent Application No. 2006-180567 (filed on Jun. 30, 2006).

The invention claimed is:

1. A portable telephone equipped with a camera, the portable telephone comprising:
    an image-capturing unit that captures a photographic subject and acquires image data related to position information denoting a position at which the photographic subject is captured by the image-capturing unit;
    an image data storage control unit that controls to store the image data acquired by the image-capturing unit to a storage unit;
    an image data selection unit that selects first image data related to a first position information among a plurality of image data stored in the storage unit;
    a position information acquisition unit that acquires the first position information related to the first image data selected by the image data selection unit;
    a map information acquisition unit that acquires information indicating a map based on the first position information acquired by the position information acquisition unit;
    a creation unit that creates at least one of a title and a text of an email to be sent to a destination automatically based on the first position information acquired by the position acquisition unit; and
    a communication unit that sends the email, the first image data selected by the image data selection unit and the information indicating the map acquired by the map information acquisition unit.

2. The portable telephone according to claim 1, wherein the image data, acquired by the image-capturing unit, is related to a date, on which the photographic subject is captured, further comprising
    an event information acquisition unit that acquires an event information in correspondence to the first date related to the first image data, wherein
    the creation unit creates at least one of the title and the text of the email automatically based on the event information acquired by the event information acquisition unit.

* * * * *